(12) United States Patent
Bennett et al.

(10) Patent No.: US 12,533,423 B2
(45) Date of Patent: Jan. 27, 2026

(54) NEUROPROTECTIVE GENE THERAPY TARGETING THE AKT PATHWAY

(71) Applicant: The Trustees of the University of Pennsylvania, Philadelphia, PA (US)

(72) Inventors: Jean Bennett, Bryn Mawr, PA (US); Devin McDougald, Philadelphia, PA (US); Junwei Sun, Philadelphia, PA (US)

(73) Assignee: The Trustees of the University of Pennsylvania, Philadelphia, PA (US)

(*) Notice: Subject to any disclaimer, the term of this patent is extended or adjusted under 35 U.S.C. 154(b) by 1039 days.

(21) Appl. No.: 17/435,205

(22) PCT Filed: Mar. 3, 2020

(86) PCT No.: PCT/US2020/020832
§ 371 (c)(1),
(2) Date: Aug. 31, 2021

(87) PCT Pub. No.: WO2020/180886
PCT Pub. Date: Sep. 10, 2020

(65) Prior Publication Data
US 2022/0143217 A1   May 12, 2022

Related U.S. Application Data

(60) Provisional application No. 62/821,705, filed on Mar. 21, 2019, provisional application No. 62/813,587, filed on Mar. 4, 2019.

(51) Int. Cl.
*A61K 48/00* (2006.01)
*A61P 27/02* (2006.01)
*C12N 9/12* (2006.01)
*C12N 15/86* (2006.01)

(52) U.S. Cl.
CPC ............ *A61K 48/005* (2013.01); *A61P 27/02* (2018.01); *C12N 9/1205* (2013.01); *C12N 15/86* (2013.01); *C12Y 207/11001* (2013.01)

(58) Field of Classification Search
CPC ...... A61K 48/005; A61K 48/00; C12N 15/86; C12N 2750/14143; A01K 2217/072
See application file for complete search history.

(56) References Cited

U.S. PATENT DOCUMENTS

| | | |
|---|---|---|
| 5,139,941 A | 8/1992 | Muzyczka et al. |
| 5,478,745 A | 12/1995 | Samulski et al. |
| 5,741,683 A | 4/1998 | Zhou et al. |
| 6,057,152 A | 5/2000 | Samulski et al. |
| 6,268,213 B1 | 7/2001 | Samulski et al. |
| 6,491,907 B1 | 12/2002 | Rabinowitz et al. |
| 6,596,535 B1 | 7/2003 | Carter |
| 6,660,514 B1 | 12/2003 | Zolotukhin et al. |
| 6,951,753 B2 | 10/2005 | Shenk et al. |
| 7,094,604 B2 | 8/2006 | Snyder et al. |
| 7,125,717 B2 | 10/2006 | Carter |
| 7,172,893 B2 | 2/2007 | Rabinowitz et al. |
| 7,201,898 B2 | 4/2007 | Monahan et al. |
| 7,229,823 B2 | 6/2007 | Samulski et al. |
| 7,282,199 B2 | 10/2007 | Gao et al. |
| 7,439,065 B2 | 10/2008 | Ferrari et al. |
| 7,588,772 B2 | 9/2009 | Kay et al. |
| 7,629,322 B2 | 12/2009 | Kleinschmidt et al. |
| 7,790,449 B2 | 9/2010 | Gao et al. |
| 8,147,823 B2 | 4/2012 | Acland et al. |
| 2003/0100049 A1 | 5/2003 | Guo et al. |
| 2012/0034188 A1 | 2/2012 | Guo et al. |
| 2014/0087444 A1 | 3/2014 | Bennett et al. |
| 2016/0108373 A1 | 4/2016 | Bennett et al. |
| 2016/0310618 A1 | 10/2016 | Hamel et al. |

FOREIGN PATENT DOCUMENTS

| | | |
|---|---|---|
| JP | 2002-539781 | 11/2002 |
| JP | 2018-515622 | 6/2018 |
| JP | 2019-502378 | 1/2019 |
| JP | 2019-505239 | 2/2019 |
| WO | WO 2000/037613 | 6/2000 |
| WO | WO 2000/056866 | 9/2000 |
| WO | WO 2003/042397 | 5/2003 |
| WO | WO 2005/033321 | 4/2005 |
| WO | WO 2006/110689 | 10/2006 |
| WO | WO 2011/126808 | 10/2011 |
| WO | WO 2012/158757 | 11/2012 |

(Continued)

OTHER PUBLICATIONS

Naso, M.F., Tomkowicz, B., Perry, W.L. et al. Adeno-Associated Virus (AAV) as a Vector for Gene Therapy. BioDrugs 31, 317-334 (2017). (Year: 2017).*
UniProt entry Q9Y243 AKT3_Human. Feb. 28, 2018, entry version 190. https://www.uniprot.org/uniprotkb/Q9Y243/entry. Accessed Mar. 4, 2025. (Year: 2018).*
Mauro and Shappell . "A critical analysis of codon optimization in human therapeutics". Trends Mol Med. Sep. 25, 2014;20(11):604-613. (Year: 2014).*
Inouye et al. "Codon optimization of genes for efficient protein expression". Protein Expression and Purification 109 (2015) 47-54. (Year: 2015).*

(Continued)

*Primary Examiner* — Brian Whiteman
*Assistant Examiner* — Amanda M Zahorik
(74) *Attorney, Agent, or Firm* — Howson & Howson LLP; Colleen M. Schaller

(57) ABSTRACT

Compositions and methods for the treatment of retinal degeneration are provided. In one aspect, provided herein is adeno-associated virus (AAV) vector comprising an AAV capsid having encapsidated therein a vector genome comprising AAV inverted terminal repeat (ITR) sequences, a human protein kinase B (AKT) coding sequence, and expression control sequences that direct expression of AKT in a host cell.

17 Claims, 20 Drawing Sheets

Specification includes a Sequence Listing.

(56) References Cited

FOREIGN PATENT DOCUMENTS

| WO | WO 2013/049493 | 4/2013 |
|---|---|---|
| WO | WO 2014/011210 | 1/2014 |
| WO | WO 2014/124282 | 8/2014 |
| WO | WO 2015/143418 A2 | 9/2015 |
| WO | WO 2016/185242 | 11/2016 |
| WO | WO 2017/106202 | 6/2017 |
| WO | WO 2017/144611 | 8/2017 |
| WO | WO 2018/232149 | 12/2018 |

OTHER PUBLICATIONS

McDougald et al., AKT3 Gene Transfer Promotes Photoreceptor Neuroprotection in a Pre-clinical Model of Retinitis Pigmentosa. Mol Ther. May 2018; vol. 26, No. 5S1: p. 133.
Office Action dated Jan. 31, 2024 issued in Japanese Patent Application No. 2021-552552.
Office Action issued Sep. 9, 2023 in Chinese Patent Application No. 202080033680.0, with unofficial English translation provided by local agent.
Aït-Ali et al. Rod-derived cone viability factor promotes cone survival by stimulating aerobic glycolysis, Cell. May 7, 2015;161(4):817-32.
Altomare et al., Perturbations of the AKT signaling pathway in human cancer, Oncogene. Nov. 14, 2005;24(50):7455-64.
Beltran et al., rAAV2/5 gene-targeting to rods:dose-dependent efficiency and complications associated with different promoters, Gene Ther. Sep. 2010;17(9):1162-74.
Bové et al., Fighting neurodegeneration with rapamycin: mechanistic insights, Nat Rev Neurosci. Jul. 20, 2011;12(8):437-52.
Bringmann et al., Cellular signaling and factors involved in Müller cell gliosis: neuroprotective and detrimental effects, Prog Retin Eye Res. Nov. 2009;28(6):423-51.
Büning et al., Recent developments in adeno-associated virus vector technology, J Gene Med. Jul. 2008;10(7):717-33.
Cai et al., A 350 bp region of the proximal promoter of Rds drives cell-type specific gene expression, Exp Eye Res. Aug. 2010;91(2):186-94.
Chang et al., Retinal degeneration mutants in the mouse, Vision Res. Feb. 2002;42(4):517-25.
Daber et al., A novel molecular switch, J Mol Biol. Aug. 28, 2009;391(4):661-70.
Dalkara et al., In vivo-directed evolution of a new adeno-associated virus for therapeutic outer retinal gene delivery from the vitreous, Sci Transl Med. Jun. 12, 2013;5(189):189ra76.
Damdindorj et al., A comparative analysis of constitutive promoters located in adeno-associated viral vector, PLoS One. Aug. 29, 2014;9(8):e106472.
Dooley et al., Spliceosome-Mediated Pre-mRNA trans-Splicing Can Repair CEP290 mRNA, Mol Ther Nucleic Acids. Sep. 7, 2018;12:294-308.
Easton et al., Role for Akt3/protein kinase Bgamma in attainment of normal brain size, Mol Cell Biol. Mar. 2005;25(5):1869-78.
Fisher et al., Transduction with recombinant adeno-associated virus for gene therapy is limited by leading-strand synthesis, J Virol. Jan. 1996;70(1):520-32.
Fujita et al., Spatially and Temporally Regulated NRF2 Gene Therapy Using Mcp-1 Promoter in Retinal Ganglion Cell Injury, Mol Ther Methods Clin Dev. Apr. 19, 2017;5:130-141.
Gargini et al., Retinal organization in the retinal degeneration 10 (rd10) mutant mouse: a morphological and ERG study, J Comp Neurol. Jan. 10, 2007;500(2):222-38.
Genbank Accession No. AY327580, *Homo sapiens* rhodopsin kinase gene, promoter region, exon 1 and partial cds, Jul. 26, 2016.
Goldman, Müller glial cell reprogramming and retina regeneration, Nat Rev Neurosci. Jul. 2014;15(7):431-42.
Gray et al., Optimizing promoters for recombinant adeno-associated virus-mediated gene expression in the peripheral and central nervous system using self-complementary vectors, Hum Gene Ther. Sep. 2011;22(9):1143-53.

Grieger & Samulski, Adeno-associated virus as a gene therapy vector: vector development, production and clinical applications, Adv Biochem Eng Biotechnol. 2005;99:119-45.
Gupta et al., Activated microglia in human retinitis pigmentosa, late-onset retinal degeneration, and age-related macular degeneration, Exp Eye Res. Apr. 2003;76(4):463-71.
Inoki et al., Rheb GTPase is a direct target of TSC2 GAP activity and regulates mTOR signaling, Genes Dev. Aug. 1, 2003;17(15):1829-34.
Inoki et al., TSC2 is phosphorylated and inhibited by Akt and suppresses mTOR signalling, Nat Cell Biol. Sep. 2002;4(9):648-57.
Isiegas et al., Intravitreal Injection of Proinsulin-Loaded Microspheres Delays Photoreceptor Cell Death and Vision Loss in the rd10 Mouse Model of Retinitis Pigmentosa, Invest Ophthalmol Vis Sci. Jul. 1, 2016;57(8):3610-8.
Jones et al., Retinal Degeneration, Remodeling and Plasticity. Oct. 28, 2016. In: Kolb H, Fernandez E, Nelson R, editors. Webvision: The Organization of the Retina and Visual System [Internet]. Salt Lake City (UT): University of Utah Health Sciences Center; 1995—. Available from: https://www.ncbi.nlm.nih.gov/books/NBK482309/, Robert E. Marc and Rebecca L. Pfeiffer.
Kachi et al., Equine infectious anemia viral vector-mediated codelivery of endostatin and angiostatin driven by retinal pigmented epithelium-specific VMD2 promoter inhibits choroidal neovascularization, Hum Gene Ther. Jan. 2009;20(1):31-9.
Karassek et al., Ras homolog enriched in brain (Rheb) enhances apoptotic signaling, J Biol Chem. Oct. 29, 2010;285(44):33979-91.
Khabou et al., Insight into the mechanisms of enhanced retinal transduction by the engineered AAV2 capsid variant-7m8, Biotechnol Bioeng. Dec. 2016;113(12):2712-2724.
Khani et al., AAV-mediated expression targeting of rod and cone photoreceptors with a human rhodopsin kinase promoter, Invest Ophthalmol Vis Sci. Sep. 2007;48(9):3954-61.
Kim et al., AAV transduction of dopamine neurons with constitutively active Rheb protects from neurodegeneration and mediates axon regrowth, Mol Ther. Feb. 2012;20(2):275-86.
Lambard et al., Expression of rod-derived cone viability factor: dual role of CRX in regulating promoter activity and cell-type specificity, PLoS One. Oct. 7, 2010;5(10):e13075.
Lee et al., Reinstating aberrant mTORC1 activity in Huntington's disease mice improves disease phenotypes, Neuron. Jan. 21, 2015;85(2):303-15.
Lim et al., Neural activity promotes long-distance, target-specific regeneration of adult retinal axons, Nat Neurosci. Aug. 2016;19(8):1073-84.
Lock et al., Absolute determination of single-stranded and self-complementary adeno-associated viral vector genome titers by droplet digital PCR, Hum Gene Ther Methods. Apr. 2014;25(2):115-25.
Malagelada et al., Rapamycin protects against neuron death in in vitro and in vivo models of Parkinson's disease, J Neurosci. Jan. 20, 2010;30(3):1166-75.
Manning et al., AKT/PKB Signaling: Navigating the Network, Cell. Apr. 20, 2017;169(3):381-405.
McCarty et al., Self-complementary recombinant adeno-associated virus (scAAV) vectors promote efficient transduction independently of DNA synthesis, Gene Ther. Aug. 2001;8(16):1248-54.
McDougald et al., AKT3 Gene Transfer Promotes Anabolic Reprogramming and Photoreceptor Neuroprotection in a Pre-clinical Model of Retinitis Pigmentosa, Mol Ther. Jul. 3, 2019;27(7):1313-1326.
McDougald et al., SIRT1 and NRF2 Gene Transfer Mediate Distinct Neuroprotective Effects Upon Retinal Ganglion Cell Survival and Function in Experimental Optic Neuritis, Invest Ophthalmol Vis Sci. Mar. 1, 2018;59(3):1212-1220.
McIlhinney et al., Membrane targeting via protein N-myristoylation, Methods Mol Biol. 1998;88:211-25.
McLaughlin et al., Adeno-associated virus general transduction vectors: analysis of proviral structures, J Virol. Jun. 1988;62(6):1963-73.
Mende et al., Oncogenic transformation induced by membrane-targeted Akt2 and Akt3, Oncogene. Jul. 19, 2001;20(32):4419-23.

(56) References Cited

OTHER PUBLICATIONS

Miao et al., mTORC1 is necessary but mTORC2 and GSK3β are inhibitory for AKT3-induced axon regeneration in the central nervous system, Elife. Mar. 30, 2016;5:e14908.
Morrissey et al., PRE-1, a cis element sufficient to enhance cone- and rod-specific expression in differentiating zebrafish photoreceptors, BMC Dev Biol. Jan. 24, 2011;11:3.
Mussolino et al., AAV-mediated photoreceptor transduction of the pig cone-enriched retina, Gene Ther. Jul. 2011;18(7):637-45.
Nathans et al., Isolation and nucleotide sequence of the gene encoding human rhodopsin, Proc Natl Acad Sci U S A. Aug. 1984;81(15):4851-5.
Nicoud et al., Development of photoreceptor-specific promoters and their utility to investigate EIAV lentiviral vector mediated gene transfer to photoreceptors, J Gene Med. Dec. 2007;9(12):1015-23.
Ogueta et al., The human cGMP-PDE beta-subunit promoter region directs expression of the gene to mouse photoreceptors, Invest Ophthalmol Vis Sci. Dec. 2000;41(13):4059-63.
Potheraveedu et al., Rheb in neuronal degeneration, regeneration, and connectivity, Biol Chem. May 1, 2017;398(5-6):589-606.
Punzo et al., Loss of Daylight Vision in Retinal Degeneration: Are Oxidative Stress and Metabolic Dysregulation to Blame? J Biol Chem. Jan. 13, 2012;287(3): 1642-1648.
Punzo et al., Stimulation of the insulin/mTOR pathway delays cone death in a mouse model of retinitis pigmentosa, Nat Neurosci. Jan. 2009;12(1):44-52.
Ramachandran et al., Evaluation of Dose and Safety of AAV7m8 and AAV8BP2 in the Non-Human Primate Retina, Hum Gene Ther. Feb. 2017;28(2):154-167.
Ravikumar et al., Inhibition of mTOR induces autophagy and reduces toxicity of polyglutamine expansions in fly and mouse models of Huntington disease, Nat Genet. Jun. 2004;36(6):585-95.
Reichenbach, New functions of Müller cells, Glia. May 2013;61(5):651-78.
Ries et al., Oncoprotein Akt/PKB induces trophic effects in murine models of Parkinson's disease, Proc Natl Acad Sci U S A. Dec. 5, 2006;103(49):18757-62.
Santiago et al., A Drug-Tunable Gene Therapy for Broad-Spectrum Protection against Retinal Degeneration, Mol Ther. Oct. 3, 2018;26(10):2407-2417.
Shen et al., Oxidative damage is a potential cause of cone cell death in retinitis pigmentosa, J Cell Physiol. Jun. 2005;203(3):457-64.
Shu et al., Functional Characterization of the Human RPGR Proximal Promoter, Invest Ophthalmol Vis Sci. Jun. 26, 2012;53(7):3951-8.
Shu et al., Ras homolog enriched in the brain is linked to retinal ganglion cell apoptosis after light injury in rats, J Mol Neurosci. 2014;54(2):243-51.
Sochor et al., An Autogenously Regulated Expression System for Gene Therapeutic Ocular Applications, Sci Rep. Nov. 24, 2015;5:17105.
Spilman et al., Inhibition of mTOR by rapamycin abolishes cognitive deficits and reduces amyloid-beta levels in a mouse model of Alzheimer's disease, PLoS One. Apr. 1, 2010;5(4):e9979.
Sun et al., Gene therapy with a promoter targeting both rods and cones rescues retinal degeneration caused by AIPL1 mutations, Gene Ther. Jan. 2010;17(1):117-31.
Tsang et al., Silencing of tuberin enhances photoreceptor survival and function in a preclinical model of retinitis pigmentosa (an American Ophthalmological Society thesis), Trans Am Ophthalmol Soc. Jul. 2014;112:103-15.
Venkatesh et al., Activated mTORC1 promotes long-term cone survival in retinitis pigmentosa mice, J Clin Invest. Apr. 2015;125(4):1446-58.
Wang et al., Two pathways of rod photoreceptor cell death induced by elevated cGMP, Hum Mol Genet. Jun. 15, 2017;26(12):2299-2306.
Wu et al., Combining Constitutively Active Rheb Expression and Chondroitinase Promotes Functional Axonal Regeneration after Cervical Spinal Cord Injury, Mol Ther. Dec. 6, 2017;25(12):2715-2726.
Wu et al., Expressing constitutively active rheb in adult dorsal root ganglion neurons enhances the integration of sensory axons that regenerate across a chondroitinase-treated dorsal root entry zone following dorsal root crush. Front Mol Neurosci. Jul. 5, 2016;9:49.
Xiong et al., NRF2 promotes neuronal survival in neurodegeneration and acute nerve damage, J Clin Invest. Apr. 2015;125(4):1433-45.
Yan et al., Hyperactivation of mammalian target of rapamycin (mTOR) signaling by a gain-of-function mutant of the Rheb GTPase, J Biol Chem. Jul. 21, 2006;281(29):19793-7.
Zhang et al., Reprogramming towards anabolism impedes degeneration in a preclinical model of retinitis pigmentosa, Hum Mol Genet. Oct. 1, 2016;25(19):4244-4255. Epub Aug. 11, 2016.
Zhong et al., Rational design of aptazyme riboswitches for efficient control of gene expression in mammalian cells, Elife. Nov. 2, 2016;5:e18858.
International Search Report and Written Opinion issued for International Patent Application No. PCT/US2020/20832, mailed Jul. 21, 2020.
Extended European Search Report issued for European Patent Application No. 20765810.5, dated Nov. 22, 2022.

\* cited by examiner

FIG. 1A
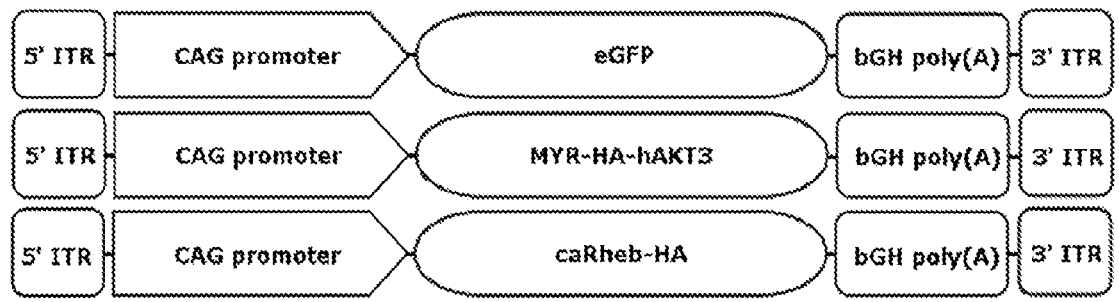
FIG. 1B
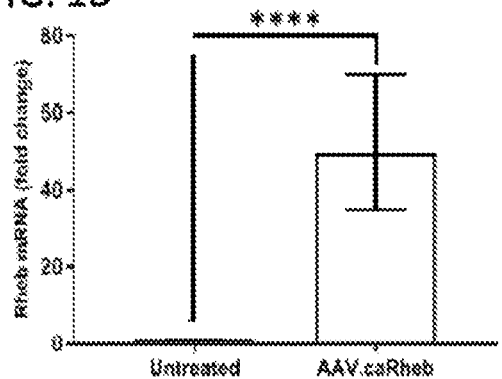
FIG. 1C
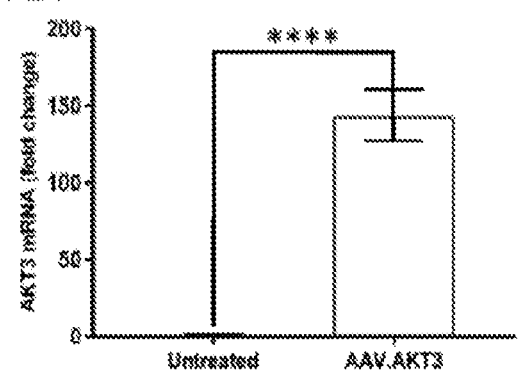
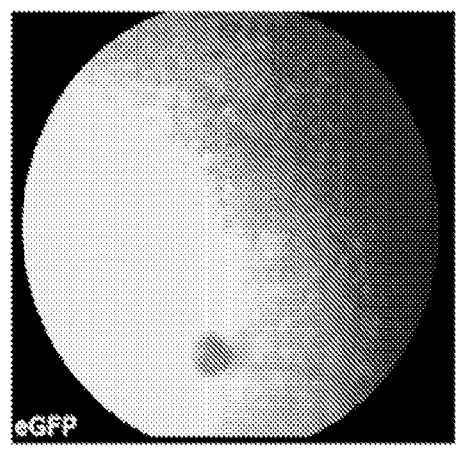
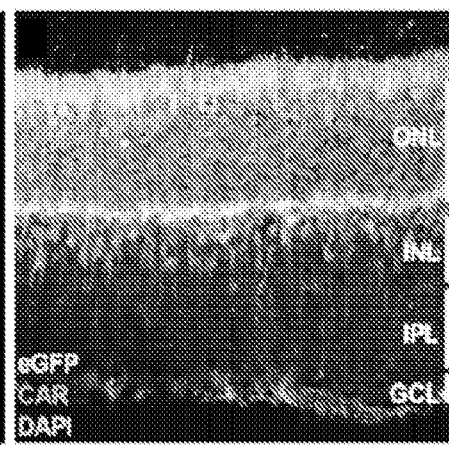
FIG. 1D                FIG. 1E

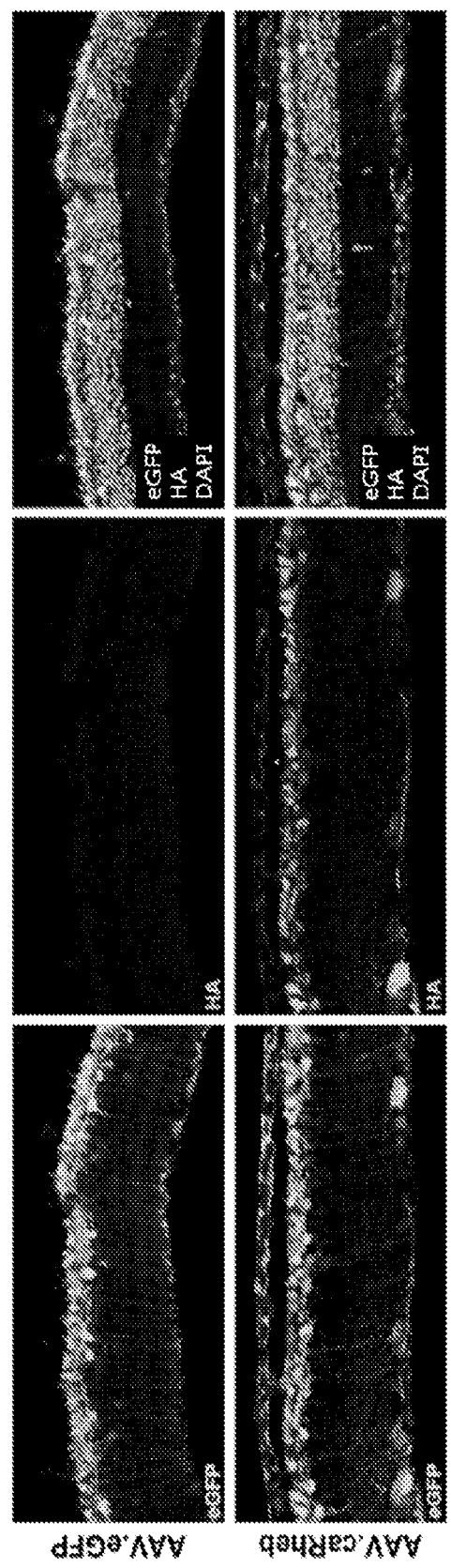

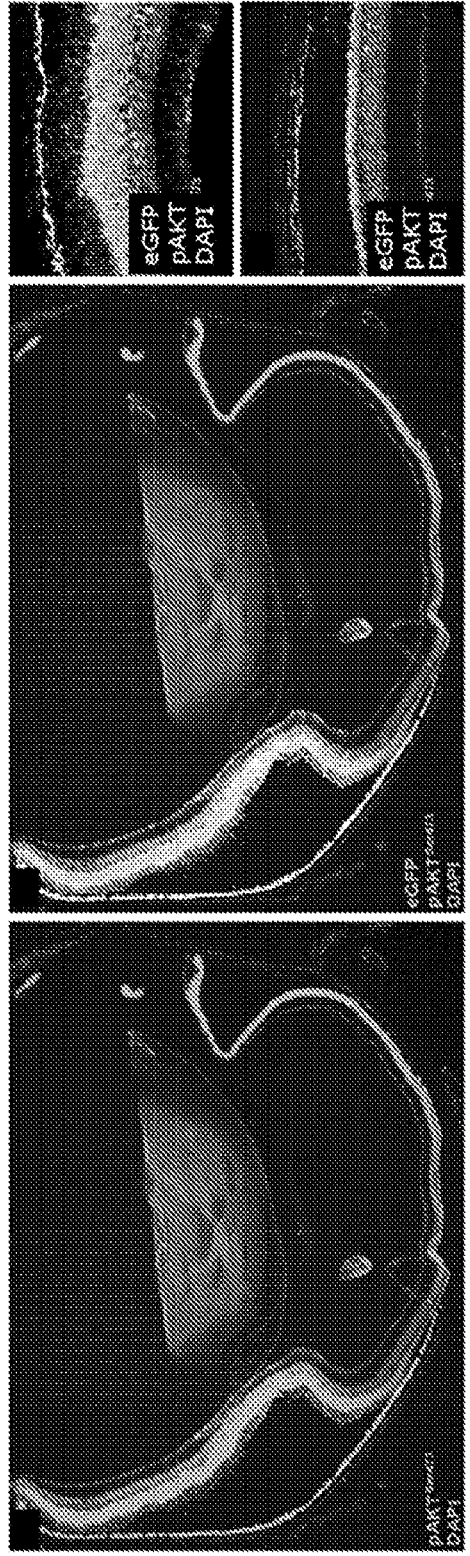
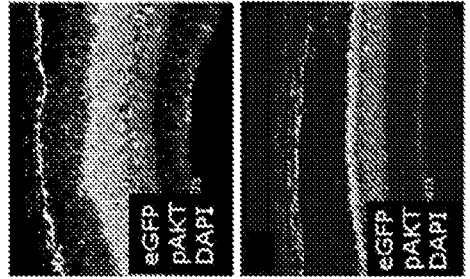
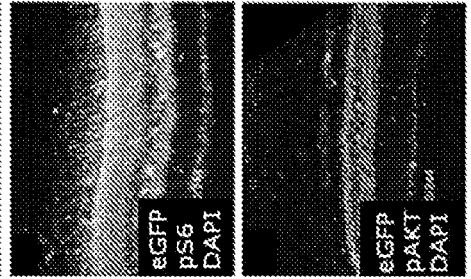

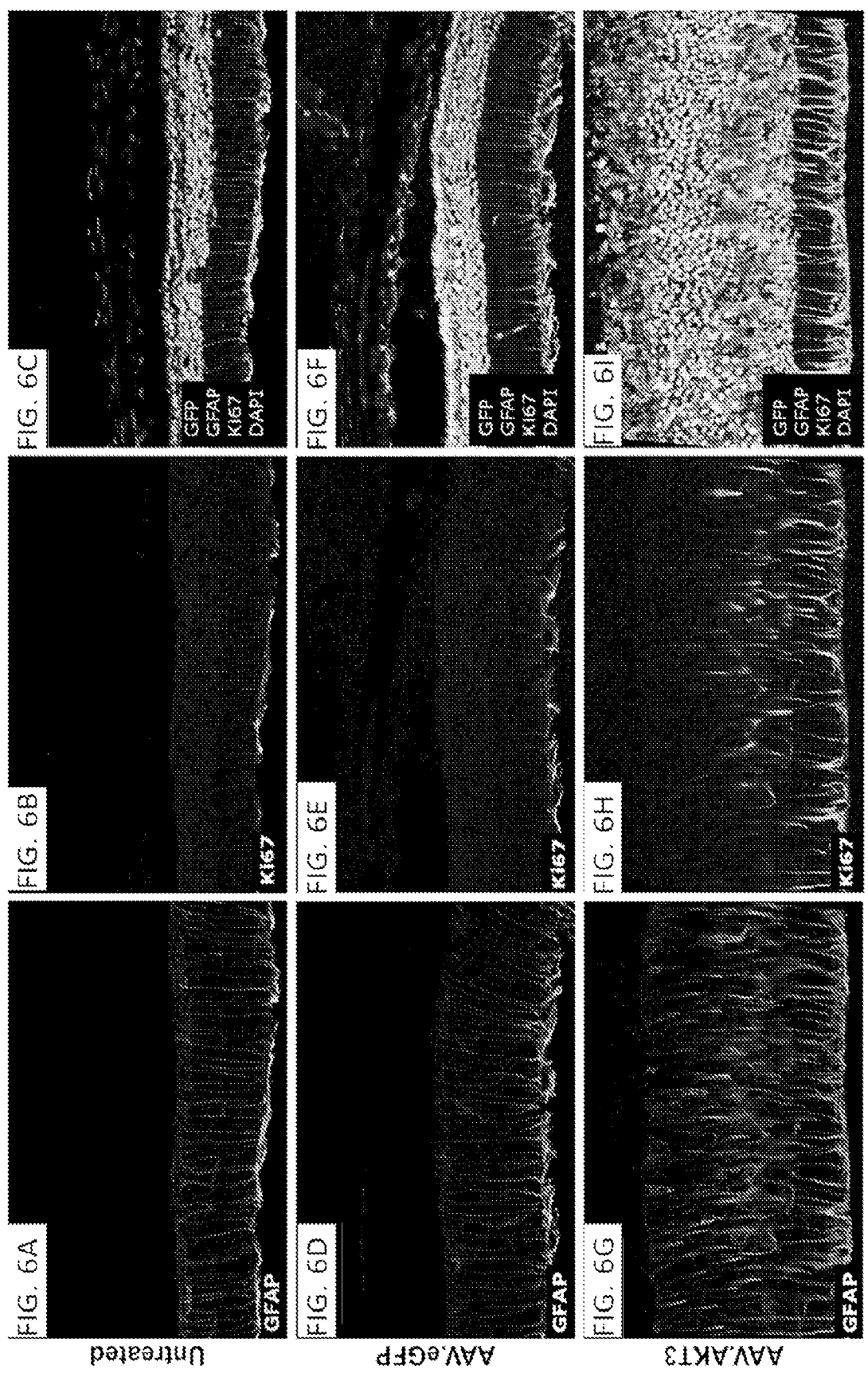

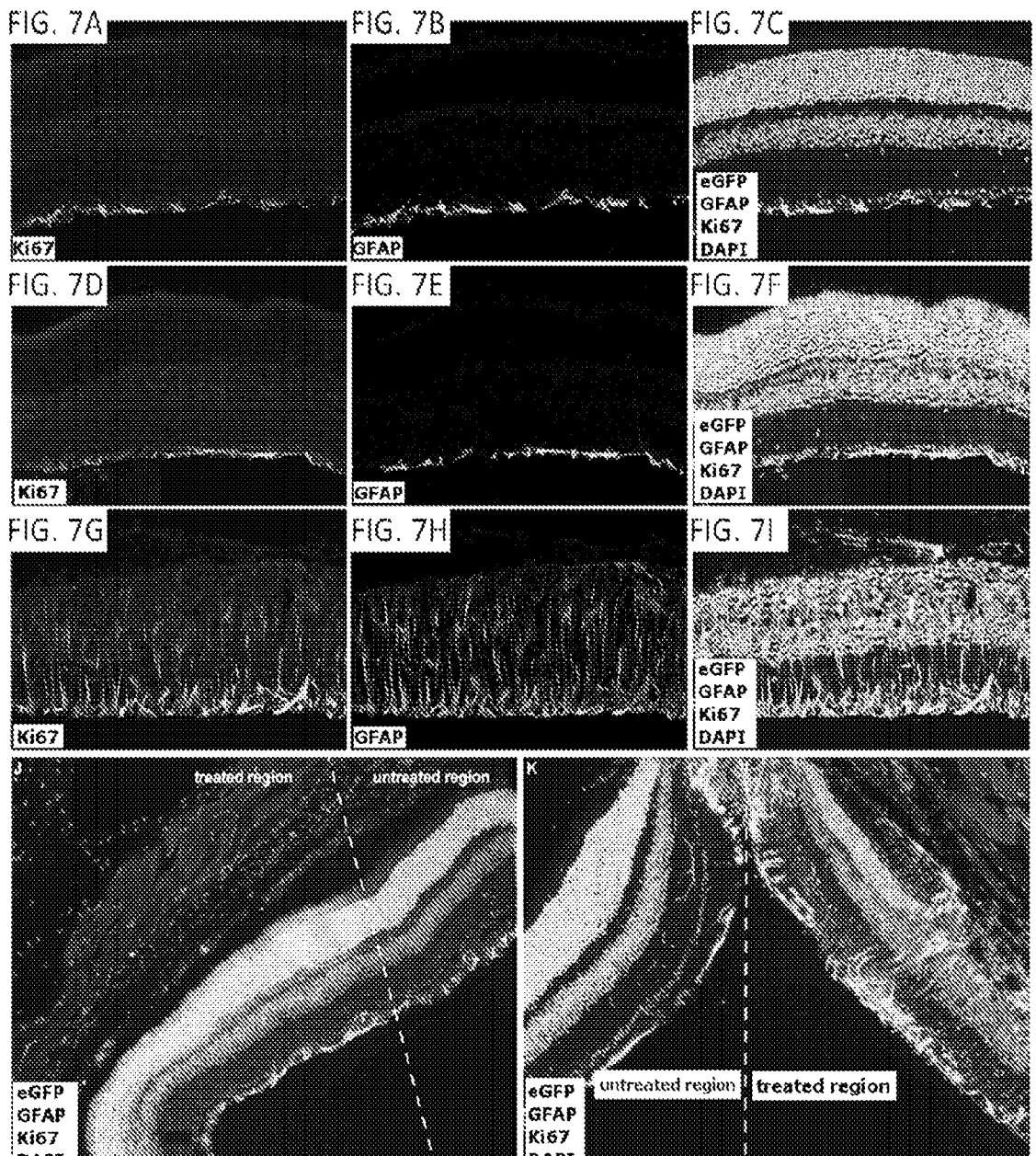

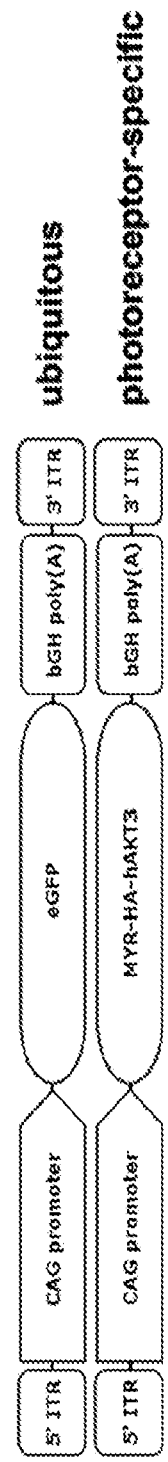
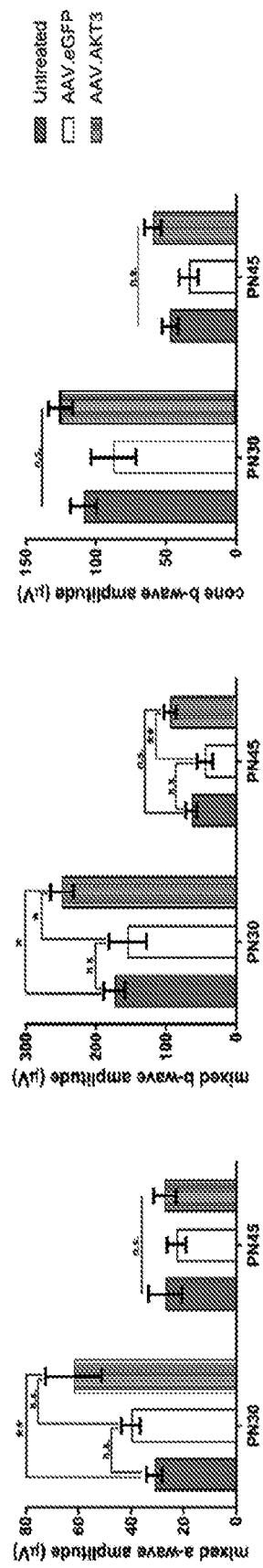
FIG. 8A
FIG. 8B
FIG. 8C
FIG. 8D

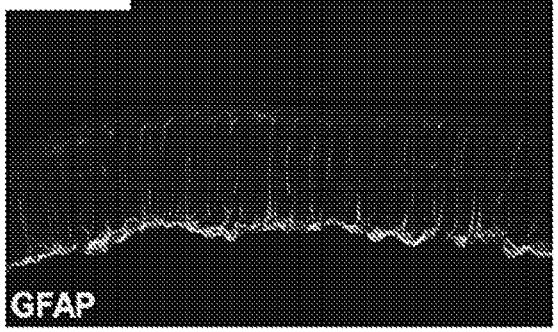
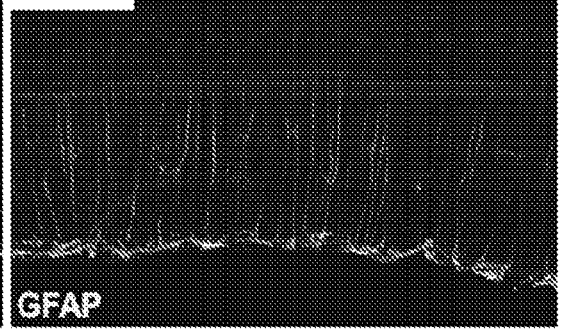
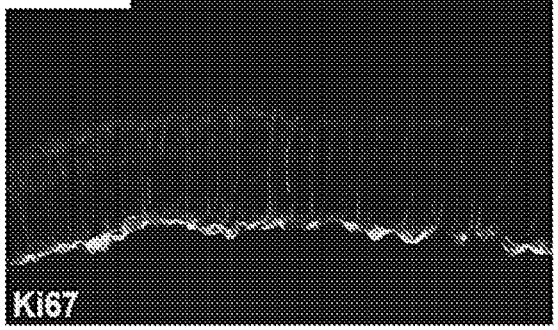
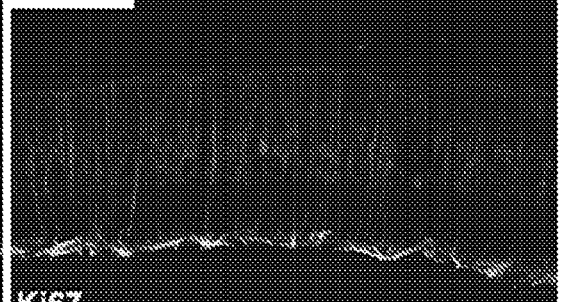
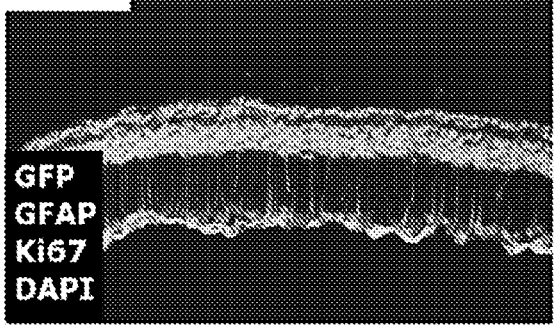
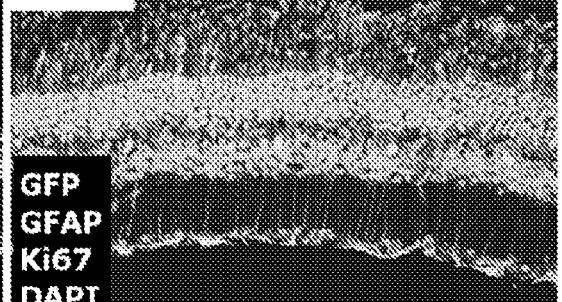
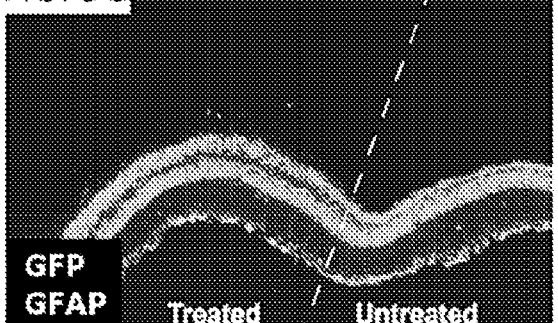
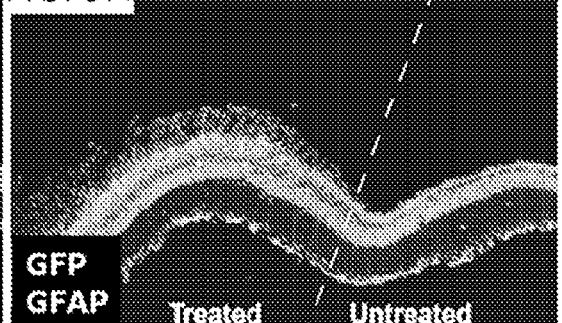

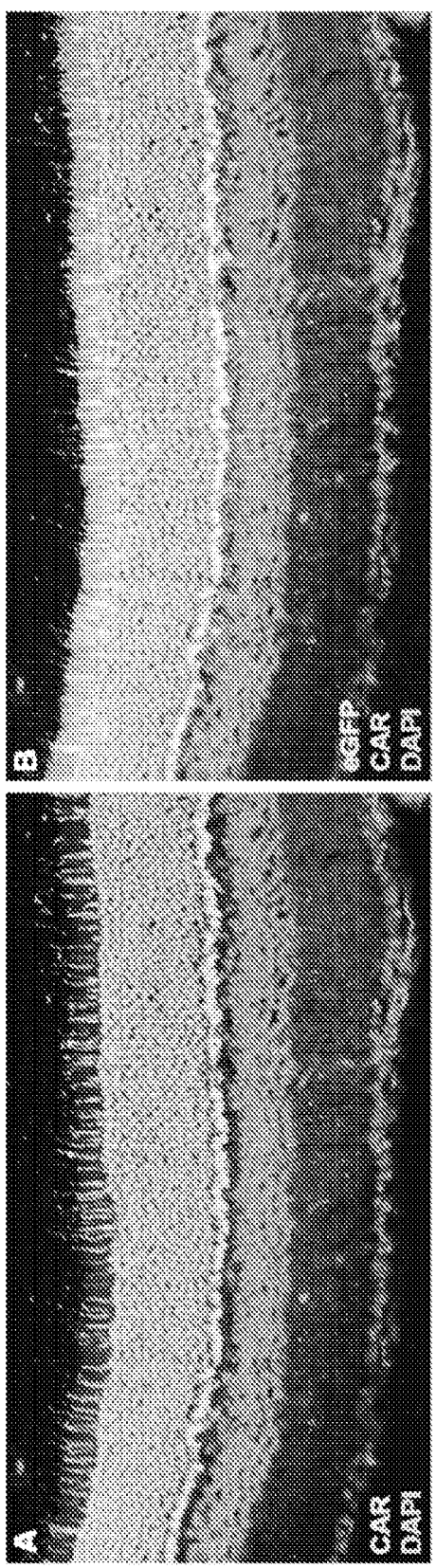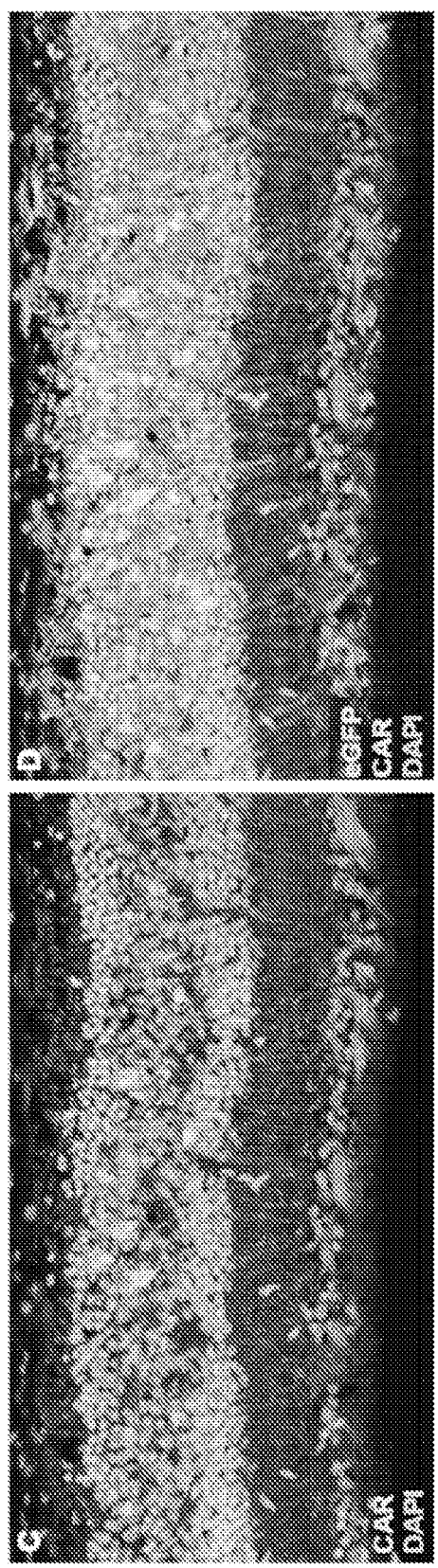
FIG. 11A FIG. 11B FIG. 11C FIG. 11D

FIG. 15A

```
optAKT   ATGAGCGACGTGACCATTGTGAAGGAAGGCTGGGTGCAGAAGCGGGGAGAGTACATCAAG   60
hAKT     atgagcgatgttaccattgtgaaagaaggttgggttcagaagaggggagaatatataaaa   60
         ********  *  **********  *  *  ** ** optAKT   AACTGGAGGCCTCGGTACTTTCTGCTTAAGACCGATGGCTCCTTTATCGGTTACAAGGAA   120
hAKT     aactggaggccaagatacttcctttttgaagacagatggctcattcataggatataaagag   120
         ***********   * ***** *  * ***  ****       ** optAKT   AAGCCGCAGGACGTGGACCTTCCGTACCCTCTGAACAACTTCTCCGTGGCAAAGTGTCAG   180
hAKT     aaacctcaagatgtggatttacccttatcccctcaacaactttttcagtggcaaaatgccag   180
              *****    *    * ******   ******   *** optAKT   CTTATGAAAACCGAACGCCCCAAGCCGAACACGTTTATCATTCGATGCCTGCAGTGGACC   240
hAKT     ttaatgaaaacagaacgaccaaagccaaacacatttataatcagatgtctccagtggact   240
         *  ******* *   ** *  *   ****   * ******** optAKT   ACCGTGATTGAACGGACCTTCCATGTGGATACCCCAGAGGAGAGAGAAGAGTGGACAGAA   300
hAKT     actgttatagagagaacatttcatgtagatactccagaggaaagggaagaatggacagaa   300
               * *** * * *****  *  *** ****** optAKT   GCCATCCAGGCAGTGGCTGATCGGCTGCAGAGACAGGAAGAGGAACGGATGAACTGCTCA   360
hAKT     gctatccaggctgtagcagacagactgcagaggcaagaagaggagagaatgaattgtagt   360
          *****     * *********  *   ***    * *** optAKT   CCCACTTCACAAATCGACAATATCGGAGAGGAGGAGATGGACGCCAGCACCACCCACCAC   420
hAKT     ccaacttcacaaattgataatataggagaggaagagatggatgcctctacaacccatcat   420
          *******  ***  ****  *** * optAKT   AAGAGAAAGACCATGAACGACTTCGACTACCTGAAGCTCCTGGGCAAAGGGACCTTCGGA   480
hAKT     aaaagaaagacaatgaatgatttttgactatttgaaactactaggtaaaggcactttggg   480
          ***** *   *  *  ****   *** *  * optAKT   AAGGTCATCCTGGTCCGGGAAAAGGCCTCCGGAAAGTACTACGCCATGAAGATCCTGAAG   540
hAKT     aaagttatttttggttcgagagaaggcaagtggaaaatactatgctatgaagattctgaag   540
                  *   ** *  ******  *** optAKT   AAGGAGGTCATCATTGCCAAGGACGAAGTGGCCCACACTCTGACTGAGTCCAGGGTCCTC   600
hAKT     aaagaagtcattattgcaaaggatgaagtggcacacactctaactgaaagcagagtatta   600
           *** * * ***     ***       * optAKT   AAGAACACTCGGCACCCCTTCCTCACCTCGCTGAAGTACAGCTTCCAAACCAAGGATAGA   660
hAKT     aagaacactagacatccttttttaacatccttgaaatattccttccagacaaaagaccgt   660
         *********  *  ***  *       * *     **   * optAKT   CTGTGCTTCGTGATGGAATACGTCAACGGAGGGGAGCTGTTCTTCCACCTTTCCCGCGAA   720
hAKT     ttgtgttttgtgatggaatatgttaatgggggcgagctgtttttccatttgtcgagagag   720
         * *  *********    ** *  *****   ** *   * **  * ** optAKT   CGGGTGTTCTCAGAAGATCGCACCCGGTTCTACGGTGCCGAGATTGTTTCCGCGTTGGAC   780
hAKT     cgggtgttctctgaggaccgcacacgtttctatgctgcagaaattgtctctgcttggac   780
         ***********   *  *  ****     **    **** optAKT   TACCTCCACTCGGGAAAGATCGTGTACCGGGACCTGAAGCTGGAAAACCTCATGCTCGAC   840
hAKT     tatctacattccggaaagattgtgtaccgtgatctcaagttggagaatctaatgctggac   840
         ** ** **  ** ******** ********  ** ** ** ***  ** ** ***** ***
```

FIG. 15B

```
optAKT  AAGGATGGCCACATCAAGATCACCGACTTCGGCCTGTGCAAGGAAGGGATCACTGACGCG   900
hAKT    aaagatggccacataaaaattacagattttggactttgcaaagaagggatcacagatgca   900
         *******       * *******  ** optAKT  GCAACTATGAAAACCTTCTGTGGCACCCCTGAATACCTCGCGCCGGAAGTGCTGGAGGAT   960
hAKT    gccaccatgaagacattctgtggcactccagaatatctggcaccagaggtgttagaagat   960
          ***  ********   ***     *  * **** optAKT  AACGACTATGGACGCGCTGTGGATTGGTGGGGCCTGGGAGTCGTGATGTACGAGATGATG   1020
hAKT    aatgactatggccgagcagtagactggtggggcctaggggttgtcatgtatgaaatgatg   1020
         ****     *******     **  ****** optAKT  TGCGGACGCTTGCCCTTCTACAACCAGGACCACGAGAAGCTGTTCGAATTGATCCTGATG   1080
hAKT    tgtgggaggttacctttctacaaccaggaccatgagaaactttttgaattaatattaatg   1080
            *   **************** *** *  * ***  * *** optAKT  GAGGATATCAAGTTCCCGCGCACTCTGTCGTCCGACGCTAAAAGCCTGCTGAGCGGACTG   1140
hAKT    gaagacattaaatttcctcgaacactctcttcagatgcaaaatcattgctttcagggctc   1140
               * *      **   * optAKT  CTGATCAAGGACCCTAACAAGCGCCTCGGAGGTGGTCCTGACGATGCCAAGGAGATTATG   1200
hAKT    ttgataaaggatccaaatacaacgccttggtggaggaccagatgatgcaaaagaaattatg   1200
        **** * **  **  *  *  **  *    **   **** optAKT  CGGCACTCCTTCTTCTCGGGCGTGAATTGGCAGGATGTGTACGACAAGAAGCTCGTGCCG   1260
hAKT    agacacagtttcttctctggagtaaactggcaagatgtatatgataaaaagcttgtacct   1260
        * *   ******  *   ***  *    **   * optAKT  CCATTCAAGCCCCAAGTCACTTCCGAAACGGACACTCGGTACTTCGACGAGGAGTTCACC   1320
hAKT    ccttttaaacctcaagtaacatctgagacagatactagatattttgatgaagaatttaca   1320
        **  *    * **  * ** * **  * *   * *   * optAKT  GCCCAAACCATCACTATTACCCCCCCCGAGAAATACGACGAGGATGGGATGGACTGCATG   1380
hAKT    gctcagactattacaataacaccacctgaaaaatatgatgaggatggtatggactgcatg   1380
                  ***  ******* ********* optAKT  GACAACGAACGCCGGCCACATTTTCCGGCAATTCTCCTATTCTGCCTCCGGAAGGGAGTGA  1440
hAKT    gacaatgagaggcggccgcatttccctcaattttcctactctgcaagtggacgagaataa   1440
        ***** ** *  ***** *****  * **** ** ** **** ** **    * *  *
```

Percent Identity Matrix - created by Clustal2.1

FIG. 15C

```
1: optAKT    100.00   75.35
2: hAKT      75.35    100.00
```

NEUROPROTECTIVE GENE THERAPY TARGETING THE AKT PATHWAY

CROSS-REFERENCE TO RELATED APPLICATIONS

This application is a National Stage Entry under 35 U.S.C. 371 of International Patent Application No. PCT/US2020/020832, filed Mar. 3, 2020, which claims priority to U.S. Provisional Patent Application No. 62/821,705, filed Mar. 21, 2019, and U.S. Provisional Patent Application No. 62/813,587, filed Mar. 4, 2019, which are incorporated herein by reference.

BACKGROUND OF THE INVENTION

Retinitis pigmentosa (RP) is a collection of inherited retinal dystrophies affecting an estimated 1 in 3000-7000 individuals globally. Clinical onset is characterized by impairments in scotopic (night) vision coinciding with the malfunction and then death of rod photoreceptors. As this process expands, it destroys peripheral vision and culminates in total blindness due to degeneration of cone photoreceptors in the central retina. In many cases, this phenotype results from a null mutation within genes essential for rod photo-transduction, structure or homeostasis, providing a direct explanation for the loss of this photoreceptor subtype. However, these mutations typically do not account for the gradual deterioration of cones in later stage disease.

What is needed are treatments for RP and other ocular disorder-associated retinal degeneration in subjects in need thereof.

SUMMARY OF THE INVENTION

The invention is illustrated by the examples below which demonstrate that delivery of vectors for expression of AKT promote dramatic preservation of photoreceptor numbers, structure, and visual function.

In one aspect, an adeno-associated virus (AAV) vector comprising an AAV capsid having encapsidated therein a vector genome comprising AAV inverted terminal repeat (ITR) sequences, a human protein kinase B (AKT) coding sequence, and expression control sequences that direct expression of AKT in a host cell. In one embodiment the AKT coding sequence comprises an AKT1, AKT2, or AKT3 coding sequence. In one embodiment, the coding sequence is SEQ ID NO: 9.

In another aspect, a pharmaceutical composition is provided which comprising a pharmaceutically acceptable carrier and a least an AAV vector which comprises an AKT sequence as described herein.

In another aspect, a method for treating retinal degeneration is provided. The method includes administering an AAV vector as described herein to a subject in need thereof. In one embodiment, the AAV vector is administered subretinally or intravitreally.

In another aspect, a plasmid for producing an AAV vector is provided. In certain embodiments, the plasmid comprising nt 1253 to 5070 of SEQ ID NO: 1 or nt 1253 to 3868 of SEQ ID NO: 3, or a sequence sharing at least 80% identity thereto.

In yet another aspect, a method of generating a recombinant AAV (rAAV) is provided. The method includes culturing a packaging cell comprising nt 1253 to 5070 of SEQ ID NO: 1 or nt 1253 to 3868 of SEQ ID NO: 3 in the presence of sufficient viral sequences to permit packaging of the gene expression cassette viral genome into an infectious AAV envelope or capsid.

In another aspect, a viral vector is provided which includes a vector genome comprising nt 1253 to 5070 of SEQ ID NO: 1 or nt 1253 to 3868 of SEQ ID NO: 3

In another aspect, a viral vector includes a vector genome comprising a 5' ITR, a CMV enhancer, a chicken beta-actin promoter, a Kozak sequence, an AKT coding, a bGH poly A, and a 3' ITR.

In another aspect, a viral vector includes a vector genome comprising a 5' ITR, a GRK1 promoter, a SV40 intron, a Kozak sequence, an AKT coding sequence, a bGH poly A, and a 3' ITR.

In another aspect, a composition is provided for use in a method for treating retinal degeneration, wherein the composition included an AAV vector as provide herein.

Still other aspects and advantages of the invention will be apparent from the following detailed description of the invention.

BRIEF DESCRIPTION OF THE FIGURES

FIG. 1A-FIG. 1H show the design and characterization of AAV7m8 vectors. (FIG. 1A) Outline of vector expression cassettes. (FIG. 1B) Quantification of Rheb mRNA and (FIG. 1C) AKT3 mRNA expression following transduction of 84-31 cells compared to untreated controls. Data represented as mean±SD (N=3). ****P<0.0001. (FIG. 1D) Representative fundus image of mouse retina following subretinal delivery of AAV7m8.eGFP ($2\times10^9$ vg). (FIG. 1E) Retinal tropism of AAV7m8 following subretinal injection. PN45$^{rd10}$ retinal flatmounts stained with antibodies directed against AKT that were (FIG. 1F) untreated and (FIG. 1G-FIG. 1H) co-injected with AAV.AKT3 ($1\times10^9$ vg) and AAV.eGFP ($1\times10^9$ vg).

FIG. 2A-FIG. 2G show caRheb augmentation fails to attenuate photoreceptor degeneration. (FIG. 2A) Pde6brd10 retinal cross-sections at PN45 after subretinal injection with AAV.eGFP or AAV.caRheb (plus AAV.eGFP) at PN13-14. (FIG. 2B) Quantification of total ONL thickness of Pde6brd10 retina treated with AAV.eGFP, AAV.caRheb/AAV.eGFP, or untreated. (FIG. 2C) Quantification of GFP+ ONL cells per 200 µm from eyes treated with AAV.eGFP alone ($2\times10^9$ vg) or co-injection with AAV.eGFP ($1\times10^9$ vg) and AAV.caRheb ($1\times10^9$ vg). (FIG. 2D) Opto-kinetic reflex (OKR) right/left ratio to assess visual acuity. Electroretinogram (ERG) measurements of the (FIG. 2E) mixed rod-cone A-wave amplitude, (FIG. 2F) mixed rod-cone B-wave amplitude, and (FIG. 2G) cone B707 wave amplitude for the different treatments. Data represent mean±SEM. Index indicated as the numerical values within the data bars.

(FIG. 3C) Co-localization with eGFP. Representative images of an (FIG. 3D untreated Rd10 retina at PN30 and (FIG. 3E) treated with AAV.AKT3/AAV.eGFP stained with antibodies directed against cone arrestin (CAR). (FIG. 3F) Co-localization with eGFP. (FIG. 3G) Representative image of the transitional region between untreated portion of the retina and subretinal bleb at PN45. (FIG. 3H) Quantification of ONL thickness between treatment groups at PN30 and PN45. Data represented as mean±SEM. P<0.01; *P<0.001; ****P<0.0001; n.s. (non-significant).

(FIG. 4A) Evaluation of mixed rod-cone a-wave amplitudes between untreated, AAV.eGFP, and AAV.AKT3 treated retina. (FIG. 4B) Assessment of mixed rod cone b-wave amplitudes between treatments. (FIG. 4C) Photopic (cone) b-wave amplitudes between treatment groups. (FIG. 4D) Right/left eye ratio of visual acuity examined by optokinetic response (OKR). Right eyes were treated with AAV7m8.eGFP alone ($2\times10^9$ vg) or in combination with AAV.AKT3 while left eyes were untreated. Data represent mean±SEM. *P<0.05; ***P<0.001. Index indicated by numerical values within bars.

FIG. 5A-FIG. 5H show AKT3-induced neuroprotection is associated with mTOR activation. (FIG. 5A) Representative image of Rd10 retina treated with AAV.AKT3/AAV.eGFP and stained with antibodies directed against the mTORC2 activation marker, phospho-AKTSer. (FIG. 5B) Co-localization with eGFP marking the region of subretinal delivery. (FIG. 5C) Higher magnification of AAV.AKT3/AAV.eGFP transduced section stained with mTORC2 marker. (FIG. 5D) Pde6brd10 retina treated with AAV.eGFP alone and stained with the mTORC2 marker. (FIG. 5E) Representative image of a Pde6brd10 retina treated with AAV.AKT3/AAV.eGFP and stained for the canonical mTORC1 activation marker, phospho-S6Ser240/244. (FIG. 5F) Co-localization with eGFP. (FIG. 5G) Higher magnification of AAV.AKT3/AAV.eGFP transduced section stained with mTORC1 marker. (FIG. 5H) Pde6brd10 retina treated with AAV.eGFP alone and stained with the mTORC1 marker.

FIG. 6A-FIG. 6I show AKT3 overexpression does not breach photoreceptor quiescence but activates muller cells. Representative images of Pde6brd10 retinal cross-sections that were (FIG. 6A-FIG. 6C) untreated, (FIG. 6D-FIG. 6F) treated with AAV7m8.eGFP alone ($2\times10^9$ vg), or (FIG. 6G-FIG. 6I) co-injected with AAV7m8.AKT3 ($1\times10^9$ vg) and AAV7m8.eGFP ($1\times10^9$ vg). Sections are stained with antibodies directed against GFAP (muller cell marker) and Ki67 (cell proliferation marker).

FIG. 7A-FIG. 7K show long-term AKT3 gene transfer stimulates chronic Müller cell gliosis in the wild-type retina. Representative micrographs of a wild-type retina (FIG. 7A-FIG. 7C) untreated, (FIG. 7D-FIG. 7F) treated with AAV7m8.eGFP ($2\times10^9$ vg), and (FIG. 7G-FIG. 7I) co-injected with AAV7m8.AKT3 ($1\times10^9$ vg) and AAV7m8.eGFP ($1\times10^9$ vg) at PN125. Sections are stained with antibodies directed against Ki67 and GFAP. (FIG. 7J) Transitional zone between untreated and AAV.eGFP treated retinal sections. (FIG. 7K) Transitional zone between untreated and AAV.AKT3/AAV.eGFP treated regions.

FIG. 8A-FIG. 8F show photoreceptor-specific expression of AKT3 mediates neuroprotection in the Pde6b$^{rd10}$ retina. (FIG. 8A) Depiction of vector expression cassettes. The AKT3 transgene is regulated by the photoreceptor-specific GRK1 promoter. Quantification of ERG responses for the (FIG. 8B) mixed a-wave, (FIG. 8C) mixed b-wave, and (FIG. 8D) cone b-wave between treatment groups. (FIG. 8E) Representative cross-section of a PN45 Pde6brd10 treated with AAV7m8.GRK1.AKT3 ($1\times10^9$ vg). Photoreceptor-specific expression of AKT3 labeled with AKT antibodies. (FIG. 8F) Quantification of ONL thickness at PN45 between treatment groups. Data represented as mean±SEM. *P<0.05, P<0.01, *P<0.001, ****P<0.0001.

FIG. 9A-FIG. 9H show AAV.GRK1.AKT3 does not stimulate reactive gliosis in the Pde6brd10 retina. (FIG. 9A-FIG. 9C) Representative images of an untreated mouse retina at PN45 stained with canonical markers for müller cells (GFAP) and cell proliferation (Ki67). (FIG. 9D-FIG. 9F) Representative micrographs of a PN45 Pde6b$^{rd10}$ retina co-treated with AAV7m8.GRK1.AKT3 ($1\times10^9$ vg) and AAV7m8.eGFP ($1\times10^9$ vg). (FIG. 9G) Transitional region between untreated and injected portions of the Pde6brd10 retina and (FIG. 9H) co-localization with the eGFP tracer.

(FIG. 10A) Western blot evaluating expression of pS6$^{Ser240/244}$, S6, and GAPDH (loading control) from untreated 84-31 cells or treated with AAV.eGFP or AAV.caRheb. Numerical values indicate biological replicates for each treatment condition. (FIG. 10B) Representative micrographs of retinal sections injected with AAV7m8.eGFP alone ($2\times10^9$ vg) (top panels) or co-injected with AAV7m8.caRheb ($1\times10^9$ vg) and AAV7m8.eGFP ($1\times10^9$ vg) (bottom panels) and stained with antibodies directed against pS6$^{Ser240/244}$.

FIG. 11A-FIG. 11D show long-term AKT3 gene transfer leads to retinal disorganization in wild-type animals. C57Bl/6 (wild-type) mice received subretinal injection at PN13. (FIG. 11A-FIG. 11B) Retinal histology at PN125 reveals normal photoreceptor structure in animals treated with AAV7m8.eGFP alone ($2\times10^9$ vg). (FIG. 11C-FIG. 11D) Animals co-injected with AAV7m8.eGFP ($1\times10^9$ vg) in combination with AAV7m8.AKT3 ($1\times10^9$ vg) display extensive disorganization of retinal layers and loss of photoreceptor numbers and structure.

FIG. 15A and FIG. 15B show an alignment of hAKT3 native (SEQ ID NO: 7) and hAKTopt (SEQ ID NO: 13) sequences, and FIG. 15C shows the percent identity matrix for the alignment.

DETAILED DESCRIPTION OF THE INVENTION

Figures 1F, 1G, 1H:
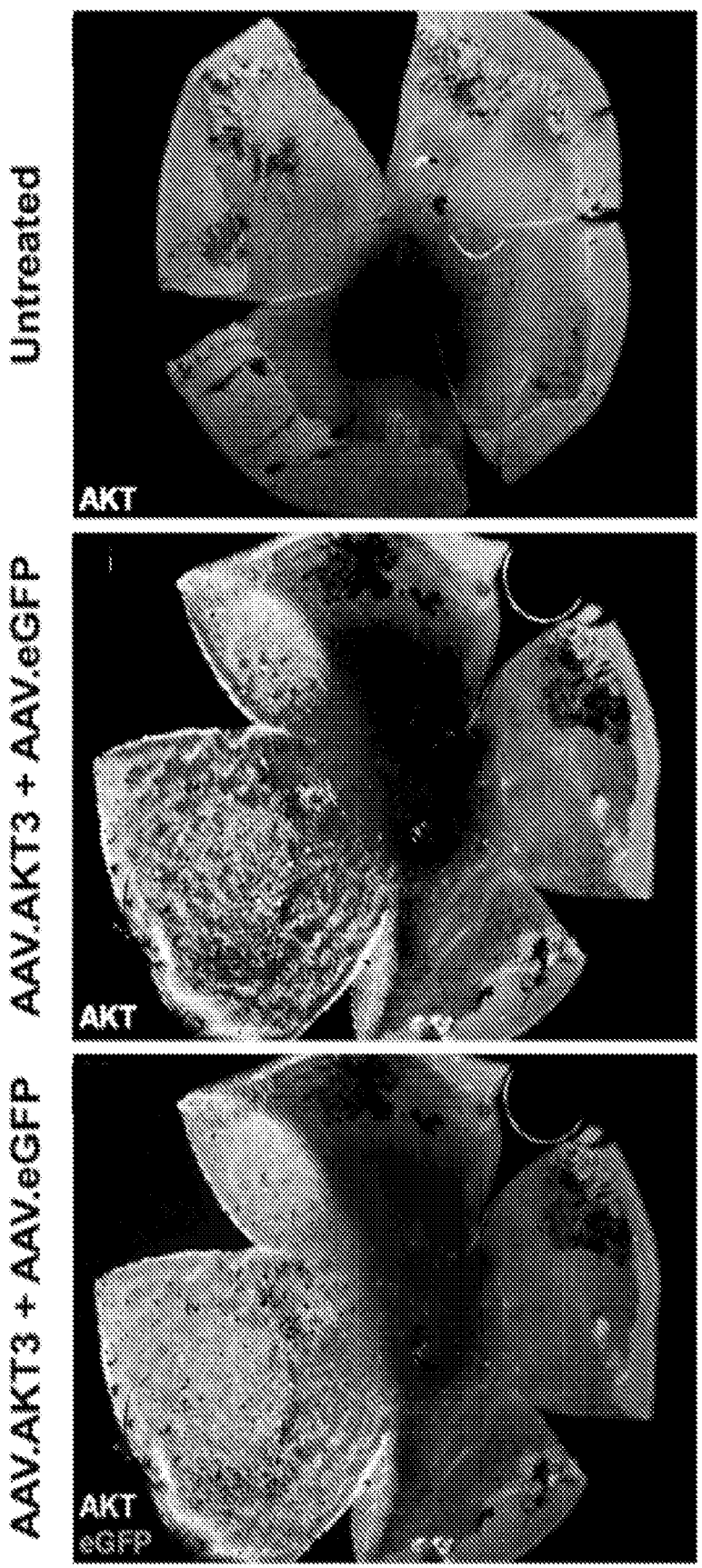

Recombinant, replication-defective adeno-associated virus (rAAV) vectors having an AAV capsid and compositions containing the same for delivery of a nucleic acid sequence encoding human protein kinase B (AKT) are described herein. Also provided are uses of these compositions for treatment of ocular disorders.

As described below, stimulation of the mTOR signaling pathway using a conventional gene augmentation strategy delays photoreceptor death and preserves visual function in a pre-clinical model of inherited vision loss. Protein kinase B, also called AKT1 or RAC-alpha serine/threonine-protein kinase, is responsible for cell survival and biosynthetic responses via phosphorylation of diverse protein targets including p53, FoxO/FH transcription factors, and CREB. AKT is made up of 3 closely related serine/threonine-protein kinases (AKT1, AKT2, and AKT3) called the AKT kinase, which regulate many cellular processes including metabolism, proliferation, survival, growth, and angiogenesis.

As used herein, the term "AKT" refers to AKT1, AKT2, or AKT3. The term "hAKT" refers to a coding sequence for a human AKT. In certain embodiments, AKT refers to AKT1. In certain embodiments, AKT refers to AKT2. In certain embodiments, AKT refers to AKT3. Further, the term AKT is used herein to refer to the protein or the nucleic acid encoding the protein. The hAKT1 nucleic acid sequence can be found in SEQ ID NO: 9. The hAKT1 amino acid sequence can be found in SEQ ID NO: 10. The hAKT2 nucleic acid sequence can be found in SEQ ID NO: 11. The hAKT2 amino acid sequence can be found in SEQ ID NO: 12. The hAKT3 nucleic acid sequence can be found in SEQ ID NO: 7. The hAKT3 amino acid sequence can be found in SEQ ID NO: 8. In certain embodiments, the hAKT coding sequence is an engineered sequence, such as the hAKT3 coding sequence found in SEQ ID NO: 13 (sometimes referred to as "hAKTopt").

Provided herein are nucleic acid sequences encoding hAKT. In one embodiment, a nucleic acid is provided which encodes the hAKT1 amino acid sequence found in SEQ ID NO: 10. In another embodiment, a nucleic acid is provided which encodes the amino acid sequence found in SEQ ID NO: 12. In yet another embodiment, a nucleic acid sequence is provided which encodes the hAKT3 amino sequence found in SEQ ID NO: 8. Other isoforms of AKT are known in the art, and are useful herein/

Described herein are compositions and methods for delivering a nucleic acid encoding human protein kinase B (AKT) to mammalian subjects for the treatment of ocular disorders, and retinal degeneration associated therewith. In certain embodiments, such compositions include an engineered AKT coding sequence, such as that provided in SEQ ID NO: 13. It is anticipated that this optimization of the transgene cassette will maximize the level of production of the experimental protein compared to levels that can be generated using the native sequence. However, also encompassed herein are compositions which include the native AKT1, AKT2, or AKT3 coding sequences, as provided in SEQ ID NO: 9, SEQ ID NO: 11, and SEQ ID NO: 7, respectively. It is to be understood that when an embodiment is described for any of AKT1, AKT2, and AKT3, a similar embodiment is intended to be recited for the others.

Technical and scientific terms used herein have the same meaning as commonly understood by one of ordinary skill in the art to which this invention belongs and by reference to published texts, which provide one skilled in the art with a general guide to many of the terms used in the present application. The definitions contained in this specification are provided for clarity in describing the components and compositions herein and are not intended to limit the claimed invention.

As used herein, the term "subject" as used herein means a mammalian animal, including a human, a veterinary or farm animal, a domestic animal or pet, and animals normally used for clinical research. In one embodiment, the subject of these methods and compositions is a human. Still other suitable subjects include, without limitation, murine, rat, canine, feline, porcine, bovine, ovine, non-human primate and others. As used herein, the term "subject" is used interchangeably with "patient".

In one embodiment, the subject is a child, i.e., under the age of 18 years old. In another embodiment, the subject is a young child, i.e., 8 years old or less. In another embodiment, the subject is a toddler, i.e., 3 years old or less. In yet another embodiment, the subject is an infant, i.e., 1 year of age or less. In yet another embodiment, the subject is a newborn or neonate, i.e., one month of age or less. In another embodiment, the subject is an adult, i.e., age or older. In yet another embodiment, the subject is an older adult, i.e., 35, 40, 45, 50, 55, 60, 65, 70, 75, 80, 85 years of age or older.

In certain embodiments of this invention, a subject has an "ocular disorder", which the components, compositions, and methods of this invention are designed to treat. In certain embodiments, the subject has retinal degeneration, or is at risk of retinal degeneration, which may or may not be associated with an ocular disorder. As used herein "ocular disorder" includes cone-rod dystrophies and retinal diseases including, without limitation, Stargardt disease (autosomal dominant or autosomal recessive), retinitis pigmentosa, and pattern dystrophy. In one embodiment, the subject has retinitis pigmentosa. In one embodiment, the subject has achromatopsia. In another embodiment, the subject has choroideremia or an X-linked hereditary retinal degeneration. In another embodiment, the subject has retinal degeneration associated with an ocular disorder. In another embodiment, the subject has retinal degeneration not associated with an ocular disorder. Clinical signs of such ocular diseases include, but are not limited to, decreased peripheral vision, decreased central (reading) vision, decreased night vision, loss of color perception, reduction in visual acuity, decreased photoreceptor function, pigmentary changes, and ultimately blindness.

Retinal degeneration is a retinopathy which consists in the deterioration of the retina caused by the progressive death of its cells. There are several reasons for retinal degeneration, including artery or vein occlusion, diabetic retinopathy, R.L.F./R.O.P. (retrolental fibroplasia/retinopathy of prematurity), or disease (usually hereditary). Signs and symptoms of retinal degeneration include, without limitation, impaired vision, night blindness, retinal detachment, light sensitivity, tunnel vision, and loss of peripheral vision to total loss of vision. Retinal degeneration and remodeling encompasses a group of pathologies at the molecular, cellular, and tissue levels that are initiated by inherited retinal diseases like retinitis pigmentosa (RP), genetic, and environmental diseases such as age-related macular degeneration (AMD) and other insults to the eye/retina including trauma and retinal detachment. These retinal changes and apparent plasticity result in neuronal rewiring and reprogramming events that include alterations in gene expression, de novo neuritogenesis as well as formation of novel synapses, creating corruptive circuitry in bipolar cells through alterations in the dendritic tree and supernumerary axonal growth. In addition, neuronal migration occurs throughout the vertical axis of the retina along Müller cell columns showing altered metabolic signals, and the retinal pigment epithelium (RPE) invades the retina forming the pigmented bone spicules that have been classic clinical observations of RP diseases (See, e.g., Retinal Degeneration, Remodeling and Plasticity by Bryan William Jones, Robert E. Marc and Rebecca L. Pfeiffer).

As used herein, the term "treatment" refers to any method used that imparts a benefit to the subject, i.e., which can alleviate, delay onset, reduce severity or incidence, or yield prophylaxis of one or more symptoms or aspects of an ocular disease, disorder, or condition. For the purposes of the present invention, treatment can be administered before, during, and/or after the onset of symptoms. In certain embodiments, treatment occurs after the subject has received conventional therapy. As used herein, the term "treating" includes abrogating, substantially inhibiting, slowing, or reversing the progression of a condition, substantially ameliorating clinical or aesthetical symptoms of a condition, or substantially preventing the appearance of clinical or aesthetical symptoms of a condition, or decreasing the severity and/or frequency of one or more symptoms resulting from an ocular disease, disorder, or condition.

The term "exogenous" as used herein in reference to a nucleic acid or amino acid sequence or protein means that the nucleic acid or amino acid sequence or protein does not naturally occur in the position in which it exists in a chromosome or host cell. An exogenous nucleic acid sequence also refers to a sequence derived from and inserted into the same host cell or subject, but which is present in a non-natural state, e.g. a different copy number, or under the control of different regulatory elements.

The term "heterologous" as used to describe a nucleic acid sequence or protein means that the nucleic acid or protein was derived from a different organism or a different species of the same organism than the host cell or subject in which it is expressed. The term "heterologous" when used with reference to a protein or a nucleic acid in a plasmid, expression cassette, or vector, indicates that the protein or the nucleic acid is present with another sequence or subsequence with which the protein or nucleic acid in question is not found in the same relationship to in nature.

The terms "sequence identity" "percent sequence identity" or "percent identical" in the context of nucleic acid sequences refers to the residues in the two sequences which are the same when aligned for maximum correspondence. The length of sequence identity comparison may be over the full-length of the AKT coding sequence, or a fragment of at least about 100 to 150 nucleotides, or as desired. However, identity among smaller fragments, e.g. of at least about nine nucleotides, usually at least about 20 to 24 nucleotides, at least about 28 to 32 nucleotides, at least about 36 or more nucleotides, may also be desired. Multiple sequence alignment programs are also available for nucleic acid sequences. Examples of such programs include, "Clustal W", "CAP Sequence Assembly", "BLAST", "MAP", and "MEME", which are accessible through Web Servers on the internet. Other sources for such programs are known to those of skill in the art. Alternatively, Vector NTI utilities are also used. There are also a number of algorithms known in the art that can be used to measure nucleotide sequence identity, including those contained in the programs described above. As another example, polynucleotide sequences can be compared using Fasta™, a program in GCG Version 6.1. Commonly available sequence analysis software, more specifically, BLAST or analysis tools provided by public databases may also be used. Similarly, "percent sequence identity" and the like may be readily determined for amino acid sequences, over the full-length of a protein, or a fragment thereof. Suitably, a fragment is at least about 8 amino acids in length and may be up to about 450 amino acids.

The term "isolated" means that the material is removed from its original environment (e.g., the natural environment if it is naturally occurring). For example, a naturally-occurring polynucleotide or polypeptide present in a living animal is not isolated, but the same polynucleotide or polypeptide, separated from some or all of the coexisting materials in the natural system, is isolated, even if subsequently reintroduced into the natural system. Such polynucleotides could be part of a vector and/or such polynucleotides or polypeptides could be part of a composition, and still be isolated in that such vector or composition is not part of its natural environment.

By "engineered" is meant that a nucleic acid sequence encoding an AKT protein described herein that is assembled and placed into any suitable genetic element, e.g., naked DNA, phage, transposon, cosmid, episome, etc., which transfers the AKT sequence contained therein to a host cell, e.g., for generating non-viral delivery systems (e.g., RNA-based systems, naked DNA, or the like) or for generating viral vectors in a packaging host cell and/or for delivery to host cells in a subject. In one embodiment, the genetic element is a plasmid. The methods used to make such engineered constructs are known to those with skill in nucleic acid manipulation and include genetic engineering, recombinant engineering, and synthetic techniques. See, e.g., Green and Sambrook, Molecular Cloning: A Laboratory Manual, Cold Spring Harbor Press, Cold Spring Harbor, NY (2012).

The term "transgene" as used herein refers to an exogenous or engineered protein-encoding nucleic acid sequence that is under the control of a promoter or an expression control sequence in an expression cassette, rAAV genome, recombinant plasmid or production plasmid, vector, or host cell described in this specification. In certain embodiments, the transgene is a human protein kinase B (AKT) sequence, which encodes a functional AKT protein. In some embodiments, the transgene is a nucleic acid encoding the AKT amino acid sequence set forth in SEQ ID NO: 8. In certain embodiments, the transgene is encoded by the sequence set forth in SEQ ID NO: 7. In some embodiments, the transgene is a nucleic acid encoding the AKT amino acid sequence set forth in SEQ ID NO: 10. In certain embodiments, the transgene is encoded by the sequence set forth in SEQ ID NO: 9. In some embodiments, the transgene is a nucleic acid encoding the AKT amino acid sequence set forth in SEQ ID NO: 12. In certain embodiments, the transgene is encoded by the sequence set forth in SEQ ID NO: 11. In certain embodiments, the transgene is encoded by the sequence set forth in SEQ ID NO: 13. In certain embodiments, the transgene is an engineered AKT coding sequence which is a sequence sharing at least 70% identity with SEQ ID NO: 7, 9, 11, or 13. For example, SEQ ID NO: 13. shares about 75% identity with SEQ ID NO: 7 (See alignment and percent identity matrix provided in FIG. 15A-FIG. 15C). Further modifications to the native sequence, as described herein, are contemplated by the invention.

In one embodiment, the nucleic acid sequence encoding AKT further comprises a nucleic acid encoding a tag polypeptide covalently linked thereto. The tag polypeptide may be selected from known "epitope tags" including, without limitation, a myc tag polypeptide, a glutathione-S-transferase tag polypeptide, a green fluorescent protein tag polypeptide, a myc-pyruvate kinase tag polypeptide, a His6 tag polypeptide, an influenza virus hemagglutinin tag polypeptide, a flag tag polypeptide, myr (myristoylation) polypeptide, and a maltose binding protein tag polypeptide. In one embodiment, the nucleic acid sequence includes a MYR tag, as found in SEQ ID NO: 1 or SEQ ID NO: 3.

A "vector" as used herein is a nucleic acid molecule into which an exogenous or heterologous or engineered nucleic acid transgene may be inserted which can then be introduced into an appropriate host cell. Vectors preferably have one or more origin of replication, and one or more site into which the recombinant DNA can be inserted. Vectors often have convenient means by which cells with vectors can be selected from those without, e.g., they encode drug resistance genes. Common vectors include plasmids, viral genomes, and (primarily in yeast and bacteria) "artificial chromosomes." Certain plasmids are described herein.

"Virus vectors" are defined as replication defective viruses containing the exogenous or heterologous AKT nucleic acid transgene(s). In one embodiment, an expression cassette as described herein may be engineered onto a plasmid which is used for delivery to a host cell and/or for production of a viral vector. Suitable viral vectors are preferably replication defective and selected from amongst those which target ocular cells. Viral vectors may include any virus suitable for gene therapy, including but not limited to adenovirus; herpes virus; lentivirus; retrovirus; parvovirus, etc. However, for ease of understanding, the adeno-associated virus is referenced herein as an exemplary viral vector.

A "replication-defective virus" or "viral vector" refers to a synthetic or recombinant viral particle in which an expression cassette containing a gene of interest is packaged in a viral capsid or envelope, where any viral genomic sequences also packaged within the viral capsid or envelope are replication-deficient; i.e., they cannot generate progeny virions but retain the ability to infect target cells. In one embodiment, the genome of the viral vector does not include genes encoding the enzymes required to replicate (the genome can be engineered to be "gutless"—containing only the transgene of interest flanked by the signals required for amplification and packaging of the artificial genome), but these genes may be supplied during production. Therefore, it is deemed safe for use in gene therapy since replication and infection by progeny virions cannot occur except in the presence of the viral enzyme required for replication.

In still another embodiment, the expression cassette, including any of those described herein is employed to generate a recombinant AAV genome.

As used herein, the term "host cell" may refer to the packaging cell line in which a recombinant AAV is produced from a production plasmid. In the alternative, the term "host cell" may refer to any target cell in which expression of the transgene is desired. Thus, a "host cell," refers to a prokaryotic or eukaryotic cell that contains exogenous or heterologous DNA that has been introduced into the cell by any means, e.g., electroporation, calcium phosphate precipitation, microinjection, transformation, viral infection, transfection, liposome delivery, membrane fusion techniques, high velocity DNA-coated pellets, viral infection and protoplast fusion. In certain embodiments herein, the term "host cell" refers to cultures of ocular cells of various mammalian species for in vitro assessment of the compositions described herein. In yet other embodiments, the term "host cell" is intended to reference the ocular cells of the subject being treated in vivo for the ocular disease.

As used herein, the term "ocular cells" refers to any cell in, or associated with the function of, the eye. The term may refer to any one of photoreceptor cells, including rod photoreceptors, cone photoreceptors and photosensitive ganglion cells, retinal pigment epithelium (RPE) cells, Mueller cells, choroidal cells, bipolar cells, horizontal cells, and amacrine cells. In one embodiment, the ocular cells are the photoreceptor cells. In another embodiment, the ocular cells are RPE cells.

"Plasmids" generally are designated herein by a lower-case p preceded and/or followed by capital letters and/or numbers, in accordance with standard naming conventions that are familiar to those of skill in the art. Many plasmids and other cloning and expression vectors that can be used in accordance with the present invention are well known and readily available to those of skill in the art. Moreover, those of skill readily may construct any number of other plasmids suitable for use in the invention. The properties, construction and use of such plasmids, as well as other vectors, in the present invention will be readily apparent to those of skill from the present disclosure.

As used herein, the term "transcriptional control sequence" or "expression control sequence" refers to a DNA sequence, such as initiator sequence, enhancer sequence, or promoter sequence, which induces, represses, or otherwise controls the transcription of protein encoding nucleic acid sequences to which they are operably linked.

As used herein, the term "operably linked" or "operatively associated" refers to both expression control sequences that are contiguous with the nucleic acid sequence encoding AKT and/or expression control sequences that act in trans or at a distance to control the transcription and expression thereof.

The term "AAV" or "AAV serotype" as used herein refers to the dozens of naturally occurring and available adeno-associated viruses, as well as artificial AAVs. Among the AAVs isolated or engineered from human or non-human primates (NHP) and well characterized, human AAV2 is the first AAV that was developed as a gene transfer vector; it has been widely used for efficient gene transfer experiments in different target tissues and animal models. Unless otherwise specified, the AAV capsid, ITRs, and other selected AAV components described herein, may be readily selected from among any AAV, including, without limitation, AAV1, AAV2, AAV3, AAV4, AAV5, AAV6, AAV7, AAV8, AAV9, AAV8 bp, AAV7M8 and AAVAnc80, variants of any of the known or mentioned AAVs or AAVs yet to be discovered or variants or mixtures thereof. See, e.g., WO 2005/033321, which is incorporated herein by reference. In another embodiment, the AAV capsid is an AAV8 bp capsid, which preferentially targets bipolar cells. See, WO 2014/024282, which is incorporated herein by reference. In certain embodiments, the AAV capsid is an AAV7m8 capsid, which has shown preferential delivery to the outer retina. See, Dalkara et al, In Vivo-Directed Evolution of a New Adeno-Associated Virus for Therapeutic Outer Retinal Gene Delivery from the Vitreous, Sci Transl Med 5, 189ra76 (2013), which is incorporated herein by reference. In one embodiment, the AAV capsid is an AAV8 capsid. In another embodiment, the AAV capsid an AAV9 capsid. In another embodiment, the AAV capsid an AAV5 capsid. In another embodiment, the AAV capsid an AAV2 capsid.

As used herein, when referring to an AAV, the term variant means any AAV sequence which is derived from a known AAV sequence, including those sharing at least 70%, at least 75%, at least 80%, at least 85%, at least 90%, at least 95%, at least 97%, at least 99% or greater sequence identity over the amino acid or nucleic acid sequence. In another embodiment, the AAV capsid includes variants which may include up to about 10% variation from any described or known AAV capsid sequence. That is, the AAV capsid shares about 90% identity to about 99.9% identity, about 95% to about 99% identity or about 97% to about 98% identity to an AAV capsid provided herein and/or known in the art. In one embodiment, the AAV capsid shares at least 95% identity with an AAV capsid. When determining the percent identity of an AAV capsid, the comparison may be made over any of the variable proteins (e.g., vp1, vp2, or vp3). In one embodiment, the AAV capsid shares at least 95% identity with the AAV8 vp3. In another embodiments, the AAV capsid shares at least 95% identity with an AAV2 capsid. In another embodiment, a self-complementary AAV is used.

ITRs or other AAV components may be readily isolated or engineered using techniques available to those of skill in the art from an AAV. Such AAV may be isolated, engineered, or obtained from academic, commercial, or public sources (e.g., the American Type Culture Collection, Manassas, VA). Alternatively, the AAV sequences may be engineered through synthetic or other suitable means by reference to published sequences such as are available in the literature or in databases such as, e.g., GenBank, PubMed, or the like. AAV viruses may be engineered by conventional molecular biology techniques, making it possible to optimize these particles for cell specific delivery of nucleic acid sequences, for minimizing immunogenicity, for tuning stability and particle lifetime, for efficient degradation, for accurate delivery to the nucleus, etc.

As used herein, "artificial AAV" means, without limitation, an AAV with a non-naturally occurring capsid protein. Such an artificial capsid may be generated by any suitable technique, using a selected AAV sequence (e.g., a fragment of a vp1 capsid protein) in combination with heterologous sequences which may be obtained from a different selected AAV, non-contiguous portions of the same AAV, from a non-AAV viral source, or from a non-viral source. An artificial AAV may be, without limitation, a pseudotyped AAV, a chimeric AAV capsid, a recombinant AAV capsid, or a "humanized" AAV capsid. Pseudotyped vectors, wherein the capsid of one AAV is replaced with a heterologous capsid protein, are useful in the invention. In one embodiment, AAV2/5 and AAV2/7m8 are exemplary pseudotyped vectors.

"Self-complementary AAV" refers a plasmid or vector having an expression cassette in which a coding region carried by a recombinant AAV nucleic acid sequence has been designed to form an intra-molecular double-stranded DNA template. Upon infection, rather than waiting for cell mediated synthesis of the second strand, the two complementary halves of scAAV will associate to form one double stranded DNA (dsDNA) unit that is ready for immediate replication and transcription. See, e.g., D M McCarty et al, "Self-complementary recombinant adeno-associated virus (scAAV) vectors promote efficient transduction independently of DNA synthesis", Gene Therapy, (August 2001), Vol 8, Number 16, Pages 1248-1254. Self-complementary AAVs are described in, e.g., U.S. Pat. Nos. 6,596,535; 7,125,717; and 7,456,683, each of which is incorporated herein by reference in its entirety.

"Administration" or "routes of administration" include any known route of administration that is suitable for delivery of the selected composition, and that can deliver an effective amount to the to the selected target cell which is characterized by the ocular disease. Routes of administration useful in the methods of this invention include one or more of oral, parenteral, intravenous, intra-nasal, sublingual, intraocular injection, subretinal injection, intravitreal injection, via a depot formulation or device, via eye drops, by inhalation. In certain embodiments, the method involves delivering the composition by subretinal injection to the RPE, photoreceptor cells, and/or other ocular cells. In certain embodiments, intravitreal injection to ocular cells is employed. In yet other embodiments, injection via the palpebral vein to ocular cells is employed. Still other methods of administration may be selected by one of skill in the art given this disclosure. Routes of administration may be combined, if desired. In some embodiments, the administration is repeated periodically. Pharmaceutical compositions described herein are designed for delivery to subjects in need thereof by any suitable route or a combination of different routes. The nucleic acid molecules and/or vectors described herein may be delivered in a single composition or multiple compositions. Optionally, two or more different AAV may be delivered, or multiple viruses [see, e.g., WO20 2011/126808 and WO 2013/049493]. In another embodiment, multiple viruses may contain different replication-defective viruses (e.g., AAV and adenovirus), alone or in combination with proteins.

Certain compositions described herein are isolated, or synthetically or recombinantly engineered nucleic acid sequences that provide sequences encoding human AKT. In one embodiment, an isolated or engineered nucleic acid sequence encoding human AKT is provided. In certain embodiments, the sequence includes one or more additional restriction sites to allow for addition of markers, such as an epitope tag. When aligned with the native nucleic acid sequence, an engineered sequence encoding AKT may have a percent identity of at least 50%, or at least 60%, or at least 70%, or at least 80% or at least 90%, including any integer between any of those ranges. In one embodiment, the engineered sequence encoding AKT has a percent identity with the native sequence of at least 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98 or 99%.

A variety of expression cassettes are provided which employ SEQ ID NO: 7 for expression of the AKT protein. In one embodiment, an example of a plasmid containing such an expression cassette is shown in SEQ ID NO: 1. In one embodiment, an example of a plasmid containing such an expression cassette is shown in SEQ ID NO: 3. In another embodiment, the expression cassette does not include the Myr tag. An expression cassette which employs SEQ ID NO: 13 for expression of the AKT protein is shown in SEQ ID NO: 5.

As used herein, an "expression cassette" refers to a nucleic acid molecule which comprises a coding sequence for the AKT protein, a promoter, and may include other regulatory sequences therefor, which cassette may be engineered into a genetic element or plasmid, and/or packaged into the capsid of a viral vector (e.g., a viral particle). In one embodiment, an expression cassette comprises an engineered nucleic acid sequence that encodes AKT. In one embodiment, the expression cassette includes an AKT coding sequence operatively linked with expression control sequences that direct expression of the AKT coding sequence and/or gene product in a host cell.

A "recombinant AAV" or "rAAV" is a DNAse-resistant viral particle containing two elements, an AAV capsid and a vector genome containing at least non-AAV coding sequences packaged within the AAV capsid. Unless otherwise specified, this term may be used interchangeably with the phrase "rAAV vector". The rAAV is a "replication-defective virus" or "viral vector", as it lacks any functional AAV rep gene or functional AAV cap gene and cannot generate progeny. In certain embodiments, the only AAV sequences are the AAV inverted terminal repeat sequences (ITRs), typically located at the extreme 5' and 3' ends of the vector genome in order to allow the gene and regulatory sequences located between the ITRs to be packaged within the AAV capsid.

As used herein, a "vector genome" refers to the nucleic acid sequence packaged inside the rAAV capsid which forms a viral particle. Such a nucleic acid sequence contains AAV inverted terminal repeat sequences (ITRs). In the examples herein, a vector genome contains, at a minimum, from 5' to 3', an AAV 5' ITR, coding sequence(s), and an AAV 3' ITR. ITRs from AAV2, a different source AAV than the capsid, or other than full-length ITRs may be selected. In certain embodiments, the ITRs are from the same AAV source as the AAV which provides the rep function during production or a transcomplementing AAV. Further, other ITRs may be used. Further, the vector genome contains regulatory sequences which direct expression of the gene products.

Various plasmids are known in the art for use in producing rAAV vectors, and are useful for the compositions and methods described herein. The production plasmids are cultured in the host cells which express the AAV cap and/or rep proteins. In the host cells, each rAAV genome is rescued and packaged into the capsid protein or envelope protein to form an infectious viral particle. In one embodiment, the production plasmid is that described herein, or as described in WO2012/158757, which is incorporated herein by reference.

Figure 12:
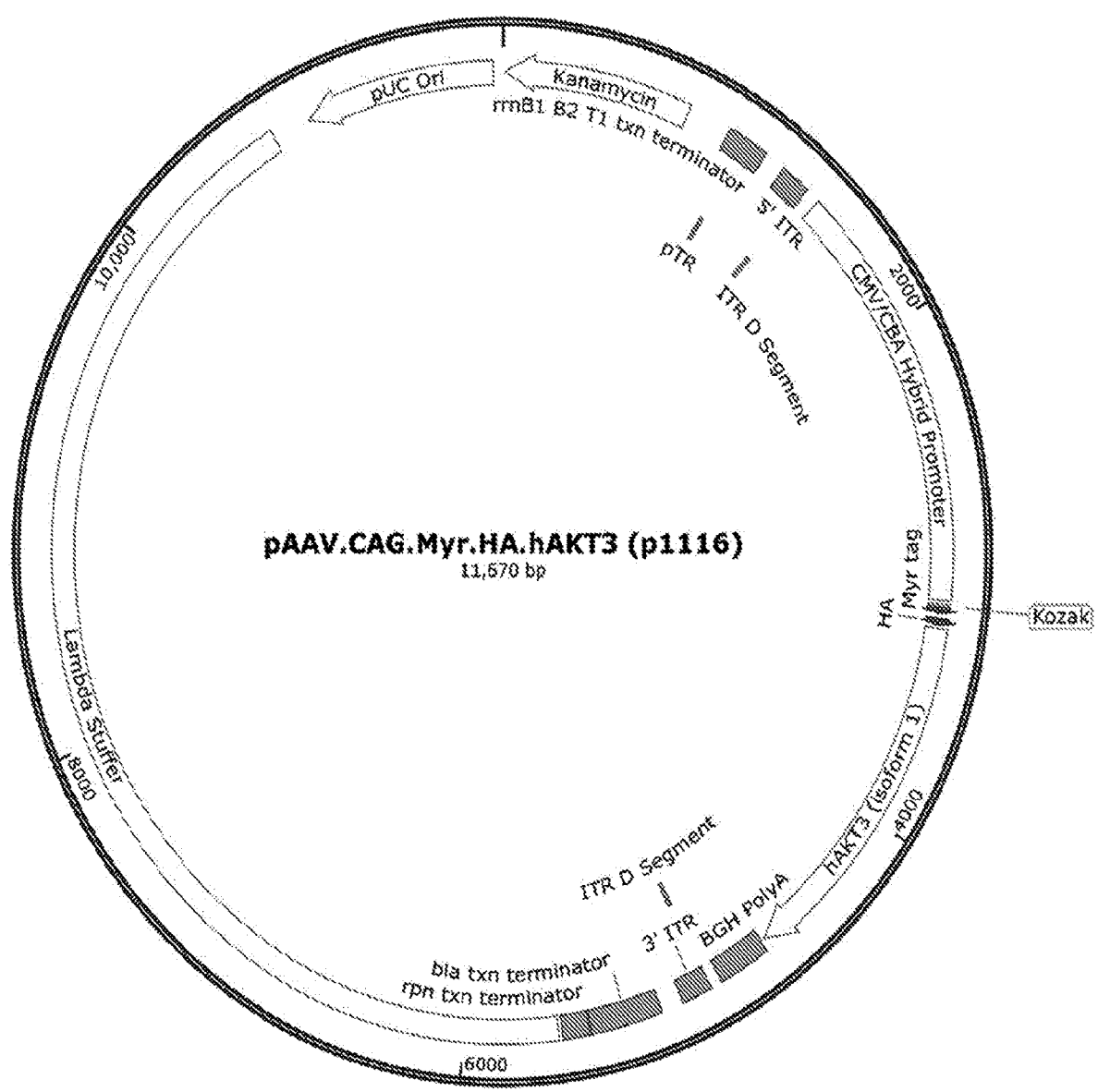
FIG. 12 shows a vector map for pAAV.CAG.Myr. HA.hAKT3 (p1116) (SEQ ID NO: 1).
Figure 13:
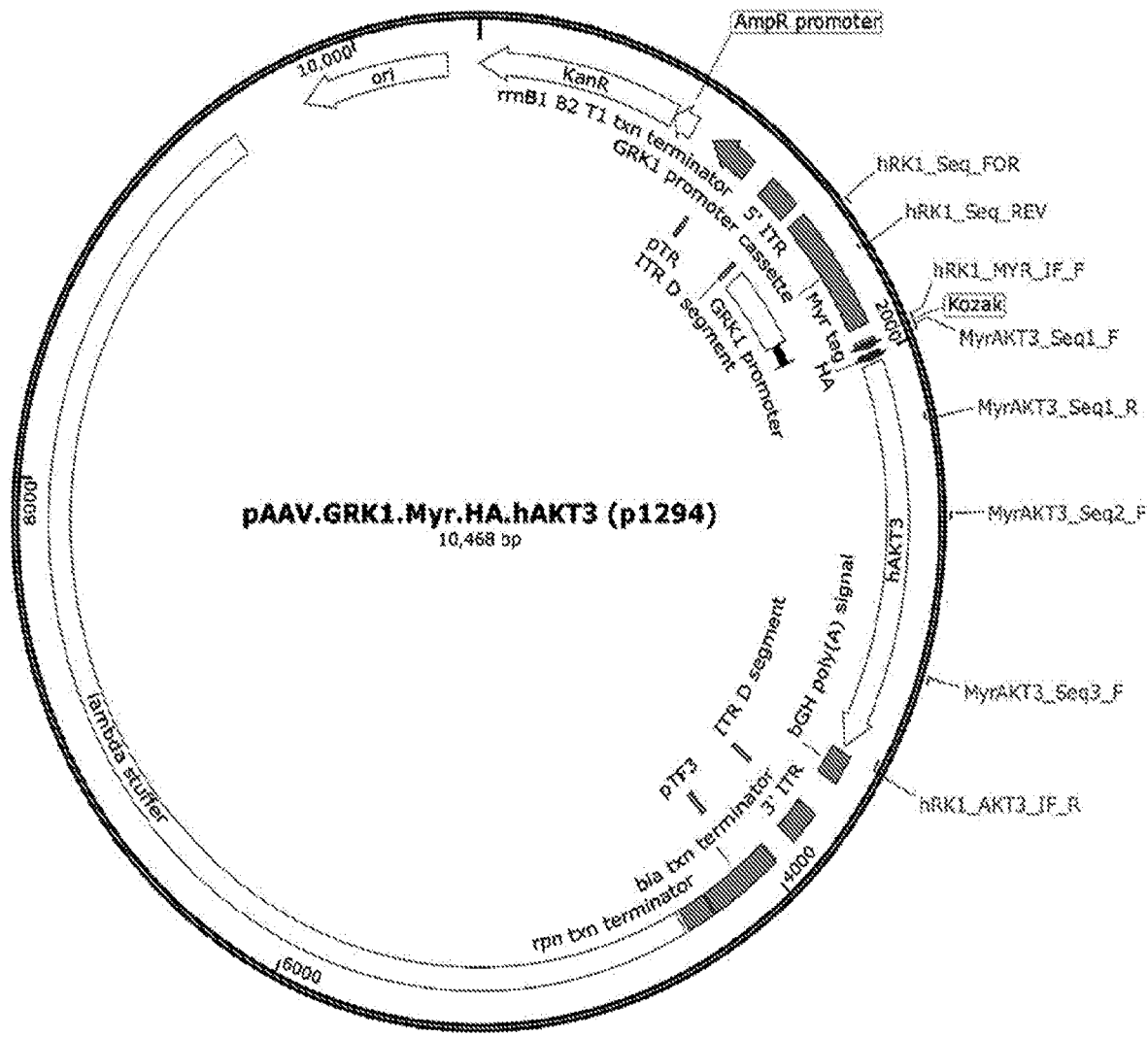
FIG. 13 shows a vector map for pAAV.GRK1.Myr.HA.hAKT3 (p1294) (SEQ ID NO: 3).
Figure 14:
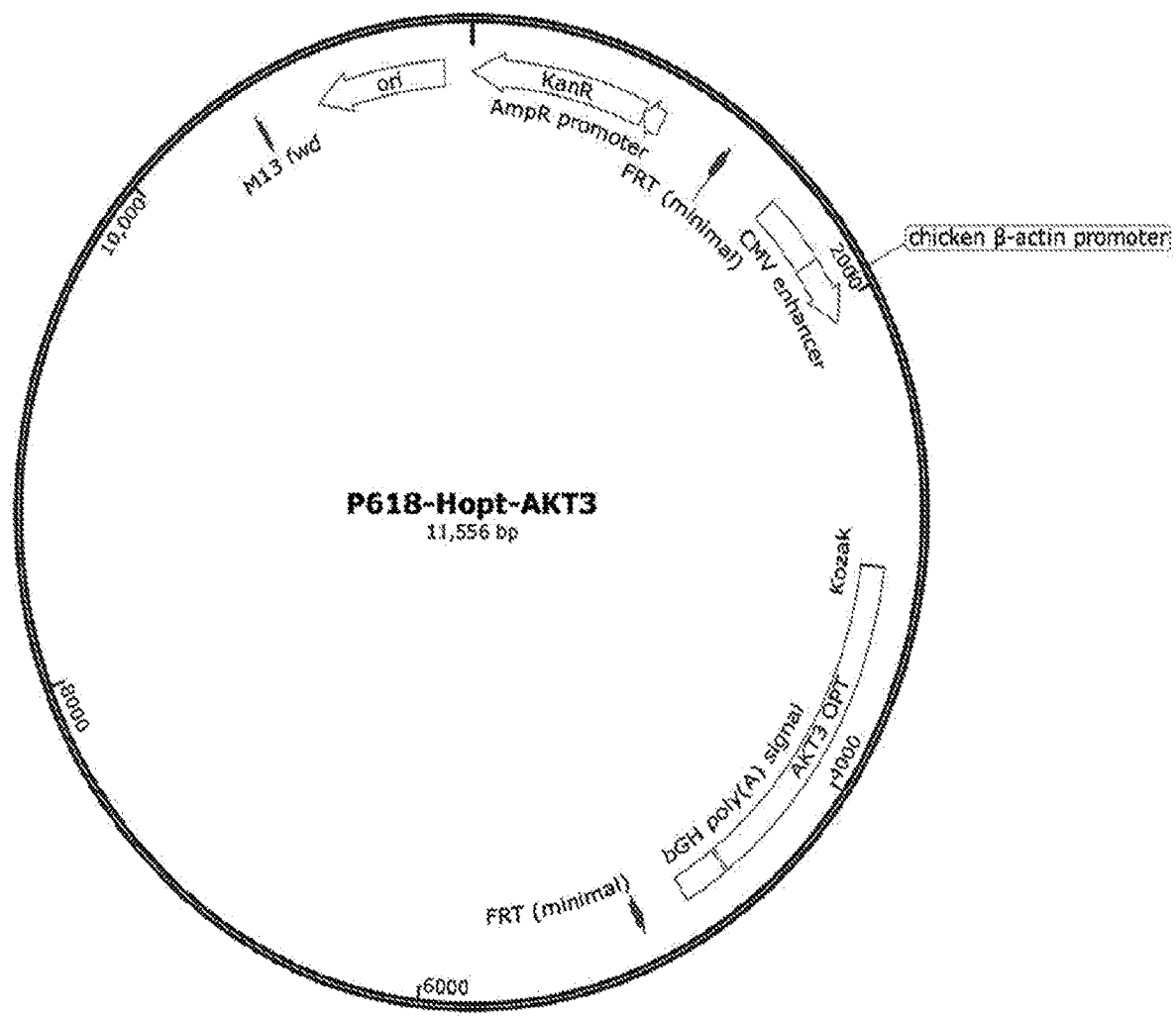
FIG. 14 shows a vector map for p618.Hopt.AKT3 (SEQ ID NO: 5).

One type of production plasmid is that shown in SEQ ID NO: 1 and FIG. 12, which is termed pAAV.CAG-.myr.hAKT3. Another production plasmid is shown in SEQ ID NO: 2 and FIG. 13. Yet another production plasmid is shown in SEQ ID NO: 3 and FIG. 14. Such a plasmid is one that contains a 5' AAV ITR sequence; a selected promoter; a polyA sequence; and a 3' ITR. The nucleic acid sequence encoding AKT is inserted between the selected promoter and the polyA sequence. In certain embodiments, the production plasmid is modified to optimize vector plasmid production efficiency. Such modifications are contemplated herein. In other embodiments, terminator and other sequences are included in the plasmid.

In still further embodiments, a recombinant adeno-associated virus (AAV) vector is provided for delivery of the AKT constructs and sequences described herein. The AAV vector includes an AAV capsid and a nucleic acid sequence comprising AAV inverted terminal repeat (ITR) sequences and a nucleic acid sequence encoding human protein kinase B (AKT), and expression control sequences that direct expression of AKT in a host cell. An adeno-associated virus (AAV) viral vector is an AAV DNase-resistant particle having an AAV protein capsid into which is packaged a nucleic acid sequence for delivery to a target cell. An AAV capsid is composed of 60 capsid (cap) protein subunits, VP1, VP2, and VP3, that are arranged in an icosahedral symmetry in a ratio of approximately 1:1:10 to 1:1:20, depending upon the selected AAV. AAVs may be selected as sources for capsids of AAV viral vectors as identified above. In some embodiments, an AAV capsid for use in the viral vector can be generated by mutagenesis (i.e., by insertions, deletions, or substitutions) of one of the aforementioned AAV capsids or its encoding nucleic acid. In some embodiments, the AAV capsid is chimeric, comprising domains from two or three or four or more of the aforementioned AAV capsid proteins. In some embodiments, the AAV capsid is a mosaic of vp1, vp2, and vp3 monomers from two or three different AAVs or recombinant AAVs. In some embodiments, an rAAV composition comprises more than one of the aforementioned capsid proteins.

For packaging an expression cassette or rAAV genome or production plasmid into virions, the ITRs are the only AAV components required in cis in the same construct as the transgene. In one embodiment, the coding sequences for the replication (rep) and/or capsid (cap) are removed from the AAV genome and supplied in trans or by a packaging cell line in order to generate the AAV vector. For example, as described above, a pseudotyped AAV may contain ITRs from a source which differs from the source of the AAV capsid. Additionally or alternatively, a chimeric AAV capsid is utilized. Still other AAV components may be selected. Sources of such AAV sequences are described herein and may also be isolated or engineered obtained from academic, commercial, or public sources (e.g., the American Type Culture Collection, Manassas, VA). Alternatively, the AAV sequences may be obtained through synthetic or other suitable means by reference to published sequences such as are available in the literature or in databases such as, e.g., GenBank®, PubMed®, or the like.

Methods for generating and isolating AAV viral vectors suitable for delivery to a subject are known in the art. See, e.g., U.S. Pat. Nos. 7,790,449; 7,282,199; WO 2003/042397; WO 2005/033321, WO 2006/110689; and U.S. Pat. No. 7,588,772 B2. In a one system, a producer cell line is transiently transfected with a construct that encodes the transgene flanked by ITRs and a construct(s) that encodes rep and cap. In a second system, a packaging cell line that stably supplies rep and cap is transiently transfected with a construct encoding the transgene flanked by ITRs. In each of these systems, AAV virions are produced in response to infection with helper adenovirus or herpesvirus, requiring the separation of the rAAVs from contaminating virus. More recently, systems have been developed that do not require infection with helper virus to recover the AAV—the required helper functions (i.e., adenovirus E1, E2a, VA, and E4 or herpesvirus UL5, UL8, UL52, and UL29, and herpesvirus polymerase) are also supplied, in trans, by the system. In these newer systems, the helper functions can be supplied by transient transfection of the cells with constructs that encode the required helper functions, or the cells can be engineered to stably contain genes encoding the helper functions, the expression of which can be controlled at the transcriptional or posttranscriptional level.

In yet another system, the transgene flanked by ITRs and rep/cap genes are introduced into insect cells by infection with baculovirus-based vectors. For reviews on these production systems, see generally, e.g., Zhang et al., 2009, "Adenovirus-adeno-associated virus hybrid for large-scale recombinant adeno-associated virus production," Human Gene Therapy 20:922-929, the contents of which is incorporated herein by reference in its entirety. Methods of making and using these and other AAV production systems are also described in the following U.S. patents, the contents of each of which is incorporated herein by reference in its entirety: U.S. Pat. Nos. 5,139,941; 5,741,683; 6,057,152; 6,204,059; 6,268,213; 6,491,907; 6,660,514; 6,951,753; 7,094,604; 7,172,893; 7,201,898; 7,229,823; and 7,439,065. See generally, e.g., Grieger & Samulski, 2005, "Adeno-associated virus as a gene therapy vector: Vector development, production and clinical applications," Adv. Biochem. Engin/Biotechnol. 99: 119-145; Buning et al., 2008, "Recent developments in adeno-associated virus vector technology," J. Gene Med. 10:717-733; and the references cited below, each of which is incorporated herein by reference in its entirety.

The methods used to construct any embodiment of this invention are known to those with skill in nucleic acid manipulation and include genetic engineering, recombinant engineering, and synthetic techniques. See, e.g., Green and Sambrook et al, Molecular Cloning: A Laboratory Manual, Cold Spring Harbor Press, Cold Spring Harbor, NY (2012). Similarly, methods of generating rAAV virions are well known and the selection of a suitable method is not a limitation on the present invention. See, e.g., K. Fisher et al, (1993) J. Virol., 70:520-532 and U.S. Pat. No. 5,478,745.

The rAAV vectors provided herein include an AAV capsid and an AAV expression cassette having a sequence that encodes AKT, such as those described above. In certain embodiments, the rAAV expression cassette comprises AAV inverted terminal repeat sequences and a nucleic acid sequence that encodes AKT, and expression control sequences that direct expression of the encoded proteins in a host cell. The rAAV expression cassette, in other embodiments, further comprises one or more of an intron, a Kozak sequence, a polyA, and post-transcriptional regulatory elements. Such rAAV vectors for use in pharmaceutical compositions for delivery to the eye, may employ a capsid from any of the many known AAV, including those describe herein.

Other conventional components of the expression cassettes and vectors provided herein can be optimized for a specific species using techniques known in the art including, e.g, codon optimization, as described herein. The components of the cassettes, vectors, plasmids, viruses, or other compositions described herein include a promoter sequence as part of the expression control sequences. In another embodiment, the promoter is cell-specific. The term "cell-specific" means that the particular promoter selected for the recombinant vector can direct expression of the AKT transgene in a particular ocular cell type or types. In one embodiment, the promoter is specific for expression of the transgene in photoreceptor cells. In another embodiment, the promoter is specific for expression in the rods and cones. In another embodiment, the promoter is specific for expression in the rods. In another embodiment, the promoter is specific for expression in the cones. In one embodiment, the photoreceptor-specific promoter is a human rhodopsin kinase promoter. The rhodopsin kinase promoter has been shown to be active in both rods and cones. See, e.g., Sun et al, Gene Therapy with a Promoter Targeting Both Rods and Cones Rescues Retinal Degeneration Caused by AIPL1 Mutations, Gene Ther. 2010 January; 17(1): 117-131, which is incorporated herein by reference in its entirety. In one embodiment, the promoter is modified to add one or more restriction sites to facilitate cloning.

In yet other embodiments, the promoter is a human rhodopsin promoter. In one embodiment, the promoter is modified to include restriction on the ends for cloning. See, e.g, Nathans and Hogness, Isolation and nucleotide sequence of the gene encoding human rhodopsin, PNAS, 81:4851-5 (August 1984), which is incorporated herein by reference in its entirety. In another embodiment, the promoter is a portion or fragment of the human rhodopsin promoter. In another embodiment, the promoter is a variant of the human rhodopsin promoter.

Other exemplary promoters include the human G-protein-coupled receptor protein kinase 1 (GRK1) promoter (Genbank Accession number AY327580). In another embodiment, the promoter is a 292 nt fragment (positions 1793-2087) of the GRK1 promoter (See, Beltran et al, Gene Therapy 2010 17:1162-74, which is hereby incorporated by reference in its entirety). In one embodiment, the promoter is the GRK1 promoter of nt 1427-1790 of SEQ ID NO: 3. In another preferred embodiment, the promoter is the human interphotoreceptor retinoid-binding protein proximal (IRBP) promoter. In one embodiment, the promoter is a 235 nt fragment of the hIRBP promoter. In one embodiment, the promoter is the RPGR proximal promoter (Shu et al, IOVS, May 2102, which is incorporated by reference in its entirety). Other promoters useful in the invention include, without limitation, the rod opsin promoter, the red-green opsin promoter, the blue opsin promoter, the cGMP-β-phosphodiesterase promoter (Qgueta et al, IOVS, Invest Ophthalmol Vis Sci. 2000 December; 41(13):4059-63), the mouse opsin promoter (Beltran et al 2010 cited above), the rhodopsin promoter (Mussolino et al, Gene Ther, July 2011, 18(7):637-45); the alpha-subunit of cone transducin (Morrissey et al, BMC Dev, Biol, January 2011, 11:3); beta phosphodiesterase (PDE) promoter; the retinitis pigmentosa (RP1) promoter (Nicord et al, J. Gene Med, December 2007, 9(12):1015-23); the NXNL2/NXNL1 promoter (Lambard et al, PLoS One, October 2010, 5(10):e13025), the RPE65 promoter; the retinal degeneration slow/peripherin 2 (Rds/perph2) promoter (Cai et al, Exp Eye Res. 2010 August; 91(2):186-94); and the VMD2 promoter (Kachi et al, Human Gene Therapy, 2009 (20:31-9)). Each of these documents is incorporated by reference herein in its entirety. In another embodiment, the promoter is selected from human human EF1α promoter, rhodopsin promoter, rhodopsin kinase, interphotoreceptor binding protein (IRBP), cone opsin promoters (red-green, blue), cone opsin upstream sequences containing the red-green cone locus control region, cone transducing, and transcription factor promoters (neural retina leucine zipper (Nrl) and photoreceptor-specific nuclear receptor Nr2e3, bZIP).

In other embodiments, the promoter is a ubiquitous or constitutive promoter. An example of a suitable promoter is a hybrid chicken β-actin (CBA) promoter with cytomegalovirus (CMV) enhancer elements. In another embodiment, the chicken beta actin promoter with CMV enhancer sequence is nt 1443-3104 of SEQ ID NO: 1. In yet another embodiment, the chicken beta actin promoter with CMV enhancer sequence is nt 1493 to 2075 of SEQ ID NO: 5. In another embodiment, the promoter is the CB7 promoter. Other suitable promoters include the human β-actin promoter, the human elongation factor-1α promoter, the cytomegalovirus (CMV) promoter, the simian virus 40 promoter, and the herpes simplex virus thymidine kinase promoter. See, e.g., Damdindorj et al, (August 2014) A Comparative Analysis of Constitutive Promoters Located in Adeno-Associated Viral Vectors. PLoS ONE 9(8): e106472. Still other suitable promoters include viral promoters, constitutive promoters, regulatable promoters (see, e.g., WO 2011/126808 and WO 2013/04943). Alternatively, a promoter responsive to physiologic cues may be utilized in the expression cassette, rAAV genomes, vectors, plasmids and viruses described herein. In one embodiment, the promoter is of a small size, under 1000 bp, due to the size limitations of the AAV vector. In another embodiment, the promoter is under 400 bp. Other promoters may be selected by one of skill in the art. In one embodiment, the AKT construct includes a CBA promoter with CMV enhancer elements. In another embodiment, the AKT construct includes a GRK1 promoter. In one embodiment, the GRK1 promoter is that shown in SEQ ID NO: 3, nt 1427 to 1790.

In certain embodiments, the promoter is an inducible promoter. The inducible promoter may be selected from known promoters including the rapamycin/rapalog promoter, the ecdysone promoter, the estrogen-responsive promoter, and the tetracycline-responsive promoter, or heterodimeric repressor switch. See, Sochor et al, An Autogenously Regulated Expression System for Gene Therapeutic Ocular Applications. Scientific Reports, 2015 Nov. 24; 5:17105 and Daber R, Lewis M., A novel molecular switch. J Mol Biol. 2009 Aug. 28; 391(4):661-70, Epub 2009 Jun. 21 which are both incorporated herein by reference in their entirety.

In other embodiments, the cassette, vector, plasmid, and virus constructs described herein contain other appropriate transcription initiation, termination, enhancer sequences, efficient RNA processing signals such as splicing and polyadenylation (polyA) signals; TATA sequences; sequences that stabilize cytoplasmic mRNA; sequences that enhance translation efficiency (i.e., Kozak consensus sequence); introns; sequences that enhance protein stability; and when desired, sequences that enhance secretion of the encoded product. The expression cassette or vector may contain none, one or more of any of the elements described herein. Examples of suitable polyA sequences include, e.g., SV40, bovine growth hormone (bGH) polyA, and TK polyA. Examples of suitable enhancers include, e.g., the CMV enhancer, the RSV enhancer, the alpha fetoprotein enhancer, the TTR minimal promoter/enhancer, LSP (TH-binding globulin promoter/alpha1-microglobulin/bikunin enhancer), amongst others. In one embodiment, a Kozak sequence is included upstream of the transgene coding sequence to enhance translation from the correct initiation codon. In another embodiment, CBA exon 1 and intron are included in the expression cassette. In one embodiment, the transgene is placed under the control of a hybrid chicken β actin (CBA) promoter. This promoter consists of the cytomegalovirus (CMV) immediate early enhancer, the proximal chicken β actin promoter, and CBA exon 1 flanked by intron 1 sequences.

In certain embodiments, the Kozak sequence is GCCGC-CACC (SEQ ID NO: 1, nt 3121 to 3129).

In certain embodiments, the expression cassette contains a 5' ITR, CBA promoter, CMV enhancer, a human AKT3 coding sequence (SEQ ID NO: 7), bGH poly A, and, a 3' ITR.

In certain embodiments, the expression cassette contains a 5' ITR, a hGRK1 promoter, a human AKT3 sequence (SEQ ID NO: 7), a bGH poly A, and a 3' ITR.

In certain embodiments, the expression cassette contains a 5' ITR, a CBA promoter, a CMV enhancer, an engineered human AKT3 sequence (SEQ ID NO: 13), a bGH poly A, and a 3' ITR.

In certain embodiments, the expression cassette contains a 5' ITR, a hGRK1 promoter, an engineered human AKT3 sequence (SEQ ID NO: 13), a bGH poly A, and a 3' ITR.

In certain embodiments, these nucleic acid sequences, vectors, expression cassettes, or rAAV viral vectors are described herein are useful in pharmaceutical compositions, which also include a pharmaceutically acceptable carrier, buffer, diluent and/or adjuvant, etc. Such pharmaceutical compositions are used to express AKT in the ocular cells through delivery by, e.g., recombinantly engineered AAVs or artificial AAVs.

To prepare these pharmaceutical compositions containing the nucleic acid sequences, vectors, expression cassettes and rAAV viral vectors, the sequences or vectors or viral vector is preferably assessed for contamination by conventional methods and then formulated into a pharmaceutical composition suitable for administration to the eye. Such formulation involves the use of a pharmaceutically and/or physiologically acceptable vehicle or carrier, particularly one suitable for administration to the eye, such as buffered saline or other buffers, e.g., HEPES, to maintain pH at appropriate physiological levels, and, optionally, other medicinal agents, pharmaceutical agents, stabilizing agents, buffers, carriers, adjuvants, diluents, etc. For injection, the carrier will typically be a liquid. Exemplary physiologically acceptable carriers include sterile, pyrogen-free water and sterile, pyrogen-free, phosphate buffered saline. A variety of such known carriers are provided in U.S. Pat. No. 7,629,322, incorporated herein by reference. In one embodiment, the carrier is an isotonic sodium chloride solution. In another embodiment, the carrier is balanced salt solution. In one embodiment, the carrier includes tween. If the virus is to be stored long-term, it may be frozen in the presence of glycerol or Tween20.

In one exemplary specific embodiment, the composition of the carrier or excipient contains 180 mM NaCl, 10 mM NaPi, pH7.3 with 0.0001%-0.01% Pluronic F68 (PF68). The exact composition of the saline component of the buffer ranges from 160 mM to 180 mM NaCl. Optionally, a different pH buffer (potentially HEPES, sodium bicarbonate, TRIS) is used in place of the buffer specifically described. Still alternatively, a buffer containing 0.9% NaCl is useful.

Optionally, the compositions of the invention contain, in addition to the rAAV and/or variants and carrier(s), other conventional pharmaceutical ingredients, such as preservatives, or chemical stabilizers. Suitable exemplary preservatives include chlorobutanol, potassium sorbate, sorbic acid, sulfur dioxide, propyl gallate, the parabens, ethyl vanillin, glycerin, phenol, and parachlorophenol. Suitable chemical stabilizers include gelatin and albumin.

In the case of AAV viral vectors, quantification of the genome copies ("GC"), vector genomes ("VG"), or virus particles may be used as the measure of the dose contained in the formulation or suspension. Any method known in the art can be used to determine the genome copy (GC) number of the replication-defective virus compositions of the invention. One method for performing AAV GC number titration is as follows: Purified AAV vector samples are first treated with DNase to eliminate un-encapsidated AAV genome DNA or contaminating plasmid DNA from the production process. The DNase resistant particles are then subjected to heat treatment to release the genome from the capsid. The released genomes are then quantitated by real-time PCR using primer/probe sets targeting specific region of the viral genome (usually poly A signal). In another method the effective dose of a recombinant adeno-associated virus carrying a nucleic acid sequence encoding an AKT transgene is measured as described in S. K. McLaughlin et al, 1988 J. Virol., 62:1963, which is incorporated by reference in its entirety.

As used herein, the term "dosage" can refer to the total dosage delivered to the subject in the course of treatment, or the amount delivered in a single unit (or multiple unit or split dosage) administration. The pharmaceutical virus compositions can be formulated in dosage units to contain an amount of replication-defective virus carrying a nucleic acid sequence encoding AKT as described herein that is in the range of about $1.0 \times 10^9$ GC to about $1.0 \times 10^{15}$ GC including all integers or fractional amounts within the range. In one embodiment, the compositions are formulated to contain at least $1 \times 10^9$, $2 \times 10^9$, $3 \times 10^9$, $4 \times 10^9$, $5 \times 10^9$, $6 \times 10^9$, $7 \times 10^9$, $8 \times 10^9$, or $9 \times 10^9$ GC per dose including all integers or fractional amounts within the range. In another embodiment, the compositions are formulated to contain at least $1 \times 10^{10}$, $2 \times 10^{10}$, $3 \times 10^{10}$, $4 \times 10^{10}$, $5 \times 10^{10}$, $6 \times 10^{10}$, $7 \times 10^{10}$, $8 \times 10^{10}$, or $9 \times 10^{10}$ GC per dose including all integers or fractional amounts within the range. In another embodiment, the compositions are formulated to contain at least $1 \times 10^{11}$, $2 \times 10^{11}$, $3 \times 10^{11}$, $4 \times 10^{11}$, $5 \times 10^{11}$, $6 \times 10^{11}$, $7 \times 10^{11}$, $8 \times 10^{11}$, or $9 \times 10^{11}$ GC per dose including all integers or fractional amounts within the range. In another embodiment, the compositions are formulated to contain at least $1 \times 10^{12}$, $2 \times 10^{12}$, $3 \times 10^{12}$, $4 \times 10^{12}$, $5 \times 10^{12}$, $6 \times 10^{12}$, $7 \times 10^{12}$, $8 \times 10^{12}$, or $9 \times 10^{12}$ GC per dose including all integers or fractional amounts within the range. In another embodiment, the compositions are formulated to contain at least $1 \times 10^{13}$, $2 \times 10^{13}$, $3 \times 10^{13}$, $4 \times 10^{13}$, $5 \times 10^{13}$, $6 \times 10^{13}$, $7 \times 10^{13}$, $8 \times 10^{13}$, or $9 \times 10^{13}$ GC per dose including all integers or fractional amounts within the range. In another embodiment, the compositions are formulated to contain at least $1 \times 10^{14}$, $2 \times 10^{14}$, $3 \times 10^{14}$, $4 \times 10^{14}$, $5 \times 10^{14}$, $6 \times 10^{14}$, $7 \times 10^{14}$, $8 \times 10^{14}$, or $9 \times 10^{14}$ GC per dose including all integers or fractional amounts within the range. In another embodiment, the compositions are formulated to contain at least $1 \times 10^{15}$, $2 \times 10^{15}$, $3 \times 10^{15}$, $4 \times 10^{15}$, $5 \times 10^{15}$, $6 \times 10^{15}$, $7 \times 10^{15}$, $8 \times 10^{15}$, or $9 \times 10^{15}$ GC per dose including all integers or fractional amounts within the range. In one embodiment, for human application the dose can range from $1 \times 10^{10}$ to about $1 \times 10^{12}$ GC per dose including all integers or fractional amounts within the range. All dosages may be measured by any known method, including as measured by qPCR or digital droplet PCR (ddPCR) as described in, e.g., M. Lock et al, Hum Gene Ther Methods. 2014 April; 25(2):115-25. doi: 10.1089/hgtb.2013.131, which is incorporated herein by reference.

These above doses may be administered in a variety of volumes of carrier, excipient or buffer formulation, ranging from about 25 to about 1000 microliters, including all numbers within the range, depending on the size of the area to be treated, the viral titer used, the route of administration, and the desired effect of the method. In one embodiment, the volume of carrier, excipient or buffer is at least about 25 µL. In one embodiment, the volume is about 50 µL. In another embodiment, the volume is about 75 µL. In another embodiment, the volume is about 100 µL. In another embodiment, the volume is about 125 µL. In another embodiment, the volume is about 150 µL. In another embodiment, the volume is about 175 µL. In yet another embodiment, the volume is about 200 µL. In another embodiment, the volume is about 225 µL. In yet another embodiment, the volume is about 250 µL. In yet another embodiment, the volume is about 275 µL. In yet another embodiment, the volume is about 300 µL. In yet another embodiment, the volume is about 325 µL. In another embodiment, the volume is about 350 µL. In another embodiment, the volume is about 375 µL. In another embodiment, the volume is about 400 µL. In another embodiment, the volume is about 450 µL. In another embodiment, the volume is about 500 µL. In another embodiment, the volume is about 550 µL. In another embodiment, the volume is about 600 µL In another embodiment, the volume is about 650 µL In another embodiment, the volume is about 700 µL In another embodiment, the volume is between about 700 and 1000 µL.

In certain embodiments, the viral constructs are delivered in doses of from about $1 \times 10^9$ to about $1 \times 10^{11}$ GCs in volumes of about 1 µL to about 3 µL for small animal subjects, such as mice. For larger veterinary subjects having eyes about the same size as human eyes, the larger human dosages and volumes stated above are useful. See, e.g., Diehl et al, J. Applied Toxicology, 21:15-23 (2001) for a discussion of good practices for administration of substances to various veterinary animals. This document is incorporated herein by reference.

It is desirable that the lowest effective concentration of virus or other delivery vehicle be utilized in order to reduce the risk of undesirable effects, such as toxicity, retinal dysplasia, and detachment. Still other dosages in these ranges may be selected by an attending physician, taking into account the physical state of the subject, preferably human, being treated, the age of the subject, the particular ocular disorder and the degree to which the disorder, if progressive, has developed.

In certain aspects, described herein is a method for treating, retarding, or halting progression of blindness in a mammalian subject having, or at risk of developing, an ocular disorder. In one embodiment, the subject has retinal degeneration. In certain embodiments, a rAAV carrying an AKT sequences, preferably suspended in a physiologically compatible carrier, diluent, excipient and/or adjuvant, is administered to a desired subject (e.g., a human subject). This method comprises administering to a subject in need thereof any of a nucleic acid sequence, expression cassette, rAAV genome, plasmid, vector, or rAAV vector, or the compositions containing these. In certain embodiments, the composition is delivered subretinally. In another embodiment, the composition is delivered intravitreally. In still another embodiment, the composition is delivered using a combination of administrative routes suitable for treatment of ocular diseases, including but not limited to administration via the palpebral vein or other intravenous or conventional administration routes.

For use in these methods, the volume and viral titer of each dosage is determined individually, as further described herein, and may be the same or different from other treatments performed in the same, or contralateral, eye. The dosages, administrations, and regimens may be determined by an attending physician given the teachings of this specification. In certain embodiments, the composition is administered in a single dosage selected from those above listed above and administered to a single affected eye. In other embodiments, the composition is administered as a single dosage selected from those above listed to both affected eyes, either simultaneously or sequentially. Sequential administration may imply a time gap of administration from one eye to another from intervals of minutes, hours, days, weeks or months. In other embodiments, the method involves administering a composition to an eye in two or more dosages (e.g., split dosages). In another embodiment, multiple injections are made in different portions of the same eye. In another embodiment, a second administration of an rAAV including the selected expression cassette (e.g., AKT containing cassette) is performed at a later time point. Such time point may be weeks, months or years following the first administration. Such second administration is, in one embodiment, performed with an rAAV having a different capsid than the rAAV from the first administration. In another embodiment, the rAAV for the first and second administration have the same capsid.

In still other embodiments, the compositions described herein are delivered in a single composition or multiple compositions. Optionally, two or more different AAV are delivered, or multiple viruses [see, e.g., WO 2011/126808 and WO 2013/049493]. In another embodiment, multiple viruses contain different replication-defective viruses (e.g., AAV and adenovirus).

In certain embodiments, it is desirable to perform non-invasive retinal imaging and functional studies to identify areas of the eye (e.g., rod and cone photoreceptors) to be targeted for therapy. In these embodiments, clinical diagnostic tests are employed to determine the precise location(s) for one or more subretinal injection(s). These tests include, for example, electroretinography (ERG), perimetry, topographical mapping of the layers of the retina and measurement of the thickness of its layers by means of confocal scanning laser ophthalmoscopy (cSLO) and optical coherence tomography (OCT), topographical mapping of cone density via adaptive optics (AO), functional eye exam, etc, depending upon the species of the subject being treated, physical status, and the dosage. In view of the imaging and functional studies performed, in certain embodiments one or more injections are performed in the same eye in order to target different areas of the affected eye. The volume and viral titer of each injection is determined individually, as further described herein, and may be the same or different from other injections performed in the same, or contralateral, eye. In another embodiment, a single, larger volume injection is made in order to treat the entire eye. In one embodiment, the volume and concentration of the rAAV composition is selected so that only the region of damaged ocular cells is impacted. In another embodiment, the volume and/or concentration of the rAAV composition is a greater amount, in order reach larger portions of the eye, including non-damaged photoreceptors.

In certain embodiments of the methods described herein, a one-time intra-ocular delivery of a composition as described herein, e.g., an AAV delivery of an AKT expression cassette, is useful in preventing vision loss and blindness in a subject at risk of developing an ocular disorder or retinal degeneration.

In certain embodiments, the composition is administered before disease onset. In other embodiments, the composition is administered prior to the initiation of vision impairment or loss. In other embodiments, the composition is administered after initiation of vision impairment or loss. In yet other embodiments, the composition is administered when less than 90% of the rod and/or cones or photoreceptors are functioning or remaining, as compared to a non-diseased eye (e.g., contralateral eye).

In certain embodiments, the method includes performing additional studies, e.g., functional and imaging studies to determine the efficacy of the treatment. For animals, such tests include retinal and visual function assessment via electroretinograms (ERGs) looking at rod and cone photoreceptor function, optokinetic nystagmus, pupillometry, water maze testing, light-dark preference, optical coherence tomography (to measure thickness of various layers of the retina), histology (retinal thickness, rows of nuclei in the outer nuclear layer, immunofluorescence to document transgene expression, cone photoreceptor counting, staining of retinal sections with peanut agglutinin—which identifies cone photoreceptor sheaths).

Specifically for human subjects, following administration of a dosage of a compositions described in this specification, the subject is tested for efficacy of treatment using an electroretinograms (ERG) to examine rod and cone photoreceptor function, a pupillometry visual acuity assessment, contrast sensitivity color vision testing, visual field testing (Humphrey visual fields/Goldmann visual fields), perimetry mobility testing (obstacle course), and/or a reading speed test. Other useful post-treatment efficacy tests to which the subject is exposed following treatment with a pharmaceutical composition described herein include functional magnetic resonance imaging (fMRI), full-field light sensitivity testing, retinal structure studies including optical coherence tomography, fundus photography, fundus autofluorescence (FAF), adaptive optics laser scanning ophthalmoscopy, mobility testing, test of reading speed and accuracy, microperimetry and/or ophthalmoscopy. These and other efficacy tests are described in U.S. Pat. No. 8,147,823 and in co-pending International patent application publication WO 2014/011210 or WO 2014/124282, which are incorporated herein by reference).

In yet other embodiments, any of the above described methods is performed in combination with another, or secondary, therapy. In still other embodiments, the methods of treatment of these ocular diseases involve treating the subject with a composition described in detail herein in combination with another therapy, such as antibiotic treatment, palliative treatment for pain, and the like. The additional therapy may be any now known, or as yet unknown, therapy which helps prevent, arrest, or ameliorate these mutations or defects, or any of the effects associated therewith. The secondary therapy can be administered before, concurrent with, or after administration of the compositions described above. In certain embodiments, a secondary therapy involves non-specific approaches for maintaining the health of the retinal cells, such as administration of neurotrophic factors, anti-oxidants, anti-apoptotic agents. The non-specific approaches are achieved through injection of proteins, recombinant DNA, recombinant viral vectors, stem cells, fetal tissue, or genetically modified cells. The latter could include genetically modified cells that are encapsulated.

In certain embodiments, a method of generating a recombinant rAAV comprises obtaining a plasmid containing an AAV expression cassette as described above and culturing a packaging cell carrying the plasmid in the presence of sufficient viral sequences to permit packaging of the AAV viral genome into an infectious AAV envelope or capsid. Specific methods of rAAV vector generation are described above and are be employed in generating a rAAV vector that can deliver an expression cassettes or vector genome described above and in the examples below.

In yet other embodiments, a vector comprising any of the expression cassettes described herein is provided. As described above, such vectors can be plasmids of variety of origins and are useful in certain embodiments for the generation of recombinant replication defective viruses as described further herein.

It is to be noted that the term "a" or "an" refers to one or more. As such, the terms "a" (or "an"), "one or more," and "at least one" are used interchangeably herein. The words "comprise", "comprises", and "comprising" are to be interpreted inclusively rather than exclusively. The words "consist", "consisting", and its variants, are to be interpreted exclusively, rather than inclusively. While various embodiments in the specification are presented using "comprising" language, under other circumstances, a related embodiment is also intended to be interpreted and described using "consisting of" or "consisting essentially of" language. As used herein, the term "about" means a variability of 10% from the reference given, unless otherwise specified. The term "regulation" or variations thereof as used herein refers to the ability of a composition to inhibit one or more components of a biological pathway.

Unless defined otherwise in this specification, technical and scientific terms used herein have the same meaning as commonly understood by one of ordinary skill in the art and by reference to published texts, which provide one skilled in the art with a general guide to many of the terms used in the present application.

The following examples are illustrative only and are not intended to limit the present invention.

EXAMPLES

Mutations within over 250 known genes are associated with inherited retinal degeneration. Clinical success following gene replacement therapy for congenital blindness due to RPE65 mutations establishes a platform for the development of downstream treatments targeting other forms of inherited ocular disease. Unfortunately, several challenges relevant to complex disease pathology and limitations of current gene transfer technologies impede the development of related strategies for each specific form of inherited retinal degeneration. Here we describe a gene augmentation strategy that delays retinal degeneration by stimulating features of anabolic metabolism necessary for survival and structural maintenance of photoreceptors. We targeted two critical points of regulation in the canonical insulin/AKT/mTOR pathway with AAV-mediated gene augmentation in a mouse model of retinitis pigmentosa. AAV vectors expressing the serine/threonine kinase, AKT3, promote dramatic preservation of photoreceptor numbers, structure, and partial visual function. This protective effect was associated with successful reprogramming of photoreceptor metabolism towards pathways associated with cell growth and survival. Collectively, these findings underscore the importance of AKT activity and downstream pathways associated with anabolic metabolism in photoreceptor survival and maintenance.

Example 1: Materials and Methods

Animals

C57Bl/6 and Pde6brd10 mice were obtained from the Jackson Laboratory and raised in a 12-hour light/dark cycle. Animals were housed at the University of Pennsylvania in compliance with ARVO guidelines on the care and use of laboratory animals as well as with institutional and federal regulations.

AAV Vectors

A plasmid encoding the human AKT3 cDNA sequence containing N-terminal myristoylation (MYR) and HA tags was kindly provided by William Sellers (addgene plasmid #9017). The MYR-HA-hAKT3 sequence was amplified and cloned into an AAV proviral expression plasmid using the In-Fusion HD cloning system (Clonetech). The human Rheb cDNA clone was obtained from Origene. Inverse PCR mutagenesis was employed to create the S16H mutation with the following primer sequences: 5' [phospho] CACGTGGGGAAATCCTCATTGAC 3' (S16H Forward) (SEQ ID NO: 14) and 5' CCGGTAGCCCAGGAT 3' (SEQ ID NO: 15). The human Rheb cDNA containing the S16H mutation was then cloned into an AAV proviral expression plasmid using the In-Fusion HD cloning system. For production of viral vectors, the helper plasmid expressing AAV7m8 Cap was kindly provided by John Flannery and David Schaffer (addgene plasmid #64839). AAV7m8-AKT3 and AAV7m8-eGFP vectors were generated using previously described methods 46 and purified with CsCl gradient ultracentrifugation by the Center for Advanced Retinal and Ocular Therapeutics (CAROT) research vector core (University of Pennsylvania, PA, USA).

Cell Culture and AAV Transduction 84-31 cells were kindly provided by Dr. James Wilson (University of Pennsylvania) and were cultured in DMEM-GlutaMax supplemented with 10% FBS and 1% penicillin-streptomycin. For AAV transductions, 84-31 cells were plated at a density of $2.5 \times 10^5$ cells/well in a 6-well dish. Afterwards, cells were immediately transduced with AAV7m8 vectors at $1 \times 10^6$ multiplicity of infection (MOI). Cells were maintained at 37° C. with 5% CO2.

RNA Isolation and Gene Expression Analysis

RNA was isolated using the Macherey-Nagel Nucleospin RNA kit. First-strand cDNA synthesis was performed using 500 ng of total RNA with the SuperScript III first-strand synthesis system according to manufacturer's protocol. Real-time PCR was performed with the Applied Biosystems 7500 Fast system using the Power SYBR green PCR master mix (Invitrogen). The following primer sequences were used: 5' CCACTCCTCCACCTTTGAC 3' (human GAPDH Forward; SEQ ID NO: 16), 5' ACCCTGTTGCTGTAGCCA 3' (human GAPDH Reverse; SEQ ID NO: 17), 5' ACTCCTACGATCCAACCATAGA 3' (human Rheb Forward; SEQ ID NO: 18), 5' TGGAGTATGTCTGAGGAAAGATAGA 3' (human Rheb Reverse; SEQ ID NO: 19), 5' AGGATGGTATGGACTGCATGG 3' (human AKT3 Forward; SEQ ID NO: 20), and 5' GTCCACTTGCAGAGTAGGAAAA 3' (human AKT3 Reverse; SEQ ID NO: 21). Relative gene expression was quantified with the ΔΔCT method and normalized to GAPDH.

Subretinal Injections

Subretinal injections were performed as previously described. Each retina received 1 uL of vector preparation. Eyes that received the AAV.eGFP vector alone were dosed with $2 \times 10^9$ vector genomes. Eyes that received the combination of AAV.eGFP plus AAV.AKT3 or AAV.caRheb were dosed with $1 \times 10^9$ vector genomes per vector ($2 \times 10^9$ total vector genomes).

Electroretinogram

Mice were anesthetized and maintained as previously described. Pupils were dilated with 1% tropicamide (Alcon Laboratories, Fort Worth, TX). Clear plastic contact lenses with embedded platinum wires were used to record light responses, and a platinum wire loop was placed into the animal's mouth to serve as a reference electrode. ERGs were recorded with the Espion E2 system (Diagnosys, Lowell, MA). Three ERG responses were recorded with the following parameters: scotopic response (dark adaption, 0.01 scot cd s $m^{-2}$ stimulus), maximum mixed rod-cone response (dark adaptation, 500 scot cd s $m^{-2}$ stimulus), maximum cone response.

Optokinetic Response

Visual acuity was assessed by measuring the optokinetic response (OKR) using the OptoMotry software and apparatus (Cerebral Mechanics, Inc, Medicine Hat, AB, Canada) as previously described. Recordings were performed by an investigator masked to the experimental treatments.

Immunohistochemistry

Eyes were enucleated, harvested, and prepared as frozen sections as previously described (Dooley S J, et al. (2018). Spliceosome-mediated pre-mRNA trans-splicing can repair CEP290 mRNA. Mol Ther Nucleic Acids 12: 294-308). Sections were incubated in blocking buffer containing phosphate-buffered saline (PBS), 10% normal goat serum (CST), and 2% Triton X-100 for one hour at room temperature. Afterwards, sections were incubated in primary antibody solution overnight in a humidified chamber containing the previously described components and combinations of the following antibodies: rabbit anti-cone arrestin (1:400; Millipore #ab15282), rabbit anti-phospho-S6-Ser240/244 (1:100; CST #5364), rabbit anti-phospho-AKT-Ser273 (1:100; CST #4060), mouse anti-rhodopsin (1:400; Abcam #ab5417), rabbit anti-HA (1:100; CST #3724), rabbit anti-Ki67 (1:400; Abcam #ab15580), mouse anti-PCNA (1:400; Abcam #ab29), chicken anti-GFAP (1:400; Abcam #ab4674), rabbit anti-AKT (1:100; CST #4691). Following primary antibody incubation, sections were washed three times with PBS and incubated in secondary antibody solution for 2 hours at room temperature in a humidified chamber containing PBS, 10% normal goat serum, 2% Triton X-100, and combination of the following secondary antibodies: alexa fluor-594 goat anti-chicken (1:500; Abcam #ab150176), alexa fluor-594 goat anti-mouse (1:500; #ab150116), alexa fluor-594 goat anti-rabbit (1:500; Abcam #ab150080), Cy5-conjugated goat anti-rabbit (1:500; KPL #072-02-15-16). Sections were removed from secondary antibody incubation and washed three times with PBS. Sections stained for the presence of phosphorylated antigens were incubated and washed in solutions containing Tris-buffered saline (TBS) instead of PBS.

ONL Measurements

Whole retinal sections were tiled using a 40× objective with the EVOS FL Auto 2 cell imaging system. In each image, ONL thickness was measured at three equidistant points spaced 75-100 µm apart. These measurements were averaged between all images to represent the average ONL thickness of the section. Three retinal sections were averaged per sample. ONL numbers from specific regions of the retina transduced with vector were quantified by counting the number of GFP+ONL cells per a 200 µm area. Once again, three retinal sections were averaged per sample to acquire these measurements.

Western Blotting

Protein samples were separated with the NuPage electrophoresis system (Thermo Fisher). Samples were heated at 70° C. and loaded onto 4-12% Bis-Tris protein gels (Thermo Fisher). Separated proteins were then transferred to a PVDF membrane with the XCell II blot module (Thermo Fisher) at 35 volts for 1.5 hours. Following protein transfer, membranes were incubated in tris-buffered saline containing 0.1% (v/v) Tween 20 (BioRad) (TBST) and 5% (w/v) bovine serum albumin (BSA; Sigma-Aldrich) for 1 hour at room temperature. Afterwards, blots were incubated in the previously described solution containing the following primary antibodies: rabbit anti-498 phospho-S6-Ser240/244 (1:1000; CST #5364), rabbit anti-S6 (1:1000; CST #2217), rabbit anti-GAPDH (1:1000; CST #5174). Primary antibody incubation occurred overnight at 4° C. Blots were removed from primary antibody solution and washed three times in TBST for 5 minutes each. Afterwards, they were placed in secondary antibody solution composed of TBST, 5% BSA, and HRP-conjugated anti-rabbit ECL (1:10,000; GE Healthcare) for 1 hour at room temperature. Membranes were washed three times in TBST followed by incubation with ECL2 (Thermo Fisher) according to manufacturer's instructions for 5 minutes. Finally, membranes were imaged using the Amersham Imager 600 (GE Healthcare) with chemiluminescence settings.

Statistics

All data are represented as means±SEM unless otherwise indicated. Differences between two treatment groups were compared using an unpaired student's t-test. Differences between three or more experimental groups were compared using a one way ANOVA followed by Tukey's honest significant difference test. Calculations for statistical significance were determined using GraphPad Prism 7.0. Differences were considered statistically significant at $P<0.05$.

Example 2: AKT3 Gene Therapy for Treatment of Ocular Disease

The Effects of AKT3 or caRheb Overexpression in the Pde6b$^{rd10}$ (Rd10) Mouse Model of Retinitis Pigmentosa Disease in the rd10 mouse model results from a point mutation in the gene encoding the β-subunit of rod phosphodiesterase (PDE), which renders the PDE complex nonfunctional and generates a blockade in the rod phototransduction cascade. Furthermore, PDE plays a critical role in the recycling of cGMP to GMP, thereby facilitating the closure of voltage-gated ion channels. Loss of PDE complex activity promotes the constitutive influx of Na+ and Ca2+ ions and activation of cell death cascades. Rd10 mice display progressive thinning of the photoreceptor outer nuclear layer (ONL) beginning near postnatal day 18 (PN18). By PN30 there is significant photoreceptor loss in central and peripheral regions of the retina and typically one layer of aberrant cone cell bodies remains in the central retina at PN45. In studies described below, the neuroprotective potential of AKT3 or Rheb delivery on visual function, structural morphology, and preservation of photoreceptors was assessed. We further investigated potential mechanisms of the neuroprotective effects by examining the expression of markers indicative of mTOR activation. In addition, we examined the long-term safety with respect to the potential that AKT3 or Rheb overexpression has on the oncogenic proliferation of retinal neurons.

Design and Characterization of AAV7m8 Vectors

Figures 2B, 2C, 2D:
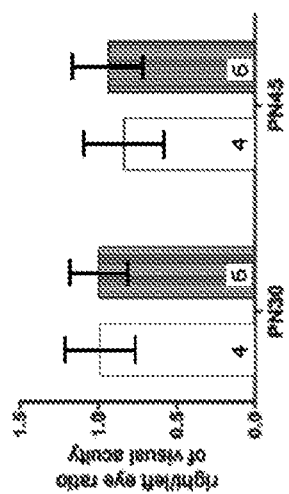
Figures 2E, 2F, 2G:
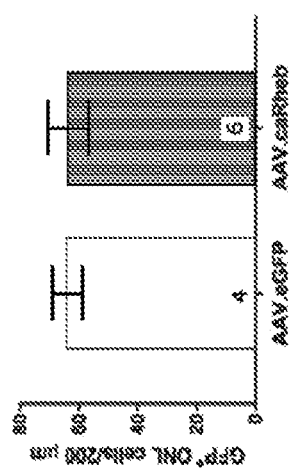

Gene transfer vectors derived from AAV have emerged as the optimal gene delivery platform for targeting neuronal tissue. AAV7m8 is a variant of AAV2 generated through in vivo selection and displays enhanced retinal and cellular transduction properties. We generated AAV7m8 vectors encoding a hyperactive version of human AKT3 (AAV.AKT3), a constitutively active Rheb mutant (AAV.caRheb), and an enhanced green fluorescent protein reporter (AAV.eGFP) as control (FIG. 1A). The AKT3 transgene contains an N-terminal myristoylation (MYR) sequence, thereby enhancing membrane targeting and localization. The caRheb transgene contains the canonical S16H mutation which confers resistance to TSC-mediated GTPase activating protein (GAP) activity. 84-31 cells transduced with the AAV.caRheb or AAV.AKT3 vectors display robust expression of target gene mRNA compared to untreated controls (FIG. 1B-FIG. 1C). Subretinal delivery of AAV7m8 results in robust labeling of photoreceptors, retinal pigment epithelium (RPE), and Muller cells in the mouse retina (FIG. 1D-FIG. 1E). Co-injection of an experimental vector with a reporter vector results in localization of transgene expression specifically to the area of subretinal delivery (FIG. 1G-FIG. 1H) allowing adequate identification of the treated retinal region.

caRheb Gene Transfer Fails to Attenuate Retinal Degeneration in the Pde6brd10 Mouse We investigated the effect of caRheb gene augmentation in the Pde6brd10 retina. Animals received unilateral subretinal injection of AAVs carrying the experimental transgene along with AAV containing eGFP (so that the injected portion of the retina could be identified) at PN13-14, a timepoint prior to the onset of rod death. Controls included injection of the eGFP-containing AAV alone or no injection of AAV. Following injection, visual function was measured with electroretinogram (ERG) and optokinetic response (OKR). Retinal histology was examined at PN45 to determine the effects of AAV.caRheb on photoreceptor survival (FIG. 2A-FIG. 2C). Quantification of total ONL thickness per retina showed no significant difference in number of remaining photoreceptor cell bodies in experimental versus control treatments (untreated or injected with AAV.eGFP alone) (FIG. 2B). In addition to total ONL thickness, we measured the number of GFP+ONL cells per 200 µm sections of regions in retina transduced with AAV.eGFP alone or co-transduced with AAV.caRheb. Once again, we did not observe statistically significant changes in ONL cell numbers between these groups (FIG. 2C). Furthermore, AAV.caRheb did not preserve retinal or visual function compared to controls as measured with ERG (FIG. 2D-FIG. 2F) and OKR (FIG. 2G), respectively. Collectively, these data suggest caRheb gene transfer does not promote photoreceptor neuroprotection in the Pde6brd10 mouse retina.

Figure 3C:
FIG. 3A-FIG. 3H show AKT3 gene transfer promotes photoreceptor survival and structural preservation. Representative images of an (FIG. 3A) untreated Rd10 mouse retina at PN30 and (FIG. 3B) treated with AAV.AKT3/AAV.eGFP stained with antibodies directed against rhodopsin (RHO).
Figure 3F:
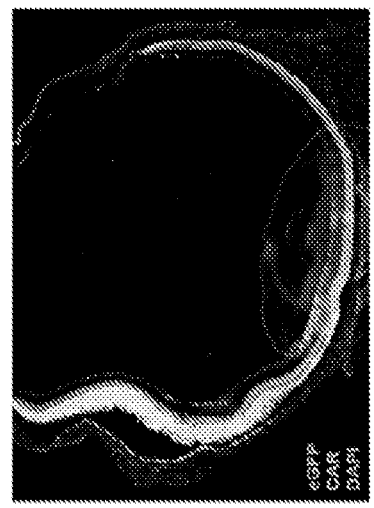

AKT3 Gene Augmentation Promotes Photoreceptor Survival and Structural Preservation in the Pde6brd10 Retina We examined the effect of AKT3 gene augmentation on photoreceptor survival and structural integrity in the Pde6brd10 retina. Histological analysis of retinal architecture at PN30 and PN45 after injection of AAV.AKT3 at PN13-14 revealed a potent neuroprotective effect on photoreceptors (as reflected by immunostaining and ONL measurements between treatment groups) specifically in retinal regions co-labeled with eGFP (FIG. 3C). There was no evidence of histologic rescue in AAV.GFP injected eyes compared to untreated eyes at any timepoint Immunostaining in order to probe the specific types of photoreceptors that were maintained revealed preservation of cone photoreceptors (as assessed by staining for cone arrestin) in retinal regions transduced with the AAV.AKT3 vector (FIG. 3D-FIG. 3F). Similarly, immunostaining for rhodopsin revealed preservation of rod photoreceptors in AAV.AKT3-transduced regions (but not unexposed regions of the retina or AAV.eGFP or untreated control retinas).

Figure 3B:
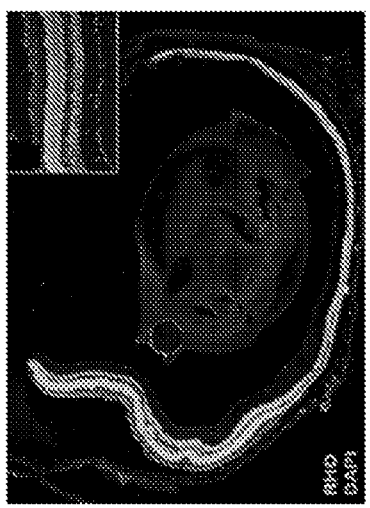
Figure 3E:
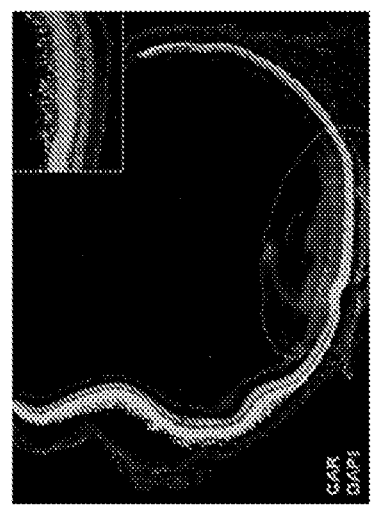
Figure 3A:
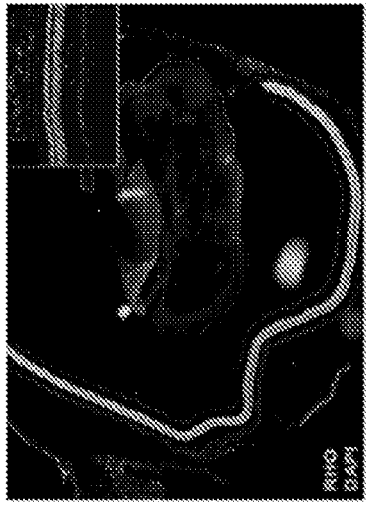
Figure 3D:
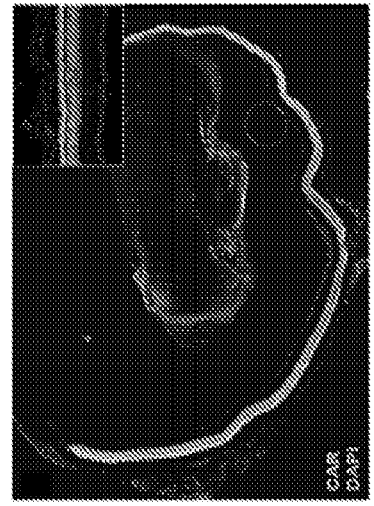
Figures 3G, 3H:
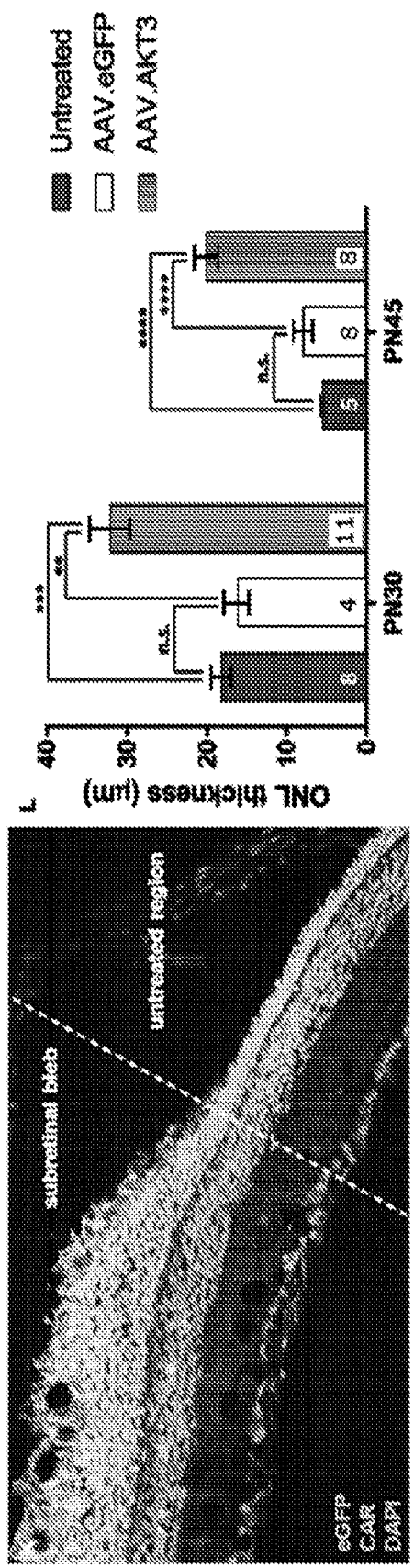

Remarkably, immunostaining for rhodopsin also revealed enhanced preservation of rod outer segments at the PN30 harvest point compared to controls suggesting the importance of this pathway in mediating survival and maintenance of rod photoreceptor ultrastructure (FIG. 3A-FIG. 3C).

Figure 4A:
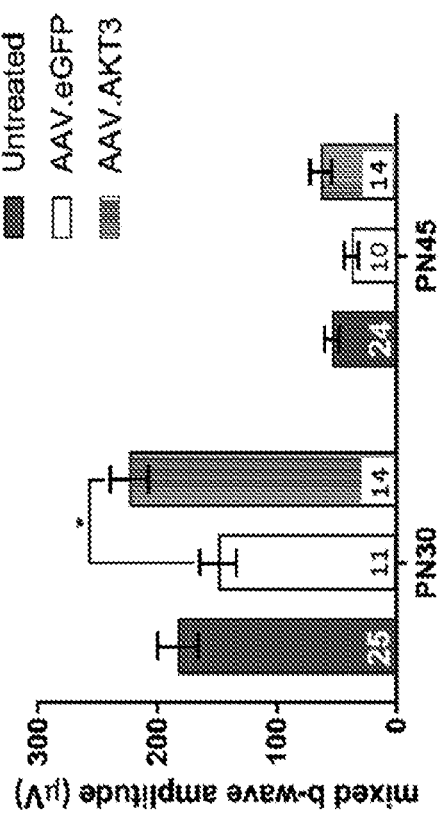
FIG. 4A-FIG. 4D show the effects of AKT3 gene transfer on retinal and visual function in the Pde6brd10 retina.
Figure 4C:
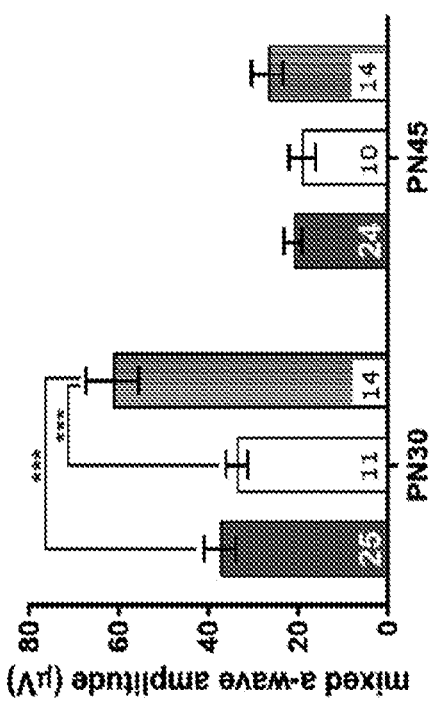
Figure 4B:
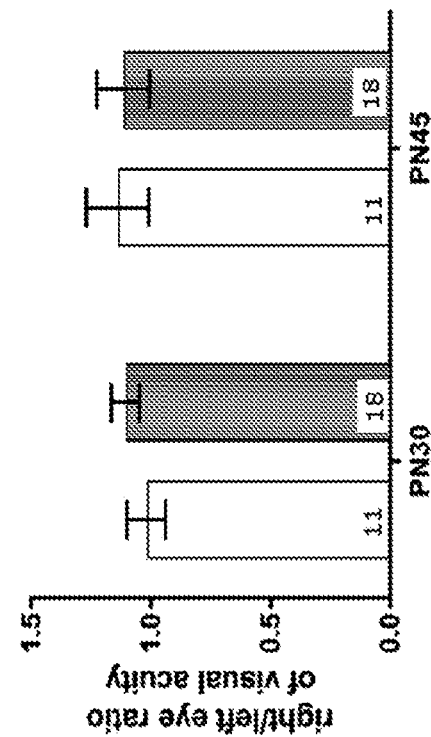
Figure 4D:
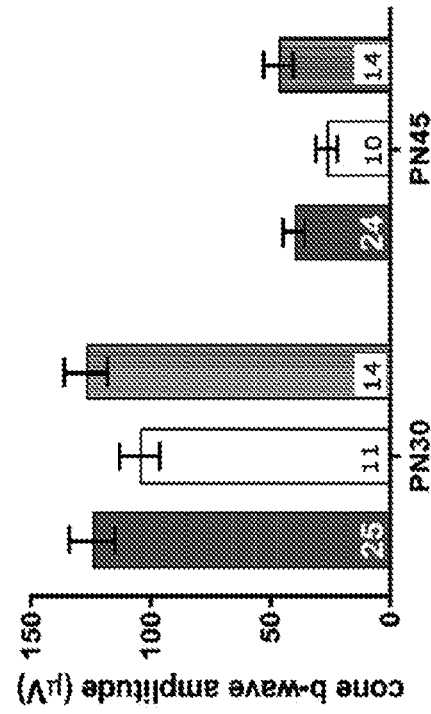

Effect of AKT3 Gene Transfer on Retinal and Visual Function in the Pde6brd10 Retina We assessed retinal and visual function at the PN30 and PN45 time points with electroretinography (ERG) and optokinetic response (OKR) measurements, respectively. Analyses of mixed rod-cone responses from eyes treated with AAV.AKT3 revealed improved a-wave amplitudes (FIG. 4A) compared to both untreated and AAV.eGFP treated controls at PN30. In addition, stimulation of eyes treated with AAV.AKT3 also elicited increased mixed b-wave responses (FIG. 4B) compared to the AAV.eGFP treated eyes but only a trend towards increased preservation compared to untreated eyes at this time point. However, there were no significant differences in these outcome measures between treatment groups at PN45 (FIG. 4A-FIG. 4B). We also measured the cone-specific b-wave response but did not observe statistically significant differences between treatment groups at any of the time points tested (FIG. 4C). We examined visual acuity in response to gene transfer by measuring the optokinetic response (OKR). Data represent the right/left eye ratio of these recordings in which untreated left eyes served as within-animal controls while right eyes were treated with AAV.eGFP alone or in combination with AAV.AKT3. Treatment with AAV.AKT3/AAV.eGFP did not preserve visual acuity relative to the AAV.eGFP control at any timepoint (FIG. 4D). Collectively, this data indicates that AKT3 gene transfer prolongs cellular survival and some function during early-mid stage disease but may be insufficient for long-term maintenance.

AKT3 Gene Augmentation Stimulates Biosynthetic and Cell Survival Pathways

We hypothesized that the AKT3-induced neuroprotective response activates pathways associated with anabolism and cell survival. In order to evaluate this possibility, we immunostained retinal sections with antibodies directed against canonical downstream markers indicative of mTOR activation (FIG. 5A-FIG. 5H). Regions of the retina transduced specifically with AAV.AKT3 demonstrate enhanced expression of phosphorylated ribosomal protein S6 (pS6) compared to unexposed or untreated retinas (FIG. 5E-FIG. 5H). Interestingly, we also observed increased expression of an mTORC2 marker (pAKT$^{S473}$) within regions specifically exposed to AAV.AKT3, suggesting stimulation of additional functions associated with cell survival and stress resistance (FIG. 5A-FIG. 5D). Retinal sections obtained from untreated and AAV.GFP control groups did not display enhanced expression of these markers implying that AKT3-induced neuroprotection is, at least, partially driven by both the mTORC1 and the mTORC2 pathway (FIG. 5D and FIG. 5H).

AKT3 Overexpression does not Breach Photoreceptor Quiescence but Stimulates Müller Cell Activation Dysregulated AKT signaling is a common hallmark of many human cancers. We examined the effect of AKT3 gene transfer on retinal quiescence by immunostaining with canonical markers of cellular proliferation. Expression of Ki67 was restricted to cells occupying the ganglion cell layer in untreated and AAV.eGFP-treated Pde6brd10 retinas.

Co-staining with antibodies directed against GFAP identified this Ki67+ cell population as Müller glia. Under homeostatic conditions, these cells provide structural and metabolic support to other retinal cell types through mediating neurotrophic factor release, regulation of extracellular ion balance, and debris scavenging. Importantly, cells occupying the ONL did not display positive immunoreactivity for the Ki67 marker suggesting the AKT3-induced protective response was not a byproduct of photoreceptor quiescent escape (FIG. 6H and FIG. 6I). Interestingly, Müller cells within regions of the retina specifically transduced with AAV.AKT3 demonstrate morphological changes representative of astrogliosis such as upregulation of GFAP expression and extension of neural processes throughout different retinal layers (FIG. 6G-FIG. 6I). Similarly, we examined the expression of these markers in wild-type animals injected with our vector panel. Wild-type animals received subretinal injections at PN13 and were followed up for histological analysis at PN125. We did not observe structural or cellular changes in animals harboring long-term overexpression of the reporter vector alone (FIG. 11A-FIG. 11B). Conversely, animals treated with the ubiquitous AAV.AKT3 vector display extensive retinal disorganization and loss of photoreceptor structural markers (FIG. 11-FIG. 11D). Furthermore, regions specifically transduced with the AAV.AKT3 vector also display chronic activation of Müller cells compared to untreated and AAV.eGFP treated retinas (FIG. 7A-FIG. 7K).

Figure 8E:
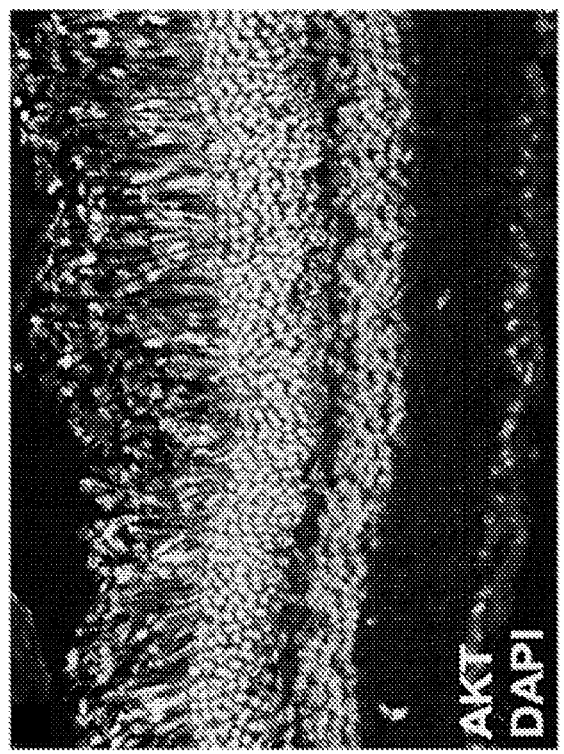
Figure 8F:
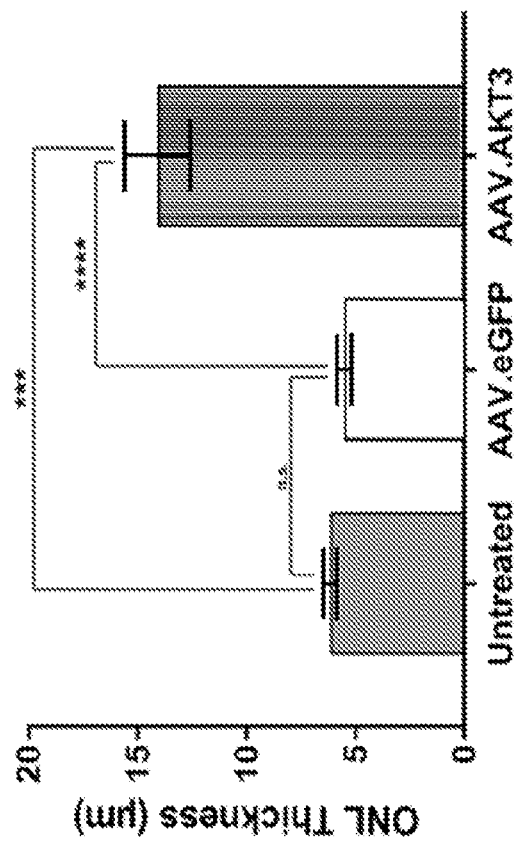

Photoreceptor-Restricted Expression of AKT3 Mediates Neuroprotective Effects in the Pde6b$^{rd10}$ Retina We examined the effects of AKT3-mediated neuroprotection specifically within the photoreceptors by generating an AAV vector driven by the previously described GRK1 promoter (FIG. 8A). Application of these vectors within the Pde6b$^{rd10}$ retina exerted similar effects upon retinal function as previously described vectors driven by the ubiquitous CAG promoter (FIG. 8B-FIG. 8D). Specifically, treatment with AAV.GRK1.AKT3 preserved mixed a-wave and b-wave amplitudes at the PN30 but not in advanced stage degeneration at PN45. Similar to previous findings, these vectors did not mediate preservation of cone-specific b-wave amplitudes compared to control treatments. At the level of histology, these vectors demonstrate specific transgene expression within photoreceptors (FIG. 8E). Furthermore, AAV.GRK1.AKT3 also improved photoreceptor survival compared to the untreated and AAV.eGFP treated control eyes (FIG. 8F).

AKT3 Vectors Regulated by a Photoreceptor-Specific Promoter do not Stimulate Reactive Gliosis in the Pde6b$^{rd10}$ Retina We hypothesized that restricting AKT3 transgene expression to the photoreceptor layer with GRK1-driven vectors would abate chronic müller cell activation observed previously with AKT3 vectors regulated by the ubiquitous CAG promoter. Once again, we immunostained retinal sections derived from PN45 Pde6brd10 mice co-injected with AAV.GRK1.AKT3 and the tracer vector with antibodies directed against GFAP and Ki67 (FIG. 9A-FIG. 9H). Treatment with AAV.GRK1.AKT3 did not reveal aberrant activation and migration of Müller cells in the Pde6b$^{rd10}$ compared to untreated samples (FIG. 9A-FIG. 9F).

Furthermore, transitional regions between untreated retinal regions and the subretinal injection site reveal similar histological findings, further suggesting that photoreceptor-restricted AKT3 gene transfer mitigates the chronic activation of Müller cells observed previously with the ubiquitous vector system (FIG. 9G and FIG. 9H). These results highlight importance of cell and tissue-specific promoters to bypass potentially detrimental off-target effects associated with neuroprotective gene transfer strategies.

Example 3: Stimulation of the mTOR Pathway with AAV-Mediated Gene Transfer

The studies described in Example 2 above demonstrate the therapeutic potential of reprogramming cell metabolism in an animal model of RP following stimulation of the mTOR pathway with AAV-mediated gene transfer. The exact role of mTOR signaling in the context of neurodegenerative disease remains a topic of debate. Downregulation of mTOR activity via treatment with the canonical mTOR inhibitor, rapamycin, can attenuate pathological mechanisms in several models of neurodegeneration including Parkinson's disease, Huntington's disease, and Alzheimer's disease. Conversely, other investigations suggest stimulation of the insulin/AKT/mTOR axis can mediate beneficial outcomes in related neurodegenerative disease models. In the studies described above, targeting the mTOR pathway at two separate points of regulation led to divergent effects on photoreceptor survival, structural integrity, and retinal function.

Figure 10A:
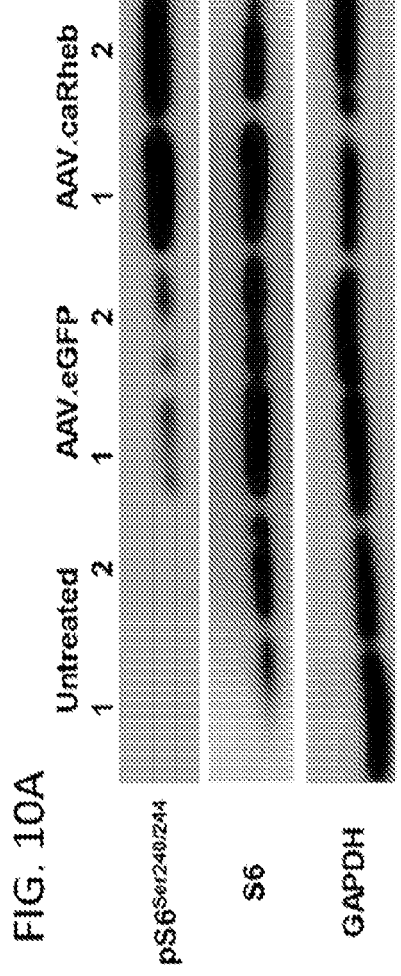
FIG. 10A-FIG. 10B show AAV.caRheb stimulates mTORC1 activity in vitro but not in photoreceptors.
Figure 10B:
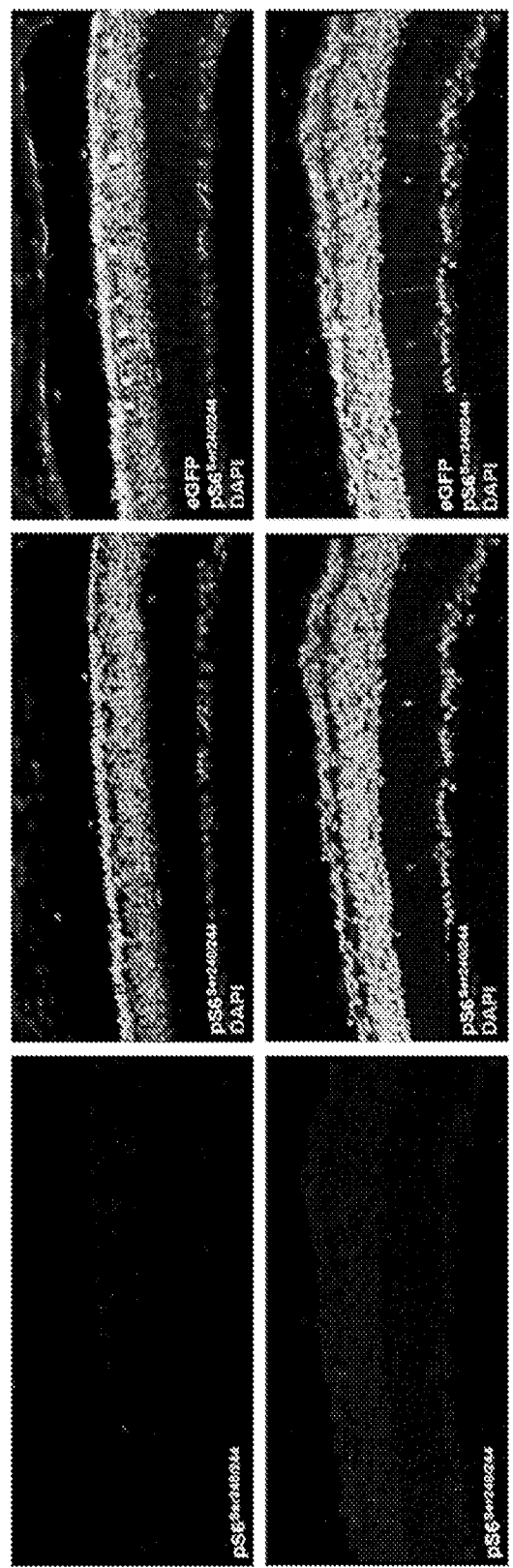

Several previous studies highlighted the protective potential of targeting Rheb activation to improve therapeutic outcomes in the context of neurodegenerative disease models. However, stimulating the mTOR pathway at this downstream point of regulation with caRheb gene transfer did not mediate a protective effect in the Pde6brd10 retina. Interestingly, AAV.caRheb vectors demonstrated potent stimulation of mTORC1 activity in vitro, showing enhanced expression of the canonical mTORC1 activation marker, pS6. This activity did not translate in vivo as shown by negative immunostaining for the pS6 in retinal sections overexpressing the caRheb transgene. This suggests the presence of intrinsic mechanisms to inhibit caRheb's capacity to stimulate mTORC1 within photoreceptors (FIG. 10A and FIG. 10B). These observations diverge from those reported in previous studies in which caRheb gene transfer stimulated mTORC1 activity within various neuronal populations and conferred stress resistance in models of Parkinson's disease, Huntington's disease, and optic nerve trauma. Other lines of evidence suggest Rheb may play a competing role in promoting cell death signaling programs in response to different forms of cellular stress. UV or TNFα-induced cellular stress combined with Rheb overexpression enhanced apoptotic signaling in vitro, whereas Rheb knockdown or treatment with rapamycin provided partial protection from these cytotoxic agents. In the context of retinal degeneration, light-induced damage of retinal ganglion cells (RGCs) led to upregulation in Rheb expression that associated with an increase in markers of apoptosis prior to degeneration. Taken together, the protective or pro-apoptotic functions of Rheb are likely determined by mechanisms elicited through the specific pathology in question. Moreover, amplifying Rheb activity with gene transfer likely modulates divergent effects upon cell biology depending on the particular disease context.

Further, AAV-mediated AKT3 gene transfer stimulated a potent neuroprotective effect upon photoreceptor survival and morphological preservation. This protective effect was associated with stimulation of mTORC1 and mTORC2 in regions of the retina specifically transduced with the AAV.AKT3 vector. Our findings are the first to report upregulation in mTORC2 signaling activity associated with photoreceptor neuroprotection. This data deviates from previous observations by Venkatesh et al. (2015) in which mTORC2 activity was decreased following transgenic ablation of Pten and enhanced cone survival in the Pde6brd1 mouse retina.

Despite the dramatic cellular preservation mediated by AKT3 gene transfer, we observed differential effects upon functional preservation following evaluation with electroretinography and OKR. We observed statistically significant preservation of the mixed rod-cone a-wave and, in some cases, b-wave responses in eyes treated with CAG or GRK1 promoter driven AKT3 vectors at the PN30 measurement but not during later stage degeneration. Despite the morphological preservation of cone structure with AKT3 transgene expression, we did not observe an improvement in cone-specific light responses compared to controls at any of the time points tested. This finding deviates from prior investigations that examined strategies of cone photoreceptor neuroprotection in similar disease models. These differences may be explained by variations in study design with respect not only to the transgene cassette but vector dose, injection route, kinetics of degeneration associated with the model system, and timing of vector delivery. In the present study, vectors were injected at a time point just prior to the onset of photoreceptor death, whereas previous investigations administered the experimental intervention immediately after birth and prior to retinal maturation and onset of disease mechanisms. These differences in experimental design likely have important downstream implications relevant to retinal coverage, kinetics of vector recruitment, and expression in relation to onset of neurodegenerative mechanisms, and ultimately therapeutic outcome measures.

Advancement of gene therapies based on strategies to reprogram cell metabolism must be met with highly stringent safety criteria prior to clinical translation. While we did not observe evidence of tumor formation, long-term overexpression of AKT3 regulated by a ubiquitous promoter in wild-type animals led to extensive retinal disorganization and ultimately loss of photoreceptors. This phenotype corresponded with the chronic activation of Müller cells in retinal regions specifically transduced with the ubiquitous vector observed in wild-type and Pde6b$^{rd10}$ animals. Reactive gliosis is a response typically associated with tissue injury where these cells become activated and proliferate to mediate various functions including tissue remodeling, neurotrophic factor release, scavenging of cellular debris. While this response is intended to suppress further retinal damage, chronic activation may be detrimental to neighboring cells and disrupt retinal homeostasis. For example, activated Müller cells have been observed to upregulate expression and secretion of various pro-inflammatory molecules including tumor necrosis factor (TNF) and monocyte chemoattractant protein (MCP-1).

Furthermore, they are known to secrete excess amounts of nitric oxide (NO) which generates free radicals that may be damaging to neighboring cells[41]. This finding was unsurprising as cells require a delicate balance in these metabolic components to accommodate their precise physiological demands, and excessive stimulation of such pathways will likely present detrimental effects upon cell viability. Determining and achieving this balance with gene augmentation or silencing strategies will be an enormous challenge in translating these approaches to the clinic.

Additional regulatory elements, such as cell-specific promoters (as we showed here), stress-responsive promoters or inducible systems, will likely play critical roles in the clinical development of neuroprotective gene transfer strategies that stimulate potent metabolic pathways.

Collectively, this investigation demonstrates a broadly protective effect upon photoreceptor viability and structure following gene augmentation in a model of inherited retinal degeneration. These findings underscore the importance of AKT activity and downstream pathways associated with anabolic metabolism in photoreceptor survival and maintenance. Furthermore, the results emphasize the complex and delicate nature of reprogramming cell metabolism as well as important safety concerns in arresting progression of complex neurodegenerative disease with "generic" gene therapy strategies.

```
          (Sequence Listing Free Text)
            The following information
     is provided for sequences containing free
        text under numeric identifier <223>.

SEQ ID NO    Free Text under <223>

1        <223> synthetic construct
             <220>
             <221> misc_feature
             <222> (1253)..(1382)
             <223> 5' ITR
             <220>
             <221> misc_feature
             <222> (1443).. (3104)
             <223> CMV/CBA Hybrid Promoter
             <220>
             <221> misc_feature
             <222> (3121)..(3129)
             <223> Kozak
             <220>
             <221> misc_feature
             <222> (3130).. (3156)
             <223> Myr tag
             <220>
             <221> misc_feature
             <222> (3175)..(3201)
             <223> HA
             <220>
             <221> CDS
             <222> (3214)..(4653)
             <223> hAKT3 (isoform 1)
             <220>
             <221> misc_feature
             <222> (4672)..(4893)
             <223> BGH PolA
             <220>
             <221> misc_feature
             <222> (4941)..(5070)
             <223> 3' ITR
    2        <223> Synthetic Construct
    3        <223> synthetic construct
             <220>
             <221> misc_feature
             <222> (1253)..(1382)
             <223> 5' ITR
             <220>
             <221> misc_feature
             <222> (1427)..(1887)
             <223> GRK1 promoter cassette
             <220>
             <221> misc_feature
             <222> (1427)..(1790)
             <223> GRK1 promoter
             <220>
             <221> misc_feature
             <222> (1791)..(1887)
             <223> SV40 intron
             <220>
             <221> misc_feature
             <222> (1940)..(1948)
             <223> Kozak
             <220>
             <221> misc_feature
```

```
          (Sequence Listing Free Text)
            The following information
     is provided for sequences containing free
        text under numeric identifier <223>.

SEQ ID NO    Free Text under <223>

<222> (1949)..(1975)
             <223> Myr tag
             <220>
             <221> misc_feature
             <222> (1994)..(2020)
             <223> HA
             <220>
             <221> CDS
             <222> (2033)..(3472)
             <223> hAKT3
             <220>
             <221> misc_feature
             <222> (3494)..(3605)
             <223> bGH poly(A) signal
             <220>
             <221> misc_feature
             <222> (3739)..(3868)
             <223> 3' ITR
    4        <223> Synthetic Construct
    5        <223> synthetic construct
             <220>
             <221> misc_feature
             <222> (1493)..(1796)
             <223> CMV enhancer
             <220>
             <221> misc_feature
             <222> (1798)..(2075)
             <223> chicken beta-actin promoter
             <220>
             <221> misc_feature
             <222> (3111)..(3116)
             <223> Kozak
             <220>
             <221> CDS
             <222> (3117)..(4556)
             <223> AKT3 OPT
             <220>
             <221> misc_feature
             <222> (4570)..(4777)
             <223> bGH poly(A) signal
    6        <223> Synthetic Construct
   13        <223> synthetic construct
   14        <223> primer sequence
   15        <223> primer sequence
   16        <223> primer sequence
   17        <223> primer sequence
   18        <223> primer sequence
   19        <223> primer sequence
   20        <223> primer sequence
   21        <223> primer sequence
```

All documents cited in this specification are incorporated herein by reference. U.S. Provisional Patent Application No. 62/813,587, filed Mar. 4, 2019 and U.S. Provisional Patent Application No. 62/821,705, filed Mar. 21, 2019, together with their sequence listings, are incorporated by reference in their entireties. The sequence listing filed herewith labeled "18-8380PCT_ST25.txt" and the sequences and text therein are incorporated by reference. While the invention has been described with reference to particular embodiments, it will be appreciated that modifications can be made without departing from the spirit of the invention. Such modifications are intended to fall within the scope of the appended claims.

What is claimed is:

1. An adeno-associated virus (AAV) vector comprising an AAV capsid having encapsidated therein a vector genome comprising AAV inverted terminal repeat (ITR) sequences and a coding sequence for a human protein kinase B 3 (AKT3) operably linked to expression control sequences that direct expression of the AKT3 in a host cell, wherein the coding sequence comprises a sequence at least 80% identical to SEQ ID NO:13.

2. The AAV vector of claim 1, wherein the coding sequence encodes the amino acid sequence of SEQ ID NO: 8.

3. The AAV vector according to claim 1, wherein the AKT3 coding sequence comprises SEQ ID NO: 13.

4. The AAV vector according to claim 1, wherein the expression control sequences comprise a chicken beta-actin promoter with CMV enhancer.

5. An adeno-associated virus (AAV) vector comprising an AAV capsid having encapsidated therein a vector genome comprising AAV inverted terminal repeat (ITR) sequences and a coding sequence for a human protein kinase B 3 (AKT3) operably linked to expression control sequences that direct expression of the AKT3 in a host cell, wherein the expression control sequences comprise a chicken beta-actin promoter with CMV enhancer sequence comprising nucleotides 1443 to 3104 of SEQ ID NO: 1 or nucleotides 1493 to 2075 of SEQ ID NO: 5.

6. The AAV vector according to claim 1, wherein the expression control sequences comprise a bovine growth hormone (bGH) poly (A) signal sequence.

7. The AAV vector according to claim 1, wherein the expression control sequences comprise a CMV/CBA promoter, a GRK1 promoter, or an hCAR promoter.

8. The AAV vector according to claim 1, wherein the expression control sequences comprise i) an ocular cell-specific promoter or ii) a promoter selected from human EF1a promoter, metabotropic glutamate receptor 6 (mGluR6) promoter, rhodopsin promoter, cone opsin promoters, and transcription factor promoters.

9. The AAV vector according to claim 1, wherein the expression control sequences comprise i) a promoter selected from an inducible promoter, a constitutive promoter, and a tissue-specific promoter or ii) an inducible promoter selected from a rapamycin/rapalog promoter, an ecdysone promoter, an estrogen-responsive promoter, a tetracycline-responsive promoter, and a heterodimeric repressor switch.

10. The AAV vector according to claim 1, wherein the vector genome comprises one or more of an intron, a Kozak sequence, a polyA sequence, and a post-transcriptional regulatory element.

11. The AAV vector according to claim 1, wherein the AAV capsid is an AAV2, AAV5, AAV8, AAV9, AAV8 bp, or AAV7m8 capsid, or a variant thereof.

12. A pharmaceutical composition comprising a pharmaceutically acceptable carrier and anthe AAV vector according to claim 1.

13. The AAV vector according to claim 5, wherein the coding sequence comprises a sequence at least 80% identical to SEQ ID NO: 13.

14. The AAV vector according to claim 5, wherein the coding sequence comprises SEQ ID NO: 13.

15. The AAV vector according to claim 5, wherein the AAV capsid is an AAV2, AAV5, AAV8, AAV9, AAV8 bp, or AAV7m8 capsid, or a variant thereof.

16. A pharmaceutical composition comprising a pharmaceutically acceptable carrier and the AAV vector according to claim 5.

17. The AAV vector according to claim 1, wherein the expression control sequences comprise a chicken beta-actin promoter with CMV enhancer sequence comprising nucleotides 1443 to 3104 of SEQ ID NO: 1 or nucleotides 1493 to 2075 of SEQ ID NO: 5.

* * * * *

SEQUENCE LISTING

```
<160> NUMBER OF SEQ ID NOS: 21

<210> SEQ ID NO 1
<211> LENGTH: 11670
<212> TYPE: DNA
<213> ORGANISM: Artificial Sequence
<220> FEATURE:
<223> OTHER INFORMATION: synthetic construct
<220> FEATURE:
<221> NAME/KEY: misc_feature
<222> LOCATION: (1253)..(1382)
<223> OTHER INFORMATION: 5' ITR
<220> FEATURE:
<221> NAME/KEY: misc_feature
<222> LOCATION: (1443)..(3104)
<223> OTHER INFORMATION: CMV/CBA Hybrid Promoter
<220> FEATURE:
<221> NAME/KEY: misc_feature
<222> LOCATION: (3121)..(3129)
<223> OTHER INFORMATION: Kozak
<220> FEATURE:
<221> NAME/KEY: misc_feature
<222> LOCATION: (3130)..(3156)
<223> OTHER INFORMATION: Myr tag
<220> FEATURE:
<221> NAME/KEY: misc_feature
<222> LOCATION: (3175)..(3201)
<223> OTHER INFORMATION: HA
<220> FEATURE:
<221> NAME/KEY: CDS
<222> LOCATION: (3214)..(4653)
<223> OTHER INFORMATION: hAKT3 (isoform 1)
<220> FEATURE:
<221> NAME/KEY: misc_feature
<222> LOCATION: (4672)..(4893)
<223> OTHER INFORMATION: BGH PolA
<220> FEATURE:
<221> NAME/KEY: misc_feature
<222> LOCATION: (4941)..(5070)
<223> OTHER INFORMATION: 3' ITR

<400> SEQUENCE: 1
tagaaaaact catcgagcat caaatgaaac tgcaatttat tcatatcagg attatcaata      60
ccatattttt gaaaaagccg tttctgtaat gaaggagaaa actcaccgag gcagttccat     120
aggatggcaa gatcctggta tcggtctgcg attccgactc gtccaacatc aatacaacct     180
attaatttcc cctcgtcaaa aataaggtta tcaagtgaga atcaccatg agtgacgact       240 gaatccggtg agaatggcaa aagtttatgc atttcttcc agacttgttc aacaggccag      300
ccattacgct cgtcatcaaa atcactcgca tcaaccaaac cgttattcat tcgtgattgc     360
gcctgagcga ggcgaaatac gcgatcgctg ttaaaaggac aattacaaac aggaatcgag     420
tgcaaccggc gcaggaacac tgccagcgca tcaacaatat tttcacctga atcaggatat     480
tcttctaata cctggaacgc tgttttccg gggatcgcag tggtgagtaa ccatgcatca      540
tcaggagtac ggataaaatg cttgatggtc ggaagtggca taaattccgt cagccagttt     600
agtctgacca tctcatctgt aacatcattg gcaacgctac ctttgccatg tttcagaaac     660
aactctggcg catcgggctt cccatacaag cgatagattg tcgcacctga ttgcccgaca     720
ttatcgcgag cccatttata cccatataaa tcagcatcca tgttggaatt taatcgcggc     780
```

```
ctcgacgttt cccgttgaat atggctcata ttcttccttt ttcaatatta ttgaagcatt     840
tatcagggtt attgtctcat gagcggatac atatttgaat gtatttagaa aaataaacaa     900 atagggtca gtgttacaac caattaacca attctgaaca ttatcgcgag cccatttata      960
cctgaatatg gctcataaca ccccttgttt gcctggcggc agtagcgcgg tggtcccacc    1020
tgaccccatg ccgaactcag aagtgaaacg ccgtagcgcc gatggtagtg tggggactcc    1080
ccatgcgaga gtagggaact gccaggcatc aaataaaacg aaaggctcag tcgaaagact    1140
gggcctttcg cccgggctaa ttaggggtg tcgcccttat tcgactctat agtgaagttc     1200
ctattctcta gaaagtatag gaacttctga agtggggtcg acttaattaa ggctgcgcgc    1260
tcgctcgctc actgaggccg cccgggcaaa gcccgggcgt cgggcgacct ttggtcgccc    1320
ggcctcagtg agcgagcgag cgcgcagaga gggagtggcc aactccatca ctaggggttc    1380
cttgtagtta atgattaacc cgccatgcta cttatctacg tagcaagcta gctagttatt    1440
aatagtaatc aattacgggg tcattagttc atagcccata tatggagttc cgcgttacat    1500
aacttacggt aaatggcccg cctggctgac cgcccaacga ccccgcccca ttgacgtcaa    1560
taatgacgta tgttcccata gtaacgccaa tagggacttt ccattgacgt caatgggtgg    1620
agtatttacg gtaaactgcc cacttggcag tacatcaagt gtatcatatg ccaagtacgc    1680
cccctattga cgtcaatgac ggtaaatggc ccgcctggca ttatgcccag tacatgacct    1740
tatgggactt tcctacttgg cagtacatct acgtattagt catcgctatt aacatggtcg    1800
aggtgagccc cacgttctgc ttcactctcc ccatctcccc ccctccccca ccccaatttt    1860
tgtatttatt tattttttaa ttattttgtg cagcgatggg gcgggggggg gggggggggc    1920
gcgcgccagg cggggcgggg cggggcgagg ggcggggcgg ggcgaggcgg agaggtgcgg    1980
cggcagccaa tcagagcggc gcgctccgaa agtttccttt tatggcgagg cggcggcggc    2040
ggcggcccta taaaaagcga agcgcgcggc gggcggggag tcgctgcgac gctgccttcg    2100
ccccgtgccc cgctccgccg ccgcctcgcg ccgcccgccc cggctctgac tgaccgcgtt    2160
actcccacag gtgagcgggc gggacggccc ttctcctccg gctgtaatt agcgcttggt     2220 ttaatgacgc cttgtttctt ttctgtggct gcgtgaaagc cttgaggggc tccgggaggg    2280 cccttgtgc ggggggagcg gctcgggggg tgcgtgcgtg tgtgtgtgcg tggggagcgc     2340
cgcgtgcggc tccgcgctgc ccggcggctg tgagcgctgc gggcgcggcg cggggctttg    2400
tgcgctccgc agtgtgcgcg aggggagcgc ggccgggggc ggtgccccgc ggtgcggggg    2460
gggctgcgag gggaacaaag gctgcgtgcg gggtgtgtgc gtgggggggt gagcagggg     2520 tgtgggcgcg tcggtcgggc tgcaacccc cctgcacccc cctccccgag ttgctgagca     2580
cggcccggct tcgggtgcgg ggctccgtac ggggcgtggc gcgggctcg ccgtgccggg     2640 cggggggtgg cggcaggtgg gggtgccggg cggggcgggg ccgcctcggg ccggggaggg    2700 ctcggggag gggcgcggcg gccccggag cgccggcggc tgtcgaggcg cggcgagccg      2760
cagccattgc ctttttatggt aatcgtgcga gagggcgcag ggacttcctt tgtcccaaat   2820
ctgtgcggag ccgaaatctg ggaggcgccg ccgcacccc tctagcgggc gcggggcgaa     2880
gcggtgcggc gccggcagga aggaaatggg cgggagggc cttcgtgcgt cgccgcgccg    2940 ccgtccccttt ctccctctcc agcctcgggg ctgtccgcgg gggacggct gccttcgggg   3000 gggacggggc agggcggggt tcggcttctg gcgtgtgacc ggcggctcta gacaattgta    3060
ctaaccttct tctctttcct ctcctgacag gttggtgtac actagcggcc gcatagtact    3120
gccgccacca tggggagcag caagagcaag cccaaggacc ccagccagcg cgcctacgcc    3180
```

-continued

```
tacgacgtgc ccgactacgc ctccctcgga tct atg agc gat gtt acc att gtg    3234
                                    Met Ser Asp Val Thr Ile Val
                                     1               5 aaa gaa ggt tgg gtt cag aag agg gga gaa tat ata aaa aac tgg agg    3282
Lys Glu Gly Trp Val Gln Lys Arg Gly Glu Tyr Ile Lys Asn Trp Arg
        10              15              20 cca aga tac ttc ctt ttg aag aca gat ggc tca ttc ata gga tat aaa    3330
Pro Arg Tyr Phe Leu Leu Lys Thr Asp Gly Ser Phe Ile Gly Tyr Lys
    25              30              35 gag aaa cct caa gat gtg gat tta cct tat ccc ctc aac aac ttt tca    3378
Glu Lys Pro Gln Asp Val Asp Leu Pro Tyr Pro Leu Asn Asn Phe Ser
40              45              50              55 gtg gca aaa tgc cag tta atg aaa aca gaa cga cca aag cca aac aca    3426
Val Ala Lys Cys Gln Leu Met Lys Thr Glu Arg Pro Lys Pro Asn Thr
                60              65              70 ttt ata atc aga tgt ctc cag tgg act act gtt ata gag aga aca ttt    3474
Phe Ile Ile Arg Cys Leu Gln Trp Thr Thr Val Ile Glu Arg Thr Phe
            75              80              85 cat gta gat act cca gag gaa agg gaa gaa tgg aca gaa gct atc cag    3522
His Val Asp Thr Pro Glu Glu Arg Glu Glu Trp Thr Glu Ala Ile Gln
        90              95              100 gct gta gca gac aga ctg cag agg caa gaa gag gag aga atg aat tgt    3570
Ala Val Ala Asp Arg Leu Gln Arg Gln Glu Glu Glu Arg Met Asn Cys
    105             110             115 agt cca act tca caa att gat aat ata gga gag gaa gag atg gat gcc    3618
Ser Pro Thr Ser Gln Ile Asp Asn Ile Gly Glu Glu Glu Met Asp Ala
120             125             130             135 tct aca acc cat cat aaa aga aag aca atg aat gat ttt gac tat ttg    3666
Ser Thr Thr His His Lys Arg Lys Thr Met Asn Asp Phe Asp Tyr Leu
                140             145             150 aaa cta cta ggt aaa ggc act ttt ggg aaa gtt att ttg gtt cga gag    3714
Lys Leu Leu Gly Lys Gly Thr Phe Gly Lys Val Ile Leu Val Arg Glu
            155             160             165 aag gca agt gga aaa tac tat gct atg aag att ctg aag aaa gaa gtc    3762
Lys Ala Ser Gly Lys Tyr Tyr Ala Met Lys Ile Leu Lys Lys Glu Val
        170             175             180 att att gca aag gat gaa gtg gca cac act cta act gaa agc aga gta    3810
Ile Ile Ala Lys Asp Glu Val Ala His Thr Leu Thr Glu Ser Arg Val
    185             190             195 tta aag aac act aga cat ccc ttt tta aca tcc ttg aaa tat tcc ttc    3858
Leu Lys Asn Thr Arg His Pro Phe Leu Thr Ser Leu Lys Tyr Ser Phe
200             205             210             215 cag aca aaa gac cgt ttg tgt ttt gtg atg gaa tat gtt aat ggg ggc    3906
Gln Thr Lys Asp Arg Leu Cys Phe Val Met Glu Tyr Val Asn Gly Gly
                220             225             230 gag ctg ttt ttc cat ttg tcg aga gag cgg gtg ttc tct gag gac cgc    3954
Glu Leu Phe Phe His Leu Ser Arg Glu Arg Val Phe Ser Glu Asp Arg
            235             240             245 aca cgt ttc tat ggt gca gaa att gtc tct gcc ttg gac tat cta cat    4002
Thr Arg Phe Tyr Gly Ala Glu Ile Val Ser Ala Leu Asp Tyr Leu His
        250             255             260 tcc gga aag att gtg tac cgt gat ctc aag ttg gag aat cta atg ctg    4050
Ser Gly Lys Ile Val Tyr Arg Asp Leu Lys Leu Glu Asn Leu Met Leu
    265             270             275 gac aaa gat ggc cac ata aaa att aca gat ttt gga ctt tgc aaa gaa    4098
Asp Lys Asp Gly His Ile Lys Ile Thr Asp Phe Gly Leu Cys Lys Glu
280             285             290             295 ggg atc aca gat gca gcc acc atg aag aca ttc tgt ggc act cca gaa    4146
Gly Ile Thr Asp Ala Ala Thr Met Lys Thr Phe Cys Gly Thr Pro Glu
```

-continued

|     |     |     | 300 |     |     |     | 305 |     |     |     | 310 |     |     |     |     |
|-----|-----|-----|-----|-----|-----|-----|-----|-----|-----|-----|-----|-----|-----|-----|-----|

| tat | ctg | gca | cca | gag | gtg | tta | gaa | gat | aat | gac | tat | ggc | cga | gca | gta | 4194 |
| Tyr | Leu | Ala | Pro | Glu | Val | Leu | Glu | Asp | Asn | Asp | Tyr | Gly | Arg | Ala | Val | |
| | | | 315 | | | | | 320 | | | | | 325 | | | |

| gac | tgg | tgg | ggc | cta | ggg | gtt | gtc | atg | tat | gaa | atg | atg | tgt | ggg | agg | 4242 |
| Asp | Trp | Trp | Gly | Leu | Gly | Val | Val | Met | Tyr | Glu | Met | Met | Cys | Gly | Arg | |
| | | 330 | | | | | 335 | | | | | 340 | | | | |

| tta | cct | ttc | tac | aac | cag | gac | cat | gag | aaa | ctt | ttt | gaa | tta | ata | tta | 4290 |
| Leu | Pro | Phe | Tyr | Asn | Gln | Asp | His | Glu | Lys | Leu | Phe | Glu | Leu | Ile | Leu | |
| | 345 | | | | | 350 | | | | | 355 | | | | | |

| atg | gaa | gac | att | aaa | ttt | cct | cga | aca | ctc | tct | tca | gat | gca | aaa | tca | 4338 |
| Met | Glu | Asp | Ile | Lys | Phe | Pro | Arg | Thr | Leu | Ser | Ser | Asp | Ala | Lys | Ser | |
| 360 | | | | | 365 | | | | | 370 | | | | | 375 | |

| ttg | ctt | tca | ggg | ctc | ttg | ata | aag | gat | cca | aat | aaa | cgc | ctt | ggt | gga | 4386 |
| Leu | Leu | Ser | Gly | Leu | Leu | Ile | Lys | Asp | Pro | Asn | Lys | Arg | Leu | Gly | Gly | |
| | | | | 380 | | | | | 385 | | | | | 390 | | |

| gga | cca | gat | gat | gca | aaa | gaa | att | atg | aga | cac | agt | ttc | ttc | tct | gga | 4434 |
| Gly | Pro | Asp | Asp | Ala | Lys | Glu | Ile | Met | Arg | His | Ser | Phe | Phe | Ser | Gly | |
| | | | 395 | | | | | 400 | | | | | 405 | | | |

| gta | aac | tgg | caa | gat | gta | tat | gat | aaa | aag | ctt | gta | cct | cct | ttt | aaa | 4482 |
| Val | Asn | Trp | Gln | Asp | Val | Tyr | Asp | Lys | Lys | Leu | Val | Pro | Pro | Phe | Lys | |
| | | 410 | | | | | 415 | | | | | 420 | | | | |

| cct | caa | gta | aca | tct | gag | aca | gat | act | aga | tat | ttt | gat | gaa | gaa | ttt | 4530 |
| Pro | Gln | Val | Thr | Ser | Glu | Thr | Asp | Thr | Arg | Tyr | Phe | Asp | Glu | Glu | Phe | |
| | 425 | | | | | 430 | | | | | 435 | | | | | |

| aca | gct | cag | act | att | aca | ata | aca | cca | cct | gaa | aaa | tat | gat | gag | gat | 4578 |
| Thr | Ala | Gln | Thr | Ile | Thr | Ile | Thr | Pro | Pro | Glu | Lys | Tyr | Asp | Glu | Asp | |
| 440 | | | | | 445 | | | | | 450 | | | | | 455 | |

| ggt | atg | gac | tgc | atg | gac | aat | gag | agg | cgg | ccg | cat | ttc | cct | caa | ttt | 4626 |
| Gly | Met | Asp | Cys | Met | Asp | Asn | Glu | Arg | Arg | Pro | His | Phe | Pro | Gln | Phe | |
| | | | | 460 | | | | | 465 | | | | | 470 | | |

| tcc | tac | tct | gca | agt | gga | cga | gaa | taa | agtactgcgg | atcctgcaga | | | | | | 4673 |
| Ser | Tyr | Ser | Ala | Ser | Gly | Arg | Glu | | | | | | | | | |
| | | | 475 | | | | | | | | | | | | | | tctgcctcga ctgtgccttc tagttgccag ccatctgttg tttgcccctc cccgtgcct 4733 tccttgaccc tggaaggtgc cactcccact gtcctttcct aataaaatga ggaaattgca 4793 tcgcattgtc tgagtaggtg tcattctatt ctgggggtg gggtggggca ggacagcaag 4853 ggggaggatt gggaagacaa tagcaggcat gctggggact cgagttctac gtagataagt 4913 agcatggcgg gttaatcatt aactacaagg aacccctagt gatggagttg ccactccct 4973 ctctgcgcgc tcgctcgctc actgaggccg ggcgaccaaa ggtcgcccga cgccgggct 5033 ttgcccgggc ggcctcagtg agcgagcgag cgcgcagcct taattaacct aaggaaaatg 5093 aagtgaagtt cctatacttt ctagagaata ggaacttcta tagtgagtcg aataagggcg 5153 acacaaaatt tattctaaat gcataataaa tactgataac atcttatagt ttgtattata 5213 ttttgtatta tcgttgacat gtataatttt gatatcaaaa actgattttc cctttattat 5273 tttcgagatt tattttctta attctcttta acaaactaga aatattgtat atacaaaaaa 5333 tcataaataa tagatgaata gtttaattat aggtgttcat caatcgaaaa agcaacgtat 5393 cttatttaaa gtgcgttgct ttttttctcat ttataaggtt aaataattct catatatcaa 5453 gcaaagtgac aggcgcccctt aaatattctg acaaatgctc tttccctaaa ctcccccat 5513 aaaaaaaccc gccgaagcgg gttttttacgt tatttgcgga ttaacgatta ctcgttatca 5573 gaaccgccca gggggcccga gcttaacctt ttatttggg ggagagggaa gtcatgaaaa 5633 aactaacctt tgaaattcga tctccagcac atcagcaaaa cgctattcac gcagtacagc 5693

```
aaatccttcc agacccaacc aaaccaatcg tagtaaccat tcaggaacgc aaccgcagct    5753
tagaccaaaa caggaagcta tgggcctgct taggtgacgt ctctcgtcag gttgaatggc    5813
atggtcgctg gctggatgca gaaagctgga agtgtgtgtt taccgcagca ttaaagcagc    5873
aggatgttgt tcctaacctt gccgggaatg gctttgtggt aataggccag tcaaccagca    5933
ggatgcgtgt aggcgaattt gcggagctat tagagcttat acaggcattc ggtacagagc    5993
gtggcgttaa gtggtcagac gaagcgagac tggctctgga gtggaaagcg agatggggag    6053
acagggctgc atgataaatg tcgttagttt ctccggtggc aggacgtcag catatttgct    6113
ctggctaatg gagcaaaagc gacgggcagg taaagacgtg cattacgttt tcatggatac    6173
aggttgtgaa catccaatga catatcggtt tgtcagggaa gttgtgaagt tctgggatat    6233
accgctcacc gtattgcagg ttgatatcaa cccggagctt ggacagccaa atggttatac    6293
ggtatgggaa ccaaaggata ttcagacgcg aatgcctgtt ctgaagccat ttatcgatat    6353
ggtaaagaaa tatggcactc catcgtcgg cggcgcgttc tgcactgaca gattaaaact    6413
cgttcccttc accaaatact gtgatgacca tttcggggcga gggaattaca ccacgtggat    6473
tggcatcaga gctgatgaac cgaagcggct aaagccaaag cctggaatca gatatcttgc    6533
tgaactgtca gactttgaga aggaagatat cctcgcatgg tggaagcaac aaccattcga    6593
tttgcaaata ccggaacatc tcggtaactg catattctgc attaaaaaat caacgcaaaa    6653
aatcggactt gcctgcaaag atgaggaggg attgcagcgt gtttttaatg aggtcatcac    6713
gggatcccat gtgcgtgacg gacatcggga aacgccaaag gagattatgt accgaggaag    6773
aatgtcgctg gacggtatcg cgaaaatgta ttcagaaaat gattatcaag ccctgtatca    6833
ggacatggta cgagctaaaa gattcgatac cggctcttgt tctgagtcat gcgaaatatt    6893
tggagggcag cttgatttcg acttcgggag ggaagctgca tgatgcgatg ttatcggtgc    6953
ggtgaatgca aagaagataa ccgcttccga ccaaatcaac cttactggaa tcgatggtgt    7013
ctccggtgtg aaagaacacc aacaggggtg ttaccactac cgcaggaaaa ggaggacgtg    7073
tggcgagaca cgcgacgaagt atcaccgaca taatctgcga aaactgcaaa taccttccaa    7133
cgaaacgcac cagaaataaa cccaagccaa tcccaaaaga atctgacgta aaaaccttca    7193
actacacggc tcacctgtgg gatatccggt ggctaagacg tcgtgcgagg aaaacaaggt    7253
gattgaccaa aatcgaagtt acgaacaaga aagcgtcgag cgagctttaa cgtgcgctaa    7313
ctgcggtcag aagctgcatg tgctggaagt tcacgtgtgt gagcactgct gcgcagaact    7373
gatgagcgat ccgaatagct cgatgcacga ggaagaagat gatggctaaa ccagcgcgaa    7433
gacgatgtaa aaacgatgaa tgccgggaat ggtttcaccc tgcattcgct aatcagtggt    7493
ggtgctctcc agagtgtgga accaagatag cactcgaacg acgaagtaaa gaacgcgaaa    7553
aagcggaaaa agcagcagag aagaaacgac gacgagagga gcagaaacag aaagataaac    7613
ttaagattcg aaaactcgcc ttaaagcccc gcagttactg gattaaacaa gcccaacaag    7673
ccgtaaacgc cttcatcaga gaaagagacc gcgacttacc atgtatctcg tgcggaacgc    7733
tcacgtctgc tcagtgggat gccggacatt accggacaac tgctgcggca cctcaactcc    7793
gatttaatga acgcaatatt cacaagcaat gcgtggtgtg caaccagcac aaaagcggaa    7853
atctcgttcc gtatcgcgtc gaactgatta gccgcatcgg gcaggaagca gtagacgaaa    7913
tcgaatcaaa ccataaccgc catcgctgga ctatcgaaga gtgcaaggcg atcaaggcag    7973
agtaccaaca gaaactcaaa gacctgcgaa atagcagaag tgaggccgca tgacgttctc    8033
```

-continued

```
agtaaaaacc attccagaca tgctcgttga agcatacgga aatcagacag aagtagcacg   8093
cagactgaaa tgtagtcgcg gtacggtcag aaaatacgtt gatgataaag acgggaaaat   8153
gcacgccatc gtcaacgacg ttctcatggt tcatcgcgga tggagtgaaa gagatgcgct   8213
attacgaaaa aattgatggc agcaaatacc gaaatatttg ggtagttggc gatctgcacg   8273
gatgctacac gaacctgatg aacaaactgg atacgattgg attcgacaac aaaaaagacc   8333
tgcttatctc ggtgggcgat ttggttgatc gtggtgcaga gaacgttgaa tgcctggaat   8393
taatcacatt cccctggttc agagctgtac gtggaaacca tgagcaaatg atgattgatg   8453
gcttatcaga gcgtggaaac gttaatcact ggctgcttaa tggcggtggc tggttcttta   8513
atctcgatta cgacaaagaa attctggcta agctcttgc ccataaagca gatgaacttc    8573
cgttaatcat cgaactggtg agcaaagata aaaatatgt tatctgccac gccgattatc    8633
cctttgacga atacgagttt ggaaagccag ttgatcatca gcaggtaatc tggaaccgcg   8693
aacgaatcag caactcacaa aacgggatcg tgaaagaaat caaaggcgcg gacacgttca   8753
tctttggtca tacgccagca gtgaaaccac tcaagtttgc caaccaaatg tatatcgata   8813
ccggcgcagt gttctgcgga aacctaacat tgattcaggt acaggagaa ggcgcatgag    8873
actcgaaagc gtagctaaat tcattcgcc aaaaagcccg atgatgagcg actcaccacg    8933
ggccacggct tctgactctc tttccggtac tgatgtgatg gctgctatgg ggatggcgca   8993
atcacaagcc ggattcggta tggctgcatt ctgcggtaag cacgaactca gccagaacga   9053
caaacaaaag gctatcaact atctgatgca atttgcacac aaggtatcgg ggaaataccg   9113
tggtgtggca aagcttgaag gaaatactaa ggcaaaggta ctgcaagtgc tcgcaacatt   9173
cgcttatgcg gattattgcc gtagtgccgc gacgccgggg gcaagatgca gagattgcca   9233
tggtacaggc cgtgcggttg atattgccaa acagagctg tgggggagag ttgtcgagaa    9293
agagtgcgga agatgcaaag gcgtcggcta ttcaaggatg ccagcaagcg cagcatatcg   9353
cgctgtgacg atgctaatcc caaaccttac ccaacccacc tggtcacgca ctgttaagcc   9413
gctgtatgac gctctggtgg tgcaatgcca caaagaagag tcaatcgcag acaacatttt   9473
gaatgcggtc acacgttagc agcatgattg ccacggatgg caacatatta acggcatgat   9533
attgacttat tgaataaaat tgggtaaatt tgactcaacg atgggttaat tcgctcgttg   9593
tggtagtgag atgaaaagag gcggcgctta ctaccgattc cgcctagttg gtcacttcga   9653
cgtatcgtct ggaactccaa ccatcgcagg cagagaggtc tgcaaaatgc aatcccgaaa   9713
cagttcgcag gtaatagtta gagcctgcat aacggtttcg ggattttta tatctgcaca    9773
acaggtaaga gcattgagtc gataatcgtg aagagtcggc gagcctggtt agccagtgct   9833
ctttccgttg tgctgaatta agcgaatacc ggaagcagaa ccggatcacc aaatgcgtac   9893
aggcgtcatc gccgcccagc aacagcacaa cccaaactga gccgtagcca ctgtctgtcc   9953
tgaattcatt agtaatagtt acgctgcggc cttttacaca tgaccttcgt gaaagcgggt   10013
ggcaggaggt cgcgctaaca acctcctgcc gttttgcccg tgcatatcgg tcacgaacaa   10073
atctgattac taaacacagt agcctggatt tgttctatca gtaatcgacc ttattcctaa   10133
ttaaatagag caaatcccct tattgggggt aagacatgaa gatgccagaa aaacatgacc   10193
tgttggccgc cattctcgcg gcaaaggaac aaggcatcgg ggcaatcctt gcgtttgcaa   10253
tggcgtacct tcgcggcaga tataatggcg gtgcgtttac aaaaacagta atcgacgcaa   10313
cgatgtgcgc cattatcgcc tggttcattc gtgaccttct cgacttcgcc ggactaagta   10373
gcaatctcgc ttatataacg agcgtgttta tcggctacat cggtactgac tcgattggtt   10433
```

```
cgcttatcaa acgcttcgct gctaaaaaag ccggagtaga agatggtaga aatcaataat    10493
caacgtaagg cgttcctcga tatgctggcg tggtcggagg gaactgataa cggacgtcag    10553
aaaaccagaa atcatggtta tgacgtcatt gtaggcggag agctatttac tgattactcc    10613
gatcaccctc gcaaacttgt cacgctaaac ccaaaactca aatcaacagg cgcttaagac    10673
tggccgtcgt tttacaacac agaaagagtt tgtagaaacg caaaaaggcc atccgtcagg    10733
ggccttctgc ttagtttgat gcctggcagt tccctactct cgccttccgc ttcctcgctc    10793
actgactcgc tgcgctcggt cgttcggctg cggcgagcgg tatcagctca ctcaaaggcg    10853
gtaatacggt tatccacaga atcagggdat aacgcaggaa agaacatgtg agcaaaaggc    10913
cagcaaaagg ccaggaaccg taaaaaggcc gcgttgctgg cgtttttcca taggctccgc    10973 cccctgacg agcatcacaa aaatcgacgc tcaagtcaga ggtggcgaaa cccgacagga    11033
ctataaagat accaggcgtt tccccctgga agctccctcg tgcgctctcc tgttccgacc    11093
ctgccgctta ccggatacct gtccgccttt ctcccttcgg gaagcgtggc gctttctcat    11153
agctcacgct gtaggtatct cagttcggtg taggtcgttc gctccaagct gggctgtgtg    11213
cacgaacccc ccgttcagcc cgaccgctgc gccttatccg gtaactatcg tcttgagtcc    11273
aacccggtaa gacacgactt atcgccactg gcagcagcca ctggtaacag gattagcaga    11333
gcgaggtatg taggcggtgc tacagagttc ttgaagtggt gggctaacta cggctacact    11393
agaagaacag tatttggtat ctgcgctctg ctgaagccag ttaccttcgg aaaaagagtt    11453
ggtagctctt gatccggcaa acaaaccacc gctggtagcg gtggttttt tgtttgcaag    11513 cagcagatta cgcgcagaaa aaaggatct caagaagatc ctttgatctt ttctacgggg    11573
tctgacgctc agtggaacga cgcgcgcgta actcacgtta agggattttg gtcatgagct    11633
tgcgccgtcc cgtcaagtca gcgtaatgct ctgcttt                              11670
```

<210> SEQ ID NO 2
<211> LENGTH: 479
<212> TYPE: PRT
<213> ORGANISM: Artificial Sequence
<220> FEATURE:
<223> OTHER INFORMATION: Synthetic Construct

<400> SEQUENCE: 2

```
Met Ser Asp Val Thr Ile Val Lys Glu Gly Trp Val Gln Lys Arg Gly
 1               5                  10                  15

Glu Tyr Ile Lys Asn Trp Arg Pro Arg Tyr Phe Leu Leu Lys Thr Asp
            20                  25                  30

Gly Ser Phe Ile Gly Tyr Lys Glu Lys Pro Gln Asp Val Asp Leu Pro
        35                  40                  45

Tyr Pro Leu Asn Asn Phe Ser Val Ala Lys Cys Gln Leu Met Lys Thr
    50                  55                  60

Glu Arg Pro Lys Pro Asn Thr Phe Ile Ile Arg Cys Leu Gln Trp Thr
65                  70                  75                  80

Thr Val Ile Glu Arg Thr Phe His Val Asp Thr Pro Glu Glu Arg Glu
                85                  90                  95

Glu Trp Thr Glu Ala Ile Gln Ala Val Ala Asp Arg Leu Gln Arg Gln
           100                 105                 110

Glu Glu Glu Arg Met Asn Cys Ser Pro Thr Ser Gln Ile Asp Asn Ile
       115                 120                 125

Gly Glu Glu Glu Met Asp Ala Ser Thr Thr His His Lys Arg Lys Thr
   130                 135                 140
```

Met Asn Asp Phe Asp Tyr Leu Lys Leu Leu Gly Lys Gly Thr Phe Gly
145                 150                 155                 160

Lys Val Ile Leu Val Arg Glu Lys Ala Ser Gly Lys Tyr Tyr Ala Met
                165                 170                 175

Lys Ile Leu Lys Lys Glu Val Ile Ile Ala Lys Asp Glu Val Ala His
                180                 185                 190

Thr Leu Thr Glu Ser Arg Val Leu Lys Asn Thr Arg His Pro Phe Leu
            195                 200                 205

Thr Ser Leu Lys Tyr Ser Phe Gln Thr Lys Asp Arg Leu Cys Phe Val
        210                 215                 220

Met Glu Tyr Val Asn Gly Gly Glu Leu Phe Phe His Leu Ser Arg Glu
225                 230                 235                 240

Arg Val Phe Ser Glu Asp Arg Thr Arg Phe Tyr Gly Ala Glu Ile Val
                245                 250                 255

Ser Ala Leu Asp Tyr Leu His Ser Gly Lys Ile Val Tyr Arg Asp Leu
                260                 265                 270

Lys Leu Glu Asn Leu Met Leu Asp Lys Asp Gly His Ile Lys Ile Thr
            275                 280                 285

Asp Phe Gly Leu Cys Lys Glu Gly Ile Thr Asp Ala Ala Thr Met Lys
290                 295                 300

Thr Phe Cys Gly Thr Pro Glu Tyr Leu Ala Pro Glu Val Leu Glu Asp
305                 310                 315                 320

Asn Asp Tyr Gly Arg Ala Val Asp Trp Trp Gly Leu Gly Val Val Met
                325                 330                 335

Tyr Glu Met Met Cys Gly Arg Leu Pro Phe Tyr Asn Gln Asp His Glu
                340                 345                 350

Lys Leu Phe Glu Leu Ile Leu Met Glu Asp Ile Lys Phe Pro Arg Thr
            355                 360                 365

Leu Ser Ser Asp Ala Lys Ser Leu Leu Ser Gly Leu Leu Ile Lys Asp
        370                 375                 380

Pro Asn Lys Arg Leu Gly Gly Gly Pro Asp Asp Ala Lys Glu Ile Met
385                 390                 395                 400

Arg His Ser Phe Phe Ser Gly Val Asn Trp Gln Asp Val Tyr Asp Lys
                405                 410                 415

Lys Leu Val Pro Pro Phe Lys Pro Gln Val Thr Ser Glu Thr Asp Thr
                420                 425                 430

Arg Tyr Phe Asp Glu Glu Phe Thr Ala Gln Thr Ile Thr Ile Thr Pro
            435                 440                 445

Pro Glu Lys Tyr Asp Glu Asp Gly Met Asp Cys Met Asp Asn Glu Arg
        450                 455                 460

Arg Pro His Phe Pro Gln Phe Ser Tyr Ser Ala Ser Gly Arg Glu
465                 470                 475

<210> SEQ ID NO 3
<211> LENGTH: 10468
<212> TYPE: DNA
<213> ORGANISM: Artificial Sequence
<220> FEATURE:
<223> OTHER INFORMATION: synthetic construct
<220> FEATURE:
<221> NAME/KEY: misc_feature
<222> LOCATION: (1253)..(1382)
<223> OTHER INFORMATION: 5' ITR
<220> FEATURE:
<221> NAME/KEY: misc_feature
<222> LOCATION: (1427)..(1887)
<223> OTHER INFORMATION: GRK1 promoter cassette

```
<220> FEATURE:
<221> NAME/KEY: misc_feature
<222> LOCATION: (1427)..(1790)
<223> OTHER INFORMATION: GRK1 promoter
<220> FEATURE:
<221> NAME/KEY: misc_feature
<222> LOCATION: (1791)..(1887)
<223> OTHER INFORMATION: SV40 intron
<220> FEATURE:
<221> NAME/KEY: misc_feature
<222> LOCATION: (1940)..(1948)
<223> OTHER INFORMATION: Kozak
<220> FEATURE:
<221> NAME/KEY: misc_feature
<222> LOCATION: (1949)..(1975)
<223> OTHER INFORMATION: Myr tag
<220> FEATURE:
<221> NAME/KEY: misc_feature
<222> LOCATION: (1994)..(2020)
<223> OTHER INFORMATION: HA
<220> FEATURE:
<221> NAME/KEY: CDS
<222> LOCATION: (2033)..(3472)
<223> OTHER INFORMATION: hAKT3
<220> FEATURE:
<221> NAME/KEY: misc_feature
<222> LOCATION: (3494)..(3605)
<223> OTHER INFORMATION: bGH poly(A) signal
<220> FEATURE:
<221> NAME/KEY: misc_feature
<222> LOCATION: (3739)..(3868)
<223> OTHER INFORMATION: 3' ITR

<400> SEQUENCE: 3
tagaaaaact catcgagcat caaatgaaac tgcaatttat tcatatcagg attatcaata      60
ccatattttt gaaaaagccg tttctgtaat gaaggagaaa actcaccgag gcagttccat     120
aggatggcaa gatcctggta tcggtctgcg attccgactc gtccaacatc aatacaacct     180
attaatttcc cctcgtcaaa aataaggtta tcaagtgaga atcaccatg agtgacgact      240 gaatccggtg agaatggcaa aagtttatgc atttctttcc agacttgttc aacaggccag     300
ccattacgct cgtcatcaaa atcactcgca tcaaccaaac cgttattcat tcgtgattgc     360
gcctgagcga ggcgaaatac gcgatcgctg ttaaaaggac aattacaaac aggaatcgag     420
tgcaaccggc gcaggaacac tgccagcgca tcaacaatat tttcacctga atcaggatat     480
tcttctaata cctggaacgc tgttttccg gggatcgcag tggtgagtaa ccatgcatca      540
tcaggagtac ggataaaatg cttgatggtc ggaagtggca taaattccgt cagccagttt     600
agtctgacca tctcatctgt aacatcattg gcaacgctac ctttgccatg tttcagaaac     660
aactctggcg catcgggctt cccatacaag cgatagattg tcgcacctga ttgcccgaca     720
ttatcgcgag cccatttata cccatataaa tcagcatcca tgttggaatt taatcgcggc     780
ctcgacgttt cccgttgaat atggctcata ttcttccttt tcaatatta ttgaagcatt      840 tatcagggtt attgtctcat gagcggatac atatttgaat gtatttagaa aaataaacaa     900
ataggggtca gtgttacaac caattaacca attctgaaca ttatcgcgag cccatttata     960
cctgaatatg gctcataaca ccccttgttt gcctggcggc agtagcgcgg tggtcccacc    1020 tgacccatg ccgaactcag aagtgaaacg ccgtagcgcc gatggtagtg tggggactcc     1080
ccatgcgaga gtagggaact gccaggcatc aaataaaacg aaaggctcag tcgaaagact    1140
gggcctttcg cccgggctaa ttagggggtg tcgcccttat tcgactctat agtgaagttc    1200
ctattctcta gaaagtatag gaacttctga agtggggtcg acttaattaa ggctgcgcgc    1260
tcgctcgctc actgaggccg cccgggcaaa gcccgggcgt cgggcgacct ttggtcgccc    1320
```

```
                                              -continued ggcctcagtg agcgagcgag cgcgcagaga gggagtggcc aactccatca ctaggggttc       1380
cttgtagtta atgattaacc cgccatgcta cttatctacg tagcaagcta gcaagatcca       1440
agctcagatc tcgatcgagt tgggcccccag aagcctggtg gttgtttgtc cttctcaggg      1500
gaaaagtgag gcggcccctt ggaggaaggg gccgggcaga atgatctaat cggattccaa       1560
gcagctcagg ggattgtctt tttctagcac cttcttgcca ctcctaagcg tcctccgtga       1620
ccccggctgg gatttagcct ggtgctgtgt cagccccggt ctcccagggg cttcccagtg       1680
gtccccagga accctcgaca gggcccggtc tctctcgtcc agcaagggca gggacgggcc       1740
acaggccaag ggccctcgat cgaggaactg aaaaaccaga agttaactg gtaagtttag        1800 tcttttttgtc ttttatttca ggtcccggat ccggtggtgg tgcaaatcaa agaactgctc      1860
ctcagtggat gttgcctta cttctaggcc tgtacggaag tgttacttct gctctaaaag        1920
ctgcggaatt gtaccgcgg ccgccaccat ggggagcagc aagagcaagc ccaaggaccc        1980
cagccagcgc gcctacgcct acgacgtgcc cgactacgcc tccctcggat ct atg agc       2038
                                                         Met Ser
                                                           1 gat gtt acc att gtg aaa gaa ggt tgg gtt cag aag agg gga gaa tat         2086
Asp Val Thr Ile Val Lys Glu Gly Trp Val Gln Lys Arg Gly Glu Tyr
        5              10                  15 ata aaa aac tgg agg cca aga tac ttc ctt ttg aag aca gat ggc tca         2134
Ile Lys Asn Trp Arg Pro Arg Tyr Phe Leu Leu Lys Thr Asp Gly Ser
 20                  25                  30 ttc ata gga tat aaa gag aaa cct caa gat gtg gat tta cct tat ccc         2182
Phe Ile Gly Tyr Lys Glu Lys Pro Gln Asp Val Asp Leu Pro Tyr Pro
35                  40                  45                  50 ctc aac aac ttt tca gtg gca aaa tgc cag tta atg aaa aca gaa cga         2230
Leu Asn Asn Phe Ser Val Ala Lys Cys Gln Leu Met Lys Thr Glu Arg
                55                  60                  65 cca aag cca aac aca ttt ata atc aga tgt ctc cag tgg act act gtt         2278
Pro Lys Pro Asn Thr Phe Ile Ile Arg Cys Leu Gln Trp Thr Thr Val
            70                  75                  80 ata gag aga aca ttt cat gta gat act cca gag gaa agg gaa gaa tgg         2326
Ile Glu Arg Thr Phe His Val Asp Thr Pro Glu Glu Arg Glu Glu Trp
        85                  90                  95 aca gaa gct atc cag gct gta gca gac aga ctg cag agg caa gaa gag         2374
Thr Glu Ala Ile Gln Ala Val Ala Asp Arg Leu Gln Arg Gln Glu Glu
    100                 105                 110 gag aga atg aat tgt agt cca act tca caa att gat aat ata gga gag         2422
Glu Arg Met Asn Cys Ser Pro Thr Ser Gln Ile Asp Asn Ile Gly Glu
115                 120                 125                 130 gaa gag atg gat gcc tct aca acc cat cat aaa aga aag aca atg aat         2470
Glu Glu Met Asp Ala Ser Thr Thr His His Lys Arg Lys Thr Met Asn
                135                 140                 145 gat ttt gac tat ttg aaa cta cta ggt aaa ggc act ttt ggg aaa gtt         2518
Asp Phe Asp Tyr Leu Lys Leu Leu Gly Lys Gly Thr Phe Gly Lys Val
            150                 155                 160 att ttg gtt cga gag aag gca agt gga aaa tac tat gct atg aag att         2566
Ile Leu Val Arg Glu Lys Ala Ser Gly Lys Tyr Tyr Ala Met Lys Ile
        165                 170                 175 ctg aag aaa gaa gtc att att gca aag gat gaa gtg gca cac act cta         2614
Leu Lys Lys Glu Val Ile Ile Ala Lys Asp Glu Val Ala His Thr Leu
    180                 185                 190 act gaa agc aga gta tta aag aac act aga cat ccc ttt tta aca tcc         2662
Thr Glu Ser Arg Val Leu Lys Asn Thr Arg His Pro Phe Leu Thr Ser
195                 200                 205                 210 ttg aaa tat tcc ttc cag aca aaa gac cgt ttg tgt ttt gtg atg gaa         2710
```

```
Leu Lys Tyr Ser Phe Gln Thr Lys Asp Arg Leu Cys Phe Val Met Glu
            215                 220                 225 tat gtt aat ggg ggc gag ctg ttt ttc cat ttg tcg aga gag cgg gtg       2758
Tyr Val Asn Gly Gly Glu Leu Phe Phe His Leu Ser Arg Glu Arg Val
            230                 235                 240 ttc tct gag gac cgc aca cgt ttc tat ggt gca gaa att gtc tct gcc       2806
Phe Ser Glu Asp Arg Thr Arg Phe Tyr Gly Ala Glu Ile Val Ser Ala
        245                 250                 255 ttg gac tat cta cat tcc gga aag att gtg tac cgt gat ctc aag ttg       2854
Leu Asp Tyr Leu His Ser Gly Lys Ile Val Tyr Arg Asp Leu Lys Leu
    260                 265                 270 gag aat cta atg ctg gac aaa gat ggc cac ata aaa att aca gat ttt       2902
Glu Asn Leu Met Leu Asp Lys Asp Gly His Ile Lys Ile Thr Asp Phe
275                 280                 285                 290 gga ctt tgc aaa gaa ggg atc aca gat gca gcc acc atg aag aca ttc       2950
Gly Leu Cys Lys Glu Gly Ile Thr Asp Ala Ala Thr Met Lys Thr Phe
                295                 300                 305 tgt ggc act cca gaa tat ctg gca cca gag gtg tta gaa gat aat gac       2998
Cys Gly Thr Pro Glu Tyr Leu Ala Pro Glu Val Leu Glu Asp Asn Asp
            310                 315                 320 tat ggc cga gca gta gac tgg tgg ggc cta ggg gtt gtc atg tat gaa       3046
Tyr Gly Arg Ala Val Asp Trp Trp Gly Leu Gly Val Val Met Tyr Glu
        325                 330                 335 atg atg tgt ggg agg tta cct ttc tac aac cag gac cat gag aaa ctt       3094
Met Met Cys Gly Arg Leu Pro Phe Tyr Asn Gln Asp His Glu Lys Leu
    340                 345                 350 ttt gaa tta ata tta atg gaa gac att aaa ttt cct cga aca ctc tct       3142
Phe Glu Leu Ile Leu Met Glu Asp Ile Lys Phe Pro Arg Thr Leu Ser
355                 360                 365                 370 tca gat gca aaa tca ttg ctt tca ggg ctc ttg ata aag gat cca aat       3190
Ser Asp Ala Lys Ser Leu Leu Ser Gly Leu Leu Ile Lys Asp Pro Asn
                375                 380                 385 aaa cgc ctt ggt gga gga cca gat gat gca aaa gaa att atg aga cac       3238
Lys Arg Leu Gly Gly Gly Pro Asp Asp Ala Lys Glu Ile Met Arg His
            390                 395                 400 agt ttc ttc tct gga gta aac tgg caa gat gta tat gat aaa aag ctt       3286
Ser Phe Phe Ser Gly Val Asn Trp Gln Asp Val Tyr Asp Lys Lys Leu
        405                 410                 415 gta cct cct ttt aaa cct caa gta aca tct gag aca gat act aga tat       3334
Val Pro Pro Phe Lys Pro Gln Val Thr Ser Glu Thr Asp Thr Arg Tyr
    420                 425                 430 ttt gat gaa gaa ttt aca gct cag act att aca ata aca cca cct gaa       3382
Phe Asp Glu Glu Phe Thr Ala Gln Thr Ile Thr Ile Thr Pro Pro Glu
435                 440                 445                 450 aaa tat gat gag gat ggt atg gac tgc atg gac aat gag agg cgg ccg       3430
Lys Tyr Asp Glu Asp Gly Met Asp Cys Met Asp Asn Glu Arg Arg Pro
                455                 460                 465 cat ttc cct caa ttt tcc tac tct gca agt gga cga gaa taa              3472
His Phe Pro Gln Phe Ser Tyr Ser Ala Ser Gly Arg Glu
            470                 475 tgtacaagta ataagcctcg actgtgcctt ctagttgcca gccatctgtt gtttgcccct     3532
cccccgtgcc ttccttgacc ctggaaggtg ccactcccac tgtcctttcc taataaaatg     3592
aggaaattgc atcgcattgt ctgagtaggt gtcattctat tctgggggt ggggtggggc      3652 aggacagcaa gggggaggat tgggaagaca atagcaggtc gagttctacg tagataagta     3712
gcatggcggg ttaatcatta actacaagga acccctagtg atggagttgg ccactccctc     3772
tctgcgcgct cgctcgctca ctgaggccgg gcgaccaaag gtcgcccgac gcccgggctt     3832
```

```
tgcccgggcg gcctcagtga gcgagcgagc gcgcagcctt aattaaccta aggaaaatga    3892
agtgaagttc ctatactttc tagagaatag gaacttctat agtgagtcga ataagggcga    3952
cacaaaattt attctaaatg cataataaat actgataaca tcttatagtt tgtattatat    4012
tttgtattat cgttgacatg tataattttg atatcaaaaa ctgattttcc ctttattatt    4072
ttcgagattt attttcttaa ttctctttaa caaactagaa atattgtata tacaaaaaat    4132
cataaataat agatgaatag tttaattata ggtgttcatc aatcgaaaaa gcaacgtatc    4192
ttatttaaag tgcgttgctt ttttctcatt tataagGTTA ATAATTCTC ATATATCAAG    4252 caaagtgaca ggcgccctta aatattctga caaatgctct ttccctaaac tcccccata    4312 aaaaaacccg ccgaagcggg ttttTACGTT ATTTGCGGAT TAACGATTAC TCGTTATCAG    4372
aaccgcccag ggggcccgag cttaacCTTT TTATTTGGGG GAGAGGGAAG TCATGAAAAA    4432
actaaccttt gaaattcgat ctccagcaca tcagcaaaac gctattcacg cagtacagca    4492
aatccttcca gacccaacca aaccaatcgt agtaaccatt caggaacgca accgcagctt    4552
agaccaaaac aggaagctat gggcctgctt aggtgacgtc tctcgtcagg ttgaatggca    4612
tggtcgctgg ctggatgcag aaagctggaa gtgtgtgttt accgcagcat taaagcagca    4672
ggatgttgtt cctaaccttg ccgggaatgg ctttgtggta ataggccagt caaccagcag    4732
gatgcgtgta ggcgaatttg cggagctatt agagcttata caggcattcg gtacagagcg    4792
tggcgttaag tggtcagacg aagcgagact ggctctggag tggaaagcga gatgggagaa    4852
cagggctgca tgataaatgt cgttagtttc tccggtggca ggacgtcagc atatttgctc    4912
tggctaatgg agcaaaagcg acgggcaggt aaagacgtgc attacgtttt catggataca    4972
ggttgtgaac atccaatgac atatcggttt gtcagggaag ttgtgaagtt ctgggatata    5032
ccgctcaccg tattgcaggt tgatatcaac ccggagcttg acagccaaa tggttatacg    5092 gtatgggaac caaaggatat tcagacgcga atgcctgttc tgaagccatt tatcgatatg    5152
gtaaagaaat atggcactcc atacgtcggc ggcgcgttct gcactgacag attaaaactc    5212
gttcccttca ccaaatactg tgatgaccat ttcgggcgag ggaattacac cacgtggatt    5272
ggcatcagag ctgatgaacc gaagcggcta aagccaaagc ctggaatcag atatcttgct    5332
gaactgtcag actttgagaa ggaagatatc ctcgcatggt ggaagcaaca accattcgat    5392
ttgcaaatac cggaacatct cggtaactgc atattctgca ttaaaaaatc aacgcaaaaa    5452
atcggacttg cctgcaaaga tgaggaggga ttgcagcgtg ttttttaatga ggtcatcacg    5512 ggatcccatg tgcgtgacgg acatcgggaa acgccaaagg agattatgta ccgaggaaga    5572
atgtcgctgg acggtatcgc gaaaatgtat tcagaaaatg attatcaagc cctgtatcag    5632
gacatggtac gagctaaaag attcgatacc ggctcttgtt ctgagtcatg cgaaatattt    5692
ggagggcagc ttgatttcga cttcgggagg gaagctgcat gatgcgatgt tatcggtgcg    5752
gtgaatgcaa agaagataac cgcttccgac caaatcaacc ttactggaat cgatggtgtc    5812
tccggtgtga agaacaccac aggggtgt taccactacc gcaggaaaag gaggacgtgt    5872
ggcgagacag cgacgaagta tcaccgacat aatctgcgaa aactgcaaat accttccaac    5932
gaaacgcacc agaaataaac ccaagccaat cccaaaagaa tctgacgtaa aaaccttcaa    5992
ctacacggct cacctgtggg atatccggtg gctaagacgt cgtgcgagga aaacaaggtg    6052
attgaccaaa atcgaagtta cgaacaagaa agcgtcgagc gagctttaac gtgcgctaac    6112
tgcggtcaga agctgcatgt gctggaagtt cacgtgtgtg agcactgctg cgcagaactg    6172
atgagcgatc cgaatagctc gatgcacgag gaagaagatg atggctaaac cagcgcgaag    6232
```

```
acgatgtaaa aacgatgaat gccgggaatg gtttcaccct gcattcgcta atcagtggtg    6292
gtgctctcca gagtgtggaa ccaagatagc actcgaacga cgaagtaaag aacgcgaaaa    6352
agcggaaaaa gcagcagaga agaaacgacg acgagaggag cagaaacaga aagataaact    6412
taagattcga aaactcgcct taaagccccg cagttactgg attaaacaag cccaacaagc    6472
cgtaaacgcc ttcatcagag aaagagaccg cgacttacca tgtatctcgt gcggaacgct    6532
cacgtctgct cagtgggatg ccggacatta ccggacaact gctgcggcac ctcaactccg    6592
atttaatgaa cgcaatattc acaagcaatg cgtggtgtgc aaccagcaca aaagcggaaa    6652
tctcgttccg tatcgcgtcg aactgattag ccgcatcggg caggaagcag tagacgaaat    6712
cgaatcaaac cataaccgcc atcgctggac tatcgaagag tgcaaggcga tcaaggcaga    6772
gtaccaacag aaactcaaag acctgcgaaa tagcagaagt gaggccgcat gacgttctca    6832
gtaaaaacca ttccagacat gctcgttgaa gcatacgaaa atcagacaga agtagcacgc    6892
agactgaaat gtagtcgcgg tacggtcaga aaatacgttg atgataaaga cgggaaaatg    6952
cacgccatcg tcaacgacgt tctcatggtt catcgcggat ggagtgaaag agatgcgcta    7012
ttacgaaaaa attgatggca gcaaataccg aaatatttgg gtagttggcg atctgcacgg    7072
atgctacacg aacctgatga acaaactgga tacgattgga ttcgacaaca aaaaagacct    7132
gcttatctcg gtgggcgatt tggttgatcg tggtgcagag aacgttgaat gcctggaatt    7192
aatcacattc ccctggttca gagctgtacg tggaaaccat gagcaaatga tgattgatgg    7252
cttatcagag cgtggaaacg ttaatcactg gctgcttaat ggcggtggct ggttctttaa    7312
tctcgattac gacaaagaaa ttctggctaa agctcttgcc cataaagcag atgaacttcc    7372
gttaatcatc gaactggtga gcaaagataa aaaatatgtt atctgccacg ccgattatcc    7432
ctttgacgaa tacgagtttg gaaagccagt tgatcatcag caggtaatct ggaaccgcga    7492
acgaatcagc aactcacaaa acgggatcgt gaaagaaatc aaaggcgcgg acacgttcat    7552
ctttggtcat acgccagcag tgaaaccact caagtttgcc aaccaaatgt atatcgatac    7612
cggcgcagtg ttctgcggaa acctaacatt gattcaggta cagggagaag gcgcatgaga    7672
ctcgaaagcg tagctaaatt tcattcgcca aaaagcccga tgatgagcga ctcaccacgg    7732
gccacggctt ctgactctct ttccggtact gatgtgatgg ctgctatggg gatggcgcaa    7792
tcacaagccg gattcggtat ggctgcattc tgcggtaagc acgaactcag ccagaacgac    7852
aaacaaaagg ctatcaacta tctgatgcaa tttgcacaca aggtatcggg gaaataccgt    7912
ggtgtggcaa agcttgaagg aaatactaag gcaaaggtac tgcaagtgct cgcaacattc    7972
gcttatgcgg attattgccg tagtgccgcg acgccggggg caagatgcag agattgccat    8032
ggtacaggcc gtgcggttga tattgccaaa acagagctgt gggggagagt tgtcgagaaa    8092
gagtgcggaa gatgcaaagg cgtcggctat tcaaggatgc cagcaagcgc agcatatcgc    8152
gctgtgacga tgctaatccc aaaccttacc caacccacct ggtcacgcac tgttaagccg    8212
ctgtatgacg ctctggtggt gcaatgccac aaagaagagt caatcgcaga caacattttg    8272
aatgcggtca cacgttagca gcatgattgc cacggatggc aacatattaa cggcatgata    8332
ttgacttatt gaataaaatt gggtaaattt gactcaacga tgggttaatt cgctcgttgt    8392
ggtagtgaga tgaaaagagg cggcgcttac taccgattcc gcctagttgg tcacttcgac    8452
gtatcgtctg gaactccaac catcgcaggc agagaggtct gcaaaatgca atcccgaaac    8512
agttcgcagg taatagttag agcctgcata acggtttcgg gatttttttat atctgcacaa    8572
```

| | |
|---|---|
| caggtaagag cattgagtcg ataatcgtga agagtcggcg agcctggtta gccagtgctc | 8632 |
| tttccgttgt gctgaattaa gcgaataccg aagcagaaac cggatcacca aatgcgtaca | 8692 |
| ggcgtcatcg ccgcccagca acagcacaac ccaaactgag ccgtagccac tgtctgtcct | 8752 |
| gaattcatta gtaatagtta cgctgcggcc ttttacacat gaccttcgtg aaagcgggtg | 8812 |
| gcaggaggtc gcgctaacaa cctcctgccg ttttgcccgt gcatatcggt cacgaacaaa | 8872 |
| tctgattact aaacacagta gcctggattt gttctatcag taatcgacct tattcctaat | 8932 |
| taaatagagc aaatccccTT attggggTA agacATGAAG ATGCCAGAAA ACATGACCT | 8992 |
| gttggccgcc attctcgcgg caaaggaaca aggcatcggg gcaatccttg cgtttgcaat | 9052 |
| ggcgtacctt cgcggcagat ataatggcgg tgcgtttaca aaaacagtaa tcgacgcaac | 9112 |
| gatgtgcgcc attatcgcct ggttcattcg tgaccttctc gacttcgccg gactaagtag | 9172 |
| caatctcgct tatataacga gcgtgtttat cggctacatc ggtactgact cgattggttc | 9232 |
| gcttatcaaa cgcttcgctg ctaaaaaagc cggagtagaa gatggtagaa atcaataatc | 9292 |
| aacgtaaggc gttcctcgat atgctggcgt ggtcggaggg aactgataac ggacgtcaga | 9352 |
| aaaccagaaa tcatggttat gacgtcattg taggcggaga gctatttact gattactccg | 9412 |
| atcaccctcg caaacttgtc acgctaaacc caaaactcaa atcaacaggc gcttaagact | 9472 |
| ggccgtcgtt ttacaacaca gaaagagttt gtagaaacgc aaaaaggcca tccgtcaggg | 9532 |
| gccttctgct tagtttgatg cctggcagtt ccctactctc gccttccgct tcctcgctca | 9592 |
| ctgactcgct gcgctcggtc gttcggctgc ggcgagcggt atcagctcac tcaaaggcgg | 9652 |
| taatacggtt atccacagaa tcaggggata acgcaggaaa gaacatgtga gcaaaaggcc | 9712 |
| agcaaaaggc caggaaccgt aaaaaggccg cgttgctggc gtttttccat aggctccgcc | 9772 |
| ccctgacga gcatcacaaa aatcgacgct caagtcagag gtggcgaaac ccgacaggac | 9832 |
| tataaagata ccaggcgttt ccccctggaa gctccctcgt gcgctctcct gttccgaccc | 9892 |
| tgccgcttac cggatacctg tccgcctttc tcccttcggg aagcgtggcg ctttctcata | 9952 |
| gctcacgctg taggtatctc agttcggtgt aggtcgttcg ctccaagctg ggctgtgtgc | 10012 |
| acgaaccccc cgttcagccc gaccgctgcg ccttatccgg taactatcgt cttgagtcca | 10072 |
| acccggtaag acacgactta tcgccactgg cagcagccac tggtaacagg attagcagag | 10132 |
| cgaggtatgt aggcggtgct acagagttct tgaagtggtg gcctaactac ggctacacta | 10192 |
| gaagaacagt atttggtatc tgcgctctgc tgaagccagt taccttcgga aaaagagttg | 10252 |
| gtagctcttg atccggcaaa caaaccaccg ctggtagcgg tggttttttt gtttgcaagc | 10312 |
| agcagattac gcgcagaaaa aaaggatctc aagaagatcc tttgatcttt tctacggggt | 10372 |
| ctgacgctca gtggaacgac gcgcgcgtaa ctcacgttaa gggattttgg tcatgagctt | 10432 |
| gcgccgtccc gtcaagtcag cgtaatgctc tgcttt | 10468 |

<210> SEQ ID NO 4
<211> LENGTH: 479
<212> TYPE: PRT
<213> ORGANISM: Artificial Sequence
<220> FEATURE:
<223> OTHER INFORMATION: Synthetic Construct

<400> SEQUENCE: 4

Met Ser Asp Val Thr Ile Val Lys Glu Gly Trp Val Gln Lys Arg Gly
1               5                   10                  15

Glu Tyr Ile Lys Asn Trp Arg Pro Arg Tyr Phe Leu Leu Lys Thr Asp
            20                  25                  30

```
Gly Ser Phe Ile Gly Tyr Lys Glu Lys Pro Gln Asp Val Asp Leu Pro
         35                  40                  45

Tyr Pro Leu Asn Asn Phe Ser Val Ala Lys Cys Gln Leu Met Lys Thr
 50                  55                  60

Glu Arg Pro Lys Pro Asn Thr Phe Ile Ile Arg Cys Leu Gln Trp Thr
 65                  70                  75                  80

Thr Val Ile Glu Arg Thr Phe His Val Asp Thr Pro Glu Glu Arg Glu
                 85                  90                  95

Glu Trp Thr Glu Ala Ile Gln Ala Val Ala Asp Arg Leu Gln Arg Gln
                100                 105                 110

Glu Glu Glu Arg Met Asn Cys Ser Pro Thr Ser Gln Ile Asp Asn Ile
            115                 120                 125

Gly Glu Glu Glu Met Asp Ala Ser Thr Thr His His Lys Arg Lys Thr
            130                 135                 140

Met Asn Asp Phe Asp Tyr Leu Lys Leu Leu Gly Lys Gly Thr Phe Gly
145                 150                 155                 160

Lys Val Ile Leu Val Arg Glu Lys Ala Ser Gly Lys Tyr Tyr Ala Met
                165                 170                 175

Lys Ile Leu Lys Lys Glu Val Ile Ile Ala Lys Asp Glu Val Ala His
                180                 185                 190

Thr Leu Thr Glu Ser Arg Val Leu Lys Asn Thr Arg His Pro Phe Leu
                195                 200                 205

Thr Ser Leu Lys Tyr Ser Phe Gln Thr Lys Asp Arg Leu Cys Phe Val
210                 215                 220

Met Glu Tyr Val Asn Gly Gly Glu Leu Phe Phe His Leu Ser Arg Glu
225                 230                 235                 240

Arg Val Phe Ser Glu Asp Arg Thr Arg Phe Tyr Gly Ala Glu Ile Val
                245                 250                 255

Ser Ala Leu Asp Tyr Leu His Ser Gly Lys Ile Val Tyr Arg Asp Leu
                260                 265                 270

Lys Leu Glu Asn Leu Met Leu Asp Lys Asp Gly His Ile Lys Ile Thr
            275                 280                 285

Asp Phe Gly Leu Cys Lys Glu Gly Ile Thr Asp Ala Ala Thr Met Lys
290                 295                 300

Thr Phe Cys Gly Thr Pro Glu Tyr Leu Ala Pro Glu Val Leu Glu Asp
305                 310                 315                 320

Asn Asp Tyr Gly Arg Ala Val Asp Trp Trp Gly Leu Gly Val Val Met
                325                 330                 335

Tyr Glu Met Met Cys Gly Arg Leu Pro Phe Tyr Asn Gln Asp His Glu
                340                 345                 350

Lys Leu Phe Glu Leu Ile Leu Met Glu Asp Ile Lys Phe Pro Arg Thr
                355                 360                 365

Leu Ser Ser Asp Ala Lys Ser Leu Leu Ser Gly Leu Leu Ile Lys Asp
370                 375                 380

Pro Asn Lys Arg Leu Gly Gly Pro Asp Asp Ala Lys Glu Ile Met
385                 390                 395                 400

Arg His Ser Phe Phe Ser Gly Val Asn Trp Gln Asp Val Tyr Asp Lys
                405                 410                 415

Lys Leu Val Pro Pro Phe Lys Pro Gln Val Thr Ser Glu Thr Asp Thr
                420                 425                 430

Arg Tyr Phe Asp Glu Glu Phe Thr Ala Gln Thr Ile Thr Ile Thr Pro
                435                 440                 445
```

```
Pro Glu Lys Tyr Asp Glu Asp Gly Met Asp Cys Met Asp Asn Glu Arg
    450                 455                 460

Arg Pro His Phe Pro Gln Phe Ser Tyr Ser Ala Ser Gly Arg Glu
465                 470                 475

<210> SEQ ID NO 5
<211> LENGTH: 11556
<212> TYPE: DNA
<213> ORGANISM: Artificial Sequence
<220> FEATURE:
<223> OTHER INFORMATION: synthetic construct
<220> FEATURE:
<221> NAME/KEY: misc_feature
<222> LOCATION: (1493)..(1796)
<223> OTHER INFORMATION: CMV enhancer
<220> FEATURE:
<221> NAME/KEY: misc_feature
<222> LOCATION: (1798)..(2075)
<223> OTHER INFORMATION: chicken beta-actin promoter
<220> FEATURE:
<221> NAME/KEY: misc_feature
<222> LOCATION: (3111)..(3116)
<223> OTHER INFORMATION: Kozak
<220> FEATURE:
<221> NAME/KEY: CDS
<222> LOCATION: (3117)..(4556)
<223> OTHER INFORMATION: AKT3 OPT
<220> FEATURE:
<221> NAME/KEY: misc_feature
<222> LOCATION: (4570)..(4777)
<223> OTHER INFORMATION: bGH poly(A) signal

<400> SEQUENCE: 5
tagaaaaact catcgagcat caaatgaaac tgcaatttat tcatatcagg attatcaata      60
ccatattttt gaaaaagccg tttctgtaat gaaggagaaa actcaccgag gcagttccat     120
aggatggcaa gatcctggta tcggtctgcg attccgactc gtccaacatc aatacaacct     180
attaatttcc cctcgtcaaa ataaggttat caagtgagaa atcaccatg agtgacgact      240 gaatccggtg agaatggcaa aagtttatgc atttcttttcc agacttgttc aacaggccag     300
ccattacgct cgtcatcaaa atcactcgca tcaaccaaac cgttattcat cgtgattgc       360 gcctgagcga ggcgaaatac gcgatcgctg ttaaaaggac aattacaaac aggaatcgag     420
tgcaaccggc gcaggaacac tgccagcgca tcaacaatat tttcacctga atcaggatat     480
tcttctaata cctggaacgc tgttttttcg gggatcgcag tggtgagtaa ccatgcatca     540
tcaggagtac ggataaaatg cttgatggtc ggaagtggca taaattccgt cagccagttt     600
agtctgacca tctcatctgt aacatcattg gcaacgctac ctttgccatg tttcagaaac     660
aactctggcg catcgggctt cccatacaag cgatagattg tcgcacctga ttgcccgaca     720
ttatcgcgag cccatttata cccatataaa tcagcatcca tgttggaatt taatcgcggc     780
ctcgacgttt cccgttgaat atggctcata ttcttccttt tcaatatta ttgaagcatt      840 tatcagggtt attgtctcat gagcggatac atatttgaat gtatttagaa aaataaacaa     900
ataggggtca gtgttacaac caattaacca attctgaaca ttatcgcgag cccatttata     960
cctgaatatg gctcataaca ccccttgttt gcctggcggc agtagcgcgg tggtcccacc    1020
tgaccccatg ccgaactcag aagtgaaacg ccgtagcgcc gatggtagtg tggggactcc    1080
ccatgcgaga gtagggaact gccaggcatc aaataaaacg aaaggctcag tcgaaagact    1140
gggcctttcg cccgggctaa ttaggggggtg tcgcccttat tcgactctat agtgaagttc    1200
ctattctcta gaaagtatag gaacttctga agtggggtcg acttaattaa ggctgcgcgc    1260
tcgctcgctc actgaggccg cccgggcaaa gcccgggcgt cgggcgacct ttggtcgccc    1320
```

```
ggcctcagtg agcgagcgag cgcgcagaga gggagtggcc aactccatca ctaggggttc    1380
cttgtagtta atgattaacc cgccatgcta cttatctacg tagcaagcta gctagttatt    1440
aatagtaatc aattacgggg tcattagttc atagcccata tatggagttc cgcgttacat    1500
aacttacggt aaatggcccg cctggctgac cgcccaacga cccccgccca ttgacgtcaa    1560
taatgacgta tgttcccata gtaacgccaa tagggacttt ccattgacgt caatgggtgg    1620
agtatttacg gtaaactgcc cacttggcag tacatcaagt gtatcatatg ccaagtacgc    1680
cccctattga cgtcaatgac ggtaaatggc ccgcctggca ttatgcccag tacatgacct    1740
tatgggactt tcctacttgg cagtacatct acgtattagt catcgctatt aacatggtcg    1800
aggtgagccc cacgttctgc ttcactctcc ccatctcccc cccctcccca ccccaatttt    1860
tgtatttatt tattttttaa ttattttgtg cagcgatggg ggcggggggg ggggggggc    1920
gcgcgccagg cggggcgggg cggggcgagg ggcggggcgg ggcgaggcgg agaggtgcgg    1980
cggcagccaa tcagagcggc gcgctccgaa agtttccttt tatggcgagg cggcggcggc    2040
ggcggcccta taaaaagcga agcgcgcggc gggcggggag tcgctgcgac gctgccttcg    2100
ccccgtgccc cgctccgccg ccgcctcgcg ccgcccgccc cggctctgac tgaccgcgtt    2160
actcccacag gtgagcgggc gggacggccc ttctcctccg gctgtaatt agcgcttggt    2220
ttaatgacgg cttgtttctt ttctgtggct gcgtgaaagc cttgaggggc tccgggaggg    2280
ccctttgtgc ggggggagcg gctcgggggg tgcgtgcgtg tgtgtgtgcg tggggagcgc    2340
cgcgtgcggc tccgcgctgc ccggcggctg tgagcgctgc gggcgcggcg cggggcttg    2400
tgcgctccgc agtgtgcgcg aggggagcgc ggccgggggc ggtgccccgc ggtgcggggg    2460
gggctgcgag gggaacaaag gctgcgtgcg gggtgtgtgc gtgggggggt gagcagggg   2520
tgtgggcgcg tcggtcgggc tgcaaccccc cctgcacccc cctccccgag ttgctgagca    2580
cggcccggct tcgggtgcgg ggctccgtac ggggcgtggc gcggggctcg ccgtgccggg    2640
cggggggtgg cggcaggtgg gggtgccggg cggggcgggg ccgcctcggg ccggggaggg    2700
ctcgggggag gggcgcggcg gccccggag cgccggcggc tgtcgaggcg cggcgagccg    2760
cagccattgc ctttatggt aatcgtgcga gagggcgcag ggacttcctt tgtcccaaat    2820
ctgtgcggag ccgaaatctg ggaggcgccg ccgcacccc tctagcgggc gcggggcgaa    2880
gcggtgcggc gccggcagga aggaaatggg cggggaggc cttcgtgcgt cgccgcgccg    2940
ccgtcccctt ctccctctcc agcctcgggg ctgtccgcgg ggggacggct gccttcgggg    3000
gggacggggc agggcggggt tcggcttctg gcgtgtgacc ggcggctcta gacaattgta    3060
ctaaccttct tctctttcct ctcctgacag gttggtgtac actagcggcc gccacc atg    3119
                                                              Met
                                                               1 agc gac gtg acc att gtg aag gaa ggc tgg gtg cag aag cgg gga gag         3167
Ser Asp Val Thr Ile Val Lys Glu Gly Trp Val Gln Lys Arg Gly Glu
         5                  10                  15 tac atc aag aac tgg agg cct cgg tac ttt ctg ctt aag acc gat ggc         3215
Tyr Ile Lys Asn Trp Arg Pro Arg Tyr Phe Leu Leu Lys Thr Asp Gly
         20                 25                  30 tcc ttt atc ggt tac aag gaa aag ccg cag gac gtg gac ctt ccg tac         3263
Ser Phe Ile Gly Tyr Lys Glu Lys Pro Gln Asp Val Asp Leu Pro Tyr
         35                 40                  45 cct ctg aac aac ttc tcc gtg gca aag tgt cag ctt atg aaa acc gaa         3311
Pro Leu Asn Asn Phe Ser Val Ala Lys Cys Gln Leu Met Lys Thr Glu
 50                  55                 60                  65
```

-continued

| | | |
|---|---|---|
| cgc ccc aag ccg aac acg ttt atc att cga tgc ctg cag tgg acc acc<br>Arg Pro Lys Pro Asn Thr Phe Ile Ile Arg Cys Leu Gln Trp Thr Thr<br>                       70                       75                       80 | 3359 |
| gtg att gaa cgg acc ttc cat gtg gat acc cca gag gag aga gaa gag<br>Val Ile Glu Arg Thr Phe His Val Asp Thr Pro Glu Glu Arg Glu Glu<br>              85                       90                       95 | 3407 |
| tgg aca gaa gcc atc cag gca gtg gct gat cgg ctg cag aga cag gaa<br>Trp Thr Glu Ala Ile Gln Ala Val Ala Asp Arg Leu Gln Arg Gln Glu<br>        100                      105                      110 | 3455 |
| gag gaa cgg atg aac tgc tca ccc act tca caa atc gac aat atc gga<br>Glu Glu Arg Met Asn Cys Ser Pro Thr Ser Gln Ile Asp Asn Ile Gly<br>115                      120                      125 | 3503 |
| gag gag gag atg gac gcc agc acc acc cac cac aag aga aag acc atg<br>Glu Glu Glu Met Asp Ala Ser Thr Thr His His Lys Arg Lys Thr Met<br>130                      135                      140                      145 | 3551 |
| aac gac ttc gac tac ctg aag ctc ctg ggc aaa ggg acc ttc gga aag<br>Asn Asp Phe Asp Tyr Leu Lys Leu Leu Gly Lys Gly Thr Phe Gly Lys<br>                    150                      155                      160 | 3599 |
| gtc atc ctg gtc cgg gaa aag gcc tcc gga aag tac tac gcc atg aag<br>Val Ile Leu Val Arg Glu Lys Ala Ser Gly Lys Tyr Tyr Ala Met Lys<br>              165                      170                      175 | 3647 |
| atc ctg aag aag gag gtc atc att gcc aag gac gaa gtg gcc cac act<br>Ile Leu Lys Lys Glu Val Ile Ile Ala Lys Asp Glu Val Ala His Thr<br>180                      185                      190 | 3695 |
| ctg act gag tcc agg gtc ctc aag aac act cgg cac ccc ttc ctc acc<br>Leu Thr Glu Ser Arg Val Leu Lys Asn Thr Arg His Pro Phe Leu Thr<br>        195                      200                      205 | 3743 |
| tcg ctg aag tac agc ttc caa acc aag gat aga ctg tgc ttc gtg atg<br>Ser Leu Lys Tyr Ser Phe Gln Thr Lys Asp Arg Leu Cys Phe Val Met<br>210                      215                      220                      225 | 3791 |
| gaa tac gtc aac gga ggg gag ctg ttc ttc cac ctt tcc cgc gaa cgg<br>Glu Tyr Val Asn Gly Gly Glu Leu Phe Phe His Leu Ser Arg Glu Arg<br>                    230                      235                      240 | 3839 |
| gtg ttc tca gaa gat cgc acc cgg ttc tac ggt gcc gag att gtt tcc<br>Val Phe Ser Glu Asp Arg Thr Arg Phe Tyr Gly Ala Glu Ile Val Ser<br>              245                      250                      255 | 3887 |
| gcg ttg gac tac ctc cac tcg gga aag atc gtg tac cgg gac ctg aag<br>Ala Leu Asp Tyr Leu His Ser Gly Lys Ile Val Tyr Arg Asp Leu Lys<br>260                      265                      270 | 3935 |
| ctg gaa aac ctc atg ctc gac aag gat ggc cac atc aag atc acc gac<br>Leu Glu Asn Leu Met Leu Asp Lys Asp Gly His Ile Lys Ile Thr Asp<br>        275                      280                      285 | 3983 |
| ttc ggc ctg tgc aag gaa ggg atc act gac gcg gca act atg aaa acc<br>Phe Gly Leu Cys Lys Glu Gly Ile Thr Asp Ala Ala Thr Met Lys Thr<br>290                      295                      300                      305 | 4031 |
| ttc tgt ggc acc cct gaa tac ctc gcg ccg gaa gtg ctg gag gat aac<br>Phe Cys Gly Thr Pro Glu Tyr Leu Ala Pro Glu Val Leu Glu Asp Asn<br>                    310                      315                      320 | 4079 |
| gac tat gga cgc gct gtg gat tgg tgg ggc ctg gga gtc gtg atg tac<br>Asp Tyr Gly Arg Ala Val Asp Trp Trp Gly Leu Gly Val Val Met Tyr<br>              325                      330                      335 | 4127 |
| gag atg atg tgc gga cgc ttg ccc ttc tac aac cag gac cac gag aag<br>Glu Met Met Cys Gly Arg Leu Pro Phe Tyr Asn Gln Asp His Glu Lys<br>340                      345                      350 | 4175 |
| ctg ttc gaa ttg atc ctg atg gag gat atc aag ttc ccg cgc act ctg<br>Leu Phe Glu Leu Ile Leu Met Glu Asp Ile Lys Phe Pro Arg Thr Leu<br>        355                      360                      365 | 4223 |
| tcg tcc gac gct aaa agc ctg ctg agc gga ctg ctg atc aag gac cct<br>Ser Ser Asp Ala Lys Ser Leu Leu Ser Gly Leu Leu Ile Lys Asp Pro<br>370                      375                      380                      385 | 4271 |

```
aac aag cgc ctc gga ggt ggt cct gac gat gcc aag gag att atg cgg      4319
Asn Lys Arg Leu Gly Gly Gly Pro Asp Asp Ala Lys Glu Ile Met Arg
            390                 395                 400 cac tcc ttc ttc tcg ggc gtg aat tgg cag gat gtg tac gac aag aag      4367
His Ser Phe Phe Ser Gly Val Asn Trp Gln Asp Val Tyr Asp Lys Lys
        405                 410                 415 ctc gtg ccg cca ttc aag ccc caa gtc act tcc gaa acg gac act cgg      4415
Leu Val Pro Pro Phe Lys Pro Gln Val Thr Ser Glu Thr Asp Thr Arg
        420                 425                 430 tac ttc gac gag gag ttc acc gcc caa acc atc act att acc ccc ccc      4463
Tyr Phe Asp Glu Glu Phe Thr Ala Gln Thr Ile Thr Ile Thr Pro Pro
        435                 440                 445 gag aaa tac gac gag gat ggg atg gac tgc atg gac aac gaa cgc cgg      4511
Glu Lys Tyr Asp Glu Asp Gly Met Asp Cys Met Asp Asn Glu Arg Arg
450                 455                 460                 465 cca cat ttt ccg caa ttc tcc tat tct gcc tcc gga agg gag tga          4556
Pro His Phe Pro Gln Phe Ser Tyr Ser Ala Ser Gly Arg Glu
                470                 475 agatctgcct cgactgtgcc ttctagttgc cagccatctg ttgtttgccc ctccccgtg     4616 ccttccttga ccctggaagg tgccactccc actgtccttt cctaataaaa tgaggaaatt    4676
gcatcgcatt gtctgagtag gtgtcattct attctggggg gtggggtggg gcaggacagc    4736 aaggggagg attgggaaga caatagcagg catgctgggg actcgagttc tacgtagata     4796
agtagcatgg cgggttaatc attaactaca aggaaccct agtgatggag ttggccactc     4856
cctctctgcg cgctcgctcg ctcactgagg ccgggcgacc aaaggtcgcc cgacgcccgg    4916
gctttgcccg ggcggcctca gtgagcgagc gagcgcgcag ccttaattaa cctaaggaaa    4976
atgaagtgaa gttcctatac tttctagaga ataggaactt ctatagtgag tcgaataagg    5036
gcgacacaaa atttattcta aatgcataat aaatactgat aacatcttat agtttgtatt    5096
atattttgta ttatcgttga catgtataat tttgatatca aaaactgatt ttcccttat     5156 tattttcgag atttatttc ttaattctct ttaacaaact agaaatattg tatatacaaa    5216
aaatcataaa taatagatga atagtttaat tataggtgtt catcaatcga aaaagcaacg    5276
tatcttattt aaagtgcgtt gctttttct catttataag gttaaataat tctcatatat    5336
caagcaaagt gacaggcgcc cttaaatatt ctgacaaatg ctctttccct aaactccccc    5396 cataaaaaa cccgccgaag cgggttttta cgttatttgc ggattaacga ttactcgtta     5456
tcagaaccgc ccaggggggcc cgagcttaac ctttttattt ggggagagg gaagtcatga    5516 aaaaactaac ctttgaaatt cgatctccag cacatcagca aaacgctatt cacgcagtac    5576
agcaaatcct tccagaccca accaaaccaa tcgtagtaac cattcaggaa cgcaaccgca    5636
gcttagacca aaacaggaag ctatgggcct gcttaggtga cgtctctcgt caggttgaat    5696
ggcatggtcg ctggctggat gcagaaagct ggaagtgtgt gtttaccgca gcattaaagc    5756
agcaggatgt tgttcctaac cttgccggga atggctttgt ggtaataggc cagtcaacca    5816
gcaggatgcg tgtaggcgaa tttgcggagc tattagagct tatacaggca ttcggtacag    5876
agcgtggcgt taagtggtca gacgaagcga gactggctct ggagtggaaa gcgagatggg    5936
gagacagggc tgcatgataa atgtcgttag ttttctccggt ggcaggacgt cagcatattt    5996
gctctggcta atggagcaaa agcgacgggc aggtaaagac gtgcattacg ttttcatgga    6056
tacaggttgt gaacatccaa tgacatatcg gtttgtcagg gaagttgtga agttctggga    6116
tataccgctc accgtattgc aggttgatat caacccggag cttggacagc caaatggtta    6176
```

```
tacggtatgg gaaccaaagg atattcagac gcgaatgcct gttctgaagc catttatcga    6236
tatggtaaag aaatatggca ctccatacgt cggcggcgcg ttctgcactg acagattaaa    6296
actcgttccc ttcaccaaat actgtgatga ccatttcggg cgagggaatt acaccacgtg    6356
gattggcatc agagctgatg aaccgaagcg gctaaagcca aagcctggaa tcagatatct    6416
tgctgaactg tcagactttg agaaggaaga tatcctcgca tggtggaagc aacaaccatt    6476
cgatttgcaa ataccggaac atctcggtaa ctgcatattc tgcattaaaa atcaacgca     6536 aaaaatcgga cttgcctgca agatgagga gggattgcag cgtgttttta atgaggtcat     6596
cacgggatcc catgtgcgtg acggacatcg ggaaacgcca aaggagatta tgtaccgagg    6656
aagaatgtcg ctggacggta tcgcgaaaat gtattcagaa aatgattatc aagccctgta    6716
tcaggacatg gtacgagcta aaagattcga taccggctct tgttctgagt catgcgaaat    6776
atttggaggg cagcttgatt tcgacttcgg gagggaagct gcatgatgcg atgttatcgg    6836
tgcggtgaat gcaaagaaga taaccgcttc cgaccaaatc aaccttactg gaatcgatgg    6896
tgtctccggt gtgaaagaac accaacaggg gtgttaccac taccgcagga aaaggaggac    6956
gtgtggcgag acagcgacga agtatcaccg acataatctg cgaaaactgc aaataccttc    7016
caacgaaacg caccagaaat aaacccaagc caatcccaaa agaatctgac gtaaaaacct    7076
tcaactacac ggctcacctg tgggatatcc ggtggctaag acgtcgtgcg aggaaaacaa    7136
ggtgattgac caaaatcgaa gttacgaaca agaaagcgtc gagcgagctt taacgtgcgc    7196
taactgcggt cagaagctgc atgtgctgga agttcacgtg tgtgagcact gctgcgcaga    7256
actgatgagc gatccgaata gctcgatgca cgaggaagaa gatgatggct aaaccagcgc    7316
gaagacgatg taaaaacgat gaatgccggg aatggtttca ccctgcattc gctaatcagt    7376
ggtggtgctc tccagagtgt ggaaccaaga tagcactcga acgacgaagt aaagaacgcg    7436
aaaaagcgga aaaagcagca gagaagaaac gacgacgaga ggagcagaaa cagaaagata    7496
aacttaagat tcgaaaactc gccttaaagc cccgcagtta ctggattaaa caagcccaac    7556
aagccgtaaa cgccttcatc agagaaagag accgcgactt accatgtatc tcgtgcggaa    7616
cgctcacgtc tgctcagtgg gatgccggac attaccggac aactgctgcg gcacctcaac    7676
tccgatttaa tgaacgcaat attcacaagc aatgcgtggt gtgcaaccag cacaaaagcg    7736
gaaatctcgt tccgtatcgc gtcgaactga ttagccgcat cgggcaggaa gcagtagacg    7796
aaatcgaatc aaaccataac cgccatcgct ggactatcga agagtgcaag gcgatcaagg    7856
cagagtacca acagaaactc aaagacctgc gaaatagcag aagtgaggcc gcatgacgtt    7916
ctcagtaaaa accattccag acatgctcgt tgaagcatac ggaaatcaga cagaagtagc    7976
acgcagactg aaatgtagtc gcggtacggt cagaaaatac gttgatgata agacgggaa    8036 aatgcacgcc atcgtcaacg acgttctcat ggttcatcgc ggatggagtg aaagagatgc    8096
gctattacga aaaaattgat ggcagcaaat accgaaatat ttgggtagtt ggcgatctgc    8156
acggatgcta cacgaacctg atgaacaaac tggatacgat tggattcgac aacaaaaaag    8216
acctgcttat ctcggtgggc gatttggttg atcgtggtgc agagaacgtt gaatgcctgg    8276
aattaatcac attccctgg ttcagagctg tacgtgaaaa ccatgagcaa atgatgattg    8336
atggcttatc agagcgtgga aacgttaatc actggctgct taatggcggt ggctggttct    8396
ttaatctcga ttcgacaaa gaaattctgg ctaaagctct tgcccataaa gcagatgaac    8456
ttccgttaat catcgaactg gtgagcaaag ataaaaaata tgttatctgc cacgccgatt    8516
atccctttga cgaatacgag tttggaaagc cagttgatca tcagcaggta atctggaacc    8576
```

```
gcgaacgaat cagcaactca caaaacggga tcgtgaaaga aatcaaaggc gcggacacgt   8636
tcatctttgg tcatacgcca gcagtgaaac cactcaagtt tgccaaccaa atgtatatcg   8696
ataccggcgc agtgttctgc ggaaacctaa cattgattca ggtacaggga gaaggcgcat   8756
gagactcgaa agcgtagcta aatttcattc gccaaaaagc ccgatgatga gcgactcacc   8816
acgggccacg gcttctgact ctctttccgg tactgatgtg atggctgcta tggggatggc   8876
gcaatcacaa gccggattcg gtatggctgc attctgcggt aagcacgaac tcagccagaa   8936
cgacaaacaa aaggctatca actatctgat gcaatttgca cacaaggtat cggggaaata   8996
ccgtggtgtg gcaaagcttg aaggaaatac taaggcaaag gtactgcaag tgctcgcaac   9056
attcgcttat gcggattatt gccgtagtgc cgcgacgccg ggggcaagat gcagagattg   9116
ccatggtaca ggccgtgcgg ttgatattgc caaaacagag ctgtggggga gagttgtcga   9176
gaaagagtgc ggaagatgca aaggcgtcgg ctattcaagg atgccagcaa gcgcagcata   9236
tcgcgctgtg acgatgctaa tcccaaacct tacccaaccc acctggtcac gcactgttaa   9296
gccgctgtat gacgctctgg tggtgcaatg ccacaaagaa gagtcaatcg cagacaacat   9356
tttgaatgcg gtcacacgtt agcagcatga ttgccacgga tggcaacata ttaacggcat   9416
gatattgact tattgaataa aattgggtaa atttgactca acgatgggtt aattcgctcg   9476
ttgtggtagt gagatgaaaa gaggcggcgc ttactaccga ttccgcctag ttggtcactt   9536
cgacgtatcg tctggaactc caaccatcgc aggcagagag gtctgcaaaa tgcaatcccg   9596
aaacagttcg caggtaatag ttagagcctg cataacggtt tcgggatttt ttatatctgc   9656
acaacaggta agagcattga gtcgataatc gtgaagagtc ggcgagcctg gttagccagt   9716
gctctttccg ttgtgctgaa ttaagcgaat accggaagca gaaccggatc accaaatgcg   9776
tacaggcgtc atcgccgccc agcaacagca caacccaaac tgagccgtag ccactgtctg   9836
tcctgaattc attagtaata gttacgctgc ggccttttac acatgacctt cgtgaaagcg   9896
ggtggcagga ggtcgcgcta acaacctcct gccgttttgc ccgtgcatat cggtcacgaa   9956
caaatctgat tactaaacac agtagcctgg atttgttcta tcagtaatcg accttattcc   10016
taattaaata gagcaaatcc ccttattggg ggtaagacat gaagatgcca gaaaaacatg   10076
acctgttggc cgccattctc gcggcaaagg aacaaggcat cggggcaatc cttgcgtttg   10136
caatggcgta ccttcgcggc agatataatg gcggtgcgtt tacaaaaaca gtaatcgacg   10196
caacgatgtg cgccattatc gcctggttca ttcgtgacct tctcgacttc gccggactaa   10256
gtagcaatct cgcttatata acgagcgtgt ttatcggcta catcggtact gactcgattg   10316
gttcgcttat caaacgcttc gctgctaaaa aagccggagt agaagatggt agaaatcaat   10376
aatcaacgta aggcgttcct cgatatgctg gcgtggtcgg agggaactga taacggacgt   10436
cagaaaacca gaaatcatgg ttatgacgtc attgtaggcg gagagctatt tactgattac   10496
tccgatcacc ctcgcaaact tgtcacgcta aacccaaaac tcaaatcaac aggcgcttaa   10556
gactggccgt cgttttacaa cacagaaaga gtttgtagaa acgcaaaaag gccatccgtc   10616
aggggccttc tgcttagttt gatgcctggc agttccctac tctcgccttc gcttcctcg    10676 ctcactgact cgctgcgctc ggtcgttcgg ctgcggcgag cggtatcagc tcactcaaag   10736
gcggtaatac ggttatccac agaatcaggg gataacgcag gaaagaacat gtgagcaaaa   10796
ggccagcaaa aggccaggaa ccgtaaaaag gccgcgttgc tggcgttttt ccataggctc   10856
cgcccccctg acgagcatca caaaaatcga cgctcaagtc agaggtggcg aaacccgaca   10916
```

```
ggactataaa gataccaggc gtttcccct ggaagctccc tcgtgcgctc tcctgttccg    10976
accctgccgc ttaccggata cctgtccgcc tttctcccct cgggaagcgt ggcgcttcct    11036
catagctcac gctgtaggta tctcagttcg gtgtaggtcg ttcgctccaa gctgggctgt    11096
gtgcacgaac ccccgttca gcccgaccgc tgcgccttat ccggtaacta tcgtcttgag    11156
tccaacccgg taagacacga cttatcgcca ctggcagcag ccactggtaa caggattagc    11216
agagcgaggt atgtaggcgg tgctacagag ttcttgaagt ggtgggctaa ctacggctac    11276
actagaagaa cagtatttgg tatctgcgct ctgctgaagc cagttacctt cggaaaaaga    11336
gttggtagct cttgatccgg caaacaaacc accgctggta gcggtggttt ttttgtttgc    11396
aagcagcaga ttacgcgcag aaaaaaagga tctcaagaag atcctttgat cttttctacg    11456
gggtctgacg ctcagtggaa cgacgcgcgc gtaactcacg ttaagggatt ttggtcatga    11516
gcttgcgccg tcccgtcaag tcagcgtaat gctctgcttt                         11556
```

<210> SEQ ID NO 6
<211> LENGTH: 479
<212> TYPE: PRT
<213> ORGANISM: Artificial Sequence
<220> FEATURE:
<223> OTHER INFORMATION: Synthetic Construct

<400> SEQUENCE: 6

```
Met Ser Asp Val Thr Ile Val Lys Glu Gly Trp Val Gln Lys Arg Gly
1               5                   10                  15

Glu Tyr Ile Lys Asn Trp Arg Pro Arg Tyr Phe Leu Leu Lys Thr Asp
            20                  25                  30

Gly Ser Phe Ile Gly Tyr Lys Glu Lys Pro Gln Asp Val Asp Leu Pro
        35                  40                  45

Tyr Pro Leu Asn Asn Phe Ser Val Ala Lys Cys Gln Leu Met Lys Thr
    50                  55                  60

Glu Arg Pro Lys Pro Asn Thr Phe Ile Ile Arg Cys Leu Gln Trp Thr
65                  70                  75                  80

Thr Val Ile Glu Arg Thr Phe His Val Asp Thr Pro Glu Glu Arg Glu
                85                  90                  95

Glu Trp Thr Glu Ala Ile Gln Ala Val Ala Asp Arg Leu Gln Arg Gln
            100                 105                 110

Glu Glu Glu Arg Met Asn Cys Ser Pro Thr Ser Gln Ile Asp Asn Ile
        115                 120                 125

Gly Glu Glu Glu Met Asp Ala Ser Thr Thr His His Lys Arg Lys Thr
    130                 135                 140

Met Asn Asp Phe Asp Tyr Leu Lys Leu Leu Gly Lys Gly Thr Phe Gly
145                 150                 155                 160

Lys Val Ile Leu Val Arg Glu Lys Ala Ser Gly Lys Tyr Tyr Ala Met
                165                 170                 175

Lys Ile Leu Lys Lys Glu Val Ile Ile Ala Lys Asp Glu Val Ala His
            180                 185                 190

Thr Leu Thr Glu Ser Arg Val Leu Lys Asn Thr Arg His Pro Phe Leu
        195                 200                 205

Thr Ser Leu Lys Tyr Ser Phe Gln Thr Lys Asp Arg Leu Cys Phe Val
    210                 215                 220

Met Glu Tyr Val Asn Gly Gly Glu Leu Phe Phe His Leu Ser Arg Glu
225                 230                 235                 240

Arg Val Phe Ser Glu Asp Arg Thr Arg Phe Tyr Gly Ala Glu Ile Val
                245                 250                 255
```

```
Ser Ala Leu Asp Tyr Leu His Ser Gly Lys Ile Val Tyr Arg Asp Leu
        260                 265                 270

Lys Leu Glu Asn Leu Met Leu Asp Lys Asp Gly His Ile Lys Ile Thr
        275                 280                 285

Asp Phe Gly Leu Cys Lys Glu Gly Ile Thr Asp Ala Ala Thr Met Lys
290                 295                 300

Thr Phe Cys Gly Thr Pro Glu Tyr Leu Ala Pro Glu Val Leu Glu Asp
305                 310                 315                 320

Asn Asp Tyr Gly Arg Ala Val Asp Trp Trp Gly Leu Gly Val Val Met
                325                 330                 335

Tyr Glu Met Met Cys Gly Arg Leu Pro Phe Tyr Asn Gln Asp His Glu
            340                 345                 350

Lys Leu Phe Glu Leu Ile Leu Met Glu Asp Ile Lys Phe Pro Arg Thr
        355                 360                 365

Leu Ser Ser Asp Ala Lys Ser Leu Leu Ser Gly Leu Leu Ile Lys Asp
    370                 375                 380

Pro Asn Lys Arg Leu Gly Gly Gly Pro Asp Asp Ala Lys Glu Ile Met
385                 390                 395                 400

Arg His Ser Phe Phe Ser Gly Val Asn Trp Gln Asp Val Tyr Asp Lys
                405                 410                 415

Lys Leu Val Pro Pro Phe Lys Pro Gln Val Thr Ser Glu Thr Asp Thr
            420                 425                 430

Arg Tyr Phe Asp Glu Glu Phe Thr Ala Gln Thr Ile Thr Ile Thr Pro
        435                 440                 445

Pro Glu Lys Tyr Asp Glu Asp Gly Met Asp Cys Met Asp Asn Glu Arg
    450                 455                 460

Arg Pro His Phe Pro Gln Phe Ser Tyr Ser Ala Ser Gly Arg Glu
465                 470                 475

<210> SEQ ID NO 7
<211> LENGTH: 1440
<212> TYPE: DNA
<213> ORGANISM: Homo sapiens
<220> FEATURE:
<221> NAME/KEY: CDS
<222> LOCATION: (1)..(1440)

<400> SEQUENCE: 7 atg agc gat gtt acc att gtg aaa gaa ggt tgg gtt cag aag agg gga      48
Met Ser Asp Val Thr Ile Val Lys Glu Gly Trp Val Gln Lys Arg Gly
1               5                   10                  15 gaa tat ata aaa aac tgg agg cca aga tac ttc ctt ttg aag aca gat      96
Glu Tyr Ile Lys Asn Trp Arg Pro Arg Tyr Phe Leu Leu Lys Thr Asp
            20                  25                  30 ggc tca ttc ata gga tat aaa gag aaa cct caa gat gtg gat tta cct     144
Gly Ser Phe Ile Gly Tyr Lys Glu Lys Pro Gln Asp Val Asp Leu Pro
        35                  40                  45 tat ccc ctc aac aac ttt tca gtg gca aaa tgc cag tta atg aaa aca     192
Tyr Pro Leu Asn Asn Phe Ser Val Ala Lys Cys Gln Leu Met Lys Thr
    50                  55                  60 gaa cga cca aag cca aac aca ttt ata atc aga tgt ctc cag tgg act     240
Glu Arg Pro Lys Pro Asn Thr Phe Ile Ile Arg Cys Leu Gln Trp Thr
65                  70                  75                  80 act gtt ata gag aga aca ttt cat gta gat act cca gag gaa agg gaa     288
Thr Val Ile Glu Arg Thr Phe His Val Asp Thr Pro Glu Glu Arg Glu
                85                  90                  95 gaa tgg aca gaa gct atc cag gct gta gca gac aga ctg cag agg caa     336
```

```
        Glu Trp Thr Glu Ala Ile Gln Ala Val Ala Asp Arg Leu Gln Arg Gln
                        100                 105                 110 gaa gag gag aga atg aat tgt agt cca act tca caa att gat aat ata        384
Glu Glu Glu Arg Met Asn Cys Ser Pro Thr Ser Gln Ile Asp Asn Ile
            115                 120                 125 gga gag gaa gag atg gat gcc tct aca acc cat cat aaa aga aag aca        432
Gly Glu Glu Glu Met Asp Ala Ser Thr Thr His His Lys Arg Lys Thr
130                 135                 140 atg aat gat ttt gac tat ttg aaa cta cta ggt aaa ggc act ttt ggg        480
Met Asn Asp Phe Asp Tyr Leu Lys Leu Leu Gly Lys Gly Thr Phe Gly
145                 150                 155                 160 aaa gtt att ttg gtt cga gag aag gca agt gga aaa tac tat gct atg        528
Lys Val Ile Leu Val Arg Glu Lys Ala Ser Gly Lys Tyr Tyr Ala Met
                165                 170                 175 aag att ctg aag aaa gaa gtc att att gca aag gat gaa gtg gca cac        576
Lys Ile Leu Lys Lys Glu Val Ile Ile Ala Lys Asp Glu Val Ala His
            180                 185                 190 act cta act gaa agc aga gta tta aag aac act aga cat ccc ttt tta       624
Thr Leu Thr Glu Ser Arg Val Leu Lys Asn Thr Arg His Pro Phe Leu
        195                 200                 205 aca tcc ttg aaa tat tcc ttc cag aca aaa gac cgt ttg tgt ttt gtg       672
Thr Ser Leu Lys Tyr Ser Phe Gln Thr Lys Asp Arg Leu Cys Phe Val
210                 215                 220 atg gaa tat gtt aat ggg ggc gag ctg ttt ttc cat ttg tcg aga gag       720
Met Glu Tyr Val Asn Gly Gly Glu Leu Phe Phe His Leu Ser Arg Glu
225                 230                 235                 240 cgg gtg ttc tct gag gac cgc aca cgt ttc tat ggt gca gaa att gtc       768
Arg Val Phe Ser Glu Asp Arg Thr Arg Phe Tyr Gly Ala Glu Ile Val
                245                 250                 255 tct gcc ttg gac tat cta cat tcc gga aag att gtg tac cgt gat ctc       816
Ser Ala Leu Asp Tyr Leu His Ser Gly Lys Ile Val Tyr Arg Asp Leu
            260                 265                 270 aag ttg gag aat cta atg ctg gac aaa gat ggc cac ata aaa att aca       864
Lys Leu Glu Asn Leu Met Leu Asp Lys Asp Gly His Ile Lys Ile Thr
        275                 280                 285 gat ttt gga ctt tgc aaa gaa ggg atc aca gat gca gcc acc atg aag       912
Asp Phe Gly Leu Cys Lys Glu Gly Ile Thr Asp Ala Ala Thr Met Lys
290                 295                 300 aca ttc tgt ggc act cca gaa tat ctg gca cca gag gtg tta gaa gat       960
Thr Phe Cys Gly Thr Pro Glu Tyr Leu Ala Pro Glu Val Leu Glu Asp
305                 310                 315                 320 aat gac tat ggc cga gca gta gac tgg tgg ggc cta ggg gtt gtc atg      1008
Asn Asp Tyr Gly Arg Ala Val Asp Trp Trp Gly Leu Gly Val Val Met
                325                 330                 335 tat gaa atg atg tgt ggg agg tta cct ttc tac aac cag gac cat gag      1056
Tyr Glu Met Met Cys Gly Arg Leu Pro Phe Tyr Asn Gln Asp His Glu
            340                 345                 350 aaa ctt ttt gaa tta ata tta atg gaa gac att aaa ttt cct cga aca      1104
Lys Leu Phe Glu Leu Ile Leu Met Glu Asp Ile Lys Phe Pro Arg Thr
        355                 360                 365 ctc tct tca gat gca aaa tca ttg ctt tca ggg ctc ttg ata aag gat      1152
Leu Ser Ser Asp Ala Lys Ser Leu Leu Ser Gly Leu Leu Ile Lys Asp
370                 375                 380 cca aat aaa cgc ctt ggt gga gga cca gat gat gca aaa gaa att atg      1200
Pro Asn Lys Arg Leu Gly Gly Gly Pro Asp Asp Ala Lys Glu Ile Met
385                 390                 395                 400 aga cac agt ttc ttc tct gga gta aac tgg caa gat gta tat gat aaa      1248
Arg His Ser Phe Phe Ser Gly Val Asn Trp Gln Asp Val Tyr Asp Lys
                405                 410                 415
```

```
aag ctt gta cct cct ttt aaa cct caa gta aca tct gag aca gat act    1296
Lys Leu Val Pro Pro Phe Lys Pro Gln Val Thr Ser Glu Thr Asp Thr
            420                 425                 430 aga tat ttt gat gaa gaa ttt aca gct cag act att aca ata aca cca    1344
Arg Tyr Phe Asp Glu Glu Phe Thr Ala Gln Thr Ile Thr Ile Thr Pro
            435                 440                 445 cct gaa aaa tat gat gag gat ggt atg gac tgc atg gac aat gag agg    1392
Pro Glu Lys Tyr Asp Glu Asp Gly Met Asp Cys Met Asp Asn Glu Arg
            450                 455                 460 cgg ccg cat ttc cct caa ttt tcc tac tct gca agt gga cga gaa taa    1440
Arg Pro His Phe Pro Gln Phe Ser Tyr Ser Ala Ser Gly Arg Glu
465                 470                 475

<210> SEQ ID NO 8
<211> LENGTH: 479
<212> TYPE: PRT
<213> ORGANISM: Homo sapiens

<400> SEQUENCE: 8

Met Ser Asp Val Thr Ile Val Lys Glu Gly Trp Val Gln Lys Arg Gly
1               5                   10                  15

Glu Tyr Ile Lys Asn Trp Arg Pro Arg Tyr Phe Leu Leu Lys Thr Asp
            20                  25                  30

Gly Ser Phe Ile Gly Tyr Lys Glu Lys Pro Gln Asp Val Asp Leu Pro
        35                  40                  45

Tyr Pro Leu Asn Asn Phe Ser Val Ala Lys Cys Gln Leu Met Lys Thr
    50                  55                  60

Glu Arg Pro Lys Pro Asn Thr Phe Ile Ile Arg Cys Leu Gln Trp Thr
65                  70                  75                  80

Thr Val Ile Glu Arg Thr Phe His Val Asp Thr Pro Glu Glu Arg Glu
                85                  90                  95

Glu Trp Thr Glu Ala Ile Gln Ala Val Ala Asp Arg Leu Gln Arg Gln
            100                 105                 110

Glu Glu Glu Arg Met Asn Cys Ser Pro Thr Ser Gln Ile Asp Asn Ile
        115                 120                 125

Gly Glu Glu Glu Met Asp Ala Ser Thr Thr His His Lys Arg Lys Thr
    130                 135                 140

Met Asn Asp Phe Asp Tyr Leu Lys Leu Leu Gly Lys Gly Thr Phe Gly
145                 150                 155                 160

Lys Val Ile Leu Val Arg Glu Lys Ala Ser Gly Lys Tyr Tyr Ala Met
                165                 170                 175

Lys Ile Leu Lys Lys Glu Val Ile Ile Ala Lys Asp Glu Val Ala His
            180                 185                 190

Thr Leu Thr Glu Ser Arg Val Leu Lys Asn Thr Arg His Pro Phe Leu
        195                 200                 205

Thr Ser Leu Lys Tyr Ser Phe Gln Thr Lys Asp Arg Leu Cys Phe Val
    210                 215                 220

Met Glu Tyr Val Asn Gly Gly Glu Leu Phe Phe His Leu Ser Arg Glu
225                 230                 235                 240

Arg Val Phe Ser Glu Asp Arg Thr Arg Phe Tyr Gly Ala Glu Ile Val
                245                 250                 255

Ser Ala Leu Asp Tyr Leu His Ser Gly Lys Ile Val Tyr Arg Asp Leu
            260                 265                 270

Lys Leu Glu Asn Leu Met Leu Asp Lys Asp Gly His Ile Lys Ile Thr
        275                 280                 285

Asp Phe Gly Leu Cys Lys Glu Gly Ile Thr Asp Ala Ala Thr Met Lys
```

```
                290                 295                 300
Thr Phe Cys Gly Thr Pro Glu Tyr Leu Ala Pro Glu Val Leu Glu Asp
305                 310                 315                 320

Asn Asp Tyr Gly Arg Ala Val Asp Trp Trp Gly Leu Gly Val Val Met
                325                 330                 335

Tyr Glu Met Met Cys Gly Arg Leu Pro Phe Tyr Asn Gln Asp His Glu
            340                 345                 350

Lys Leu Phe Glu Leu Ile Leu Met Glu Asp Ile Lys Phe Pro Arg Thr
        355                 360                 365

Leu Ser Ser Asp Ala Lys Ser Leu Leu Ser Gly Leu Leu Ile Lys Asp
    370                 375                 380

Pro Asn Lys Arg Leu Gly Gly Pro Asp Asp Ala Lys Glu Ile Met
385                 390                 395                 400

Arg His Ser Phe Phe Ser Gly Val Asn Trp Gln Asp Val Tyr Asp Lys
                405                 410                 415

Lys Leu Val Pro Pro Phe Lys Pro Gln Val Thr Ser Glu Thr Asp Thr
                420                 425                 430

Arg Tyr Phe Asp Glu Glu Phe Thr Ala Gln Thr Ile Thr Ile Thr Pro
            435                 440                 445

Pro Glu Lys Tyr Asp Glu Asp Gly Met Asp Cys Met Asp Asn Glu Arg
        450                 455                 460

Arg Pro His Phe Pro Gln Phe Ser Tyr Ser Ala Ser Gly Arg Glu
465                 470                 475

<210> SEQ ID NO 9
<211> LENGTH: 1443
<212> TYPE: DNA
<213> ORGANISM: Homo sapiens
<220> FEATURE:
<221> NAME/KEY: CDS
<222> LOCATION: (1)..(1443)

<400> SEQUENCE: 9 atg agc gac gtg gct att gtg aag gag ggt tgg ctg cac aaa cga ggg         48
Met Ser Asp Val Ala Ile Val Lys Glu Gly Trp Leu His Lys Arg Gly
1               5                   10                  15 gag tac atc aag acc tgg cgg cca cgc tac ttc ctc ctc aag aat gat         96
Glu Tyr Ile Lys Thr Trp Arg Pro Arg Tyr Phe Leu Leu Lys Asn Asp
            20                  25                  30 ggc acc ttc att ggc tac aag gag cgg ccg cag gat gtg gac caa cgt        144
Gly Thr Phe Ile Gly Tyr Lys Glu Arg Pro Gln Asp Val Asp Gln Arg
        35                  40                  45 gag gct ccc ctc aac aac ttc tct gtg gcg cag tgc cag ctg atg aag        192
Glu Ala Pro Leu Asn Asn Phe Ser Val Ala Gln Cys Gln Leu Met Lys
    50                  55                  60 acg gag cgg ccc cgg ccc aac acc ttc atc atc cgc tgc ctg cag tgg        240
Thr Glu Arg Pro Arg Pro Asn Thr Phe Ile Ile Arg Cys Leu Gln Trp
65                  70                  75                  80 acc act gtc atc gaa cgc acc ttc cat gtg gag act cct gag gag cgg        288
Thr Thr Val Ile Glu Arg Thr Phe His Val Glu Thr Pro Glu Glu Arg
                85                  90                  95 gag gag tgg aca acc gcc atc cag act gtg gct gac ggc ctc aag aag        336
Glu Glu Trp Thr Thr Ala Ile Gln Thr Val Ala Asp Gly Leu Lys Lys
            100                 105                 110 cag gag gag gag gag atg gac ttc cgg tcg ggc tca ccc agt gac aac        384
Gln Glu Glu Glu Glu Met Asp Phe Arg Ser Gly Ser Pro Ser Asp Asn
        115                 120                 125 tca ggg gct gaa gag atg gag gtg tcc ctg gcc aag ccc aag cac cgc        432
```

```
Ser Gly Ala Glu Glu Met Glu Val Ser Leu Ala Lys Pro Lys His Arg
    130                 135                 140 gtg acc atg aac gag ttt gag tac ctg aag ctg ctg ggc aag ggc act      480
Val Thr Met Asn Glu Phe Glu Tyr Leu Lys Leu Leu Gly Lys Gly Thr
145                 150                 155                 160 ttc ggc aag gtg atc ctg gtg aag gag aag gcc aca ggc cgc tac tac      528
Phe Gly Lys Val Ile Leu Val Lys Glu Lys Ala Thr Gly Arg Tyr Tyr
                165                 170                 175 gcc atg aag atc ctc aag aag gaa gtc atc gtg gcc aag gac gag gtg      576
Ala Met Lys Ile Leu Lys Lys Glu Val Ile Val Ala Lys Asp Glu Val
            180                 185                 190 gcc cac aca ctc acc gag aac cgc gtc ctg cag aac tcc agg cac ccc      624
Ala His Thr Leu Thr Glu Asn Arg Val Leu Gln Asn Ser Arg His Pro
        195                 200                 205 ttc ctc aca gcc ctg aag tac tct ttc cag acc cac gac cgc ctc tgc      672
Phe Leu Thr Ala Leu Lys Tyr Ser Phe Gln Thr His Asp Arg Leu Cys
    210                 215                 220 ttt gtc atg gag tac gcc aac ggg ggc gag ctg ttc cac ctg tcc          720
Phe Val Met Glu Tyr Ala Asn Gly Gly Glu Leu Phe His Leu Ser
225                 230                 235                 240 cgg gag cgt gtg ttc tcc gag gac cgg gcc cgc ttc tat ggc gct gag      768
Arg Glu Arg Val Phe Ser Glu Asp Arg Ala Arg Phe Tyr Gly Ala Glu
                245                 250                 255 att gtg tca gcc ctg gac tac ctg cac tcg gag aag aac gtg gtg tac      816
Ile Val Ser Ala Leu Asp Tyr Leu His Ser Glu Lys Asn Val Val Tyr
            260                 265                 270 cgg gac ctc aag ctg gag aac ctc atg ctg gac aag gac ggg cac att      864
Arg Asp Leu Lys Leu Glu Asn Leu Met Leu Asp Lys Asp Gly His Ile
        275                 280                 285 aag atc aca gac ttc ggg ctg tgc aag gag ggg atc aag gac ggt gcc      912
Lys Ile Thr Asp Phe Gly Leu Cys Lys Glu Gly Ile Lys Asp Gly Ala
    290                 295                 300 acc atg aag acc ttt tgc ggc aca cct gag tac ctg gcc ccc gag gtg      960
Thr Met Lys Thr Phe Cys Gly Thr Pro Glu Tyr Leu Ala Pro Glu Val
305                 310                 315                 320 ctg gag gac aat gac tac ggc cgt gca gtg gac tgg tgg ggg ctg ggc     1008
Leu Glu Asp Asn Asp Tyr Gly Arg Ala Val Asp Trp Trp Gly Leu Gly
                325                 330                 335 gtg gtc atg tac gag atg atg tgc ggt cgc ctg ccc ttc tac aac cag     1056
Val Val Met Tyr Glu Met Met Cys Gly Arg Leu Pro Phe Tyr Asn Gln
            340                 345                 350 gac cat gag aag ctt ttt gag ctc atc ctc atg gag gag atc cgc ttc     1104
Asp His Glu Lys Leu Phe Glu Leu Ile Leu Met Glu Glu Ile Arg Phe
        355                 360                 365 ccg cgc acg ctt ggt ccc gag gcc aag tcc ttg ctt tca ggg ctg ctc     1152
Pro Arg Thr Leu Gly Pro Glu Ala Lys Ser Leu Leu Ser Gly Leu Leu
    370                 375                 380 aag aag gac ccc aag cag agg ctt ggc ggg ggc tcc gag gac gcc aag     1200
Lys Lys Asp Pro Lys Gln Arg Leu Gly Gly Gly Ser Glu Asp Ala Lys
385                 390                 395                 400 gag atc atg cag cat cgc ttc ttt gcc ggt atc gtg tgg cag cac gtg     1248
Glu Ile Met Gln His Arg Phe Phe Ala Gly Ile Val Trp Gln His Val
                405                 410                 415 tac gag aag aag ctc agc cca ccc ttc aag ccc cag gtc acg tcg gag     1296
Tyr Glu Lys Lys Leu Ser Pro Pro Phe Lys Pro Gln Val Thr Ser Glu
            420                 425                 430 act gac acc agg tat ttt gat gag gag ttc acg gcc cag atg atc acc     1344
Thr Asp Thr Arg Tyr Phe Asp Glu Glu Phe Thr Ala Gln Met Ile Thr
        435                 440                 445
```

```
atc aca cca cct gac caa gat gac agc atg gag tgt gtg gac agc gag    1392
Ile Thr Pro Pro Asp Gln Asp Asp Ser Met Glu Cys Val Asp Ser Glu
450                 455                 460 cgc agg ccc cac ttc ccc cag ttc tcc tac tcg gcc agc ggc acg gcc    1440
Arg Arg Pro His Phe Pro Gln Phe Ser Tyr Ser Ala Ser Gly Thr Ala
465                 470                 475                 480 tga                                                                 1443

<210> SEQ ID NO 10
<211> LENGTH: 480
<212> TYPE: PRT
<213> ORGANISM: Homo sapiens

<400> SEQUENCE: 10

Met Ser Asp Val Ala Ile Val Lys Glu Gly Trp Leu His Lys Arg Gly
1               5                   10                  15

Glu Tyr Ile Lys Thr Trp Arg Pro Arg Tyr Phe Leu Leu Lys Asn Asp
            20                  25                  30

Gly Thr Phe Ile Gly Tyr Lys Glu Arg Pro Gln Asp Val Asp Gln Arg
        35                  40                  45

Glu Ala Pro Leu Asn Asn Phe Ser Val Ala Gln Cys Gln Leu Met Lys
    50                  55                  60

Thr Glu Arg Pro Arg Pro Asn Thr Phe Ile Ile Arg Cys Leu Gln Trp
65                  70                  75                  80

Thr Thr Val Ile Glu Arg Thr Phe His Val Glu Thr Pro Glu Glu Arg
                85                  90                  95

Glu Glu Trp Thr Thr Ala Ile Gln Thr Val Ala Asp Gly Leu Lys Lys
            100                 105                 110

Gln Glu Glu Glu Glu Met Asp Phe Arg Ser Gly Ser Pro Ser Asp Asn
        115                 120                 125

Ser Gly Ala Glu Glu Met Glu Val Ser Leu Ala Lys Pro Lys His Arg
    130                 135                 140

Val Thr Met Asn Glu Phe Glu Tyr Leu Lys Leu Leu Gly Lys Gly Thr
145                 150                 155                 160

Phe Gly Lys Val Ile Leu Val Lys Glu Lys Ala Thr Gly Arg Tyr Tyr
                165                 170                 175

Ala Met Lys Ile Leu Lys Lys Glu Val Ile Val Ala Lys Asp Glu Val
            180                 185                 190

Ala His Thr Leu Thr Glu Asn Arg Val Leu Gln Asn Ser Arg His Pro
        195                 200                 205

Phe Leu Thr Ala Leu Lys Tyr Ser Phe Gln Thr His Asp Arg Leu Cys
    210                 215                 220

Phe Val Met Glu Tyr Ala Asn Gly Gly Glu Leu Phe Phe His Leu Ser
225                 230                 235                 240

Arg Glu Arg Val Phe Ser Glu Asp Arg Ala Arg Phe Tyr Gly Ala Glu
                245                 250                 255

Ile Val Ser Ala Leu Asp Tyr Leu His Ser Glu Lys Asn Val Val Tyr
            260                 265                 270

Arg Asp Leu Lys Leu Glu Asn Leu Met Leu Asp Lys Asp Gly His Ile
        275                 280                 285

Lys Ile Thr Asp Phe Gly Leu Cys Lys Glu Gly Ile Lys Asp Gly Ala
    290                 295                 300

Thr Met Lys Thr Phe Cys Gly Thr Pro Glu Tyr Leu Ala Pro Glu Val
305                 310                 315                 320

Leu Glu Asp Asn Asp Tyr Gly Arg Ala Val Asp Trp Trp Gly Leu Gly
```

```
                      325                 330                 335
Val Val Met Tyr Glu Met Met Cys Gly Arg Leu Pro Phe Tyr Asn Gln
                340                 345                 350

Asp His Glu Lys Leu Phe Glu Leu Ile Leu Met Glu Glu Ile Arg Phe
            355                 360                 365

Pro Arg Thr Leu Gly Pro Glu Ala Lys Ser Leu Leu Ser Gly Leu Leu
370                 375                 380

Lys Lys Asp Pro Lys Gln Arg Leu Gly Gly Ser Glu Asp Ala Lys
385                 390                 395                 400

Glu Ile Met Gln His Arg Phe Phe Ala Gly Ile Val Trp Gln His Val
            405                 410                 415

Tyr Glu Lys Lys Leu Ser Pro Pro Phe Lys Pro Gln Val Thr Ser Glu
                420                 425                 430

Thr Asp Thr Arg Tyr Phe Asp Glu Glu Phe Thr Ala Gln Met Ile Thr
            435                 440                 445

Ile Thr Pro Pro Asp Gln Asp Asp Ser Met Glu Cys Val Asp Ser Glu
        450                 455                 460

Arg Arg Pro His Phe Pro Gln Phe Ser Tyr Ser Ala Ser Gly Thr Ala
465                 470                 475                 480

<210> SEQ ID NO 11
<211> LENGTH: 1446
<212> TYPE: DNA
<213> ORGANISM: Homo sapiens
<220> FEATURE:
<221> NAME/KEY: CDS
<222> LOCATION: (1)..(1446)

<400> SEQUENCE: 11 atg aat gag gtg tct gtc atc aaa gaa ggc tgg ctc cac aag cgt ggt      48
Met Asn Glu Val Ser Val Ile Lys Glu Gly Trp Leu His Lys Arg Gly
1               5                   10                  15 gaa tac atc aag acc tgg agg cca cgg tac ttc ctg ctg aag agc gac      96
Glu Tyr Ile Lys Thr Trp Arg Pro Arg Tyr Phe Leu Leu Lys Ser Asp
                20                  25                  30 ggc tcc ttc att ggg tac aag gag agg ccc gag gcc cct gat cag act     144
Gly Ser Phe Ile Gly Tyr Lys Glu Arg Pro Glu Ala Pro Asp Gln Thr
            35                  40                  45 cta ccc ccc tta aac aac ttc tcc gta gca gaa tgc cag ctg atg aag     192
Leu Pro Pro Leu Asn Asn Phe Ser Val Ala Glu Cys Gln Leu Met Lys
        50                  55                  60 acc gag agg ccg cga ccc aac acc ttt gtc ata cgc tgc ctg cag tgg     240
Thr Glu Arg Pro Arg Pro Asn Thr Phe Val Ile Arg Cys Leu Gln Trp
65                  70                  75                  80 acc aca gtc atc gag agg acc ttc cac gtg gat tct cca gac gag agg     288
Thr Thr Val Ile Glu Arg Thr Phe His Val Asp Ser Pro Asp Glu Arg
                85                  90                  95 gag gag tgg atg cgg gcc atc cag atg gtc gcc aac agc ctc aag cag     336
Glu Glu Trp Met Arg Ala Ile Gln Met Val Ala Asn Ser Leu Lys Gln
            100                 105                 110 cgg gcc cca ggc gag gac ccc atg gac tac aag tgt ggc tcc ccc agt     384
Arg Ala Pro Gly Glu Asp Pro Met Asp Tyr Lys Cys Gly Ser Pro Ser
        115                 120                 125 gac tcc tcc acg act gag gag atg gaa gtg gcg gtc agc aag gca cgg     432
Asp Ser Ser Thr Thr Glu Glu Met Glu Val Ala Val Ser Lys Ala Arg
    130                 135                 140 gct aaa gtg acc atg aat gac ttc gac tat ctc aaa ctc ctt ggc aag     480
Ala Lys Val Thr Met Asn Asp Phe Asp Tyr Leu Lys Leu Leu Gly Lys
145                 150                 155                 160
```

-continued

| | | |
|---|---|---|
| gga acc ttt ggc aaa gtc atc ctg gtg cgg gag aag gcc act ggc cgc<br>Gly Thr Phe Gly Lys Val Ile Leu Val Arg Glu Lys Ala Thr Gly Arg<br>               165               170               175 | 528 |
| tac tac gcc atg aag atc ctg cgg aag gaa gtc atc att gcc aag gat<br>Tyr Tyr Ala Met Lys Ile Leu Arg Lys Glu Val Ile Ile Ala Lys Asp<br>        180                   185                 190 | 576 |
| gaa gtc gct cac aca gtc acc gag agc cgg gtc ctc cag aac acc agg<br>Glu Val Ala His Thr Val Thr Glu Ser Arg Val Leu Gln Asn Thr Arg<br>          195               200              205 | 624 |
| cac ccg ttc ctc act gcg ctg aag tat gcc ttc cag acc cac gac cgc<br>His Pro Phe Leu Thr Ala Leu Lys Tyr Ala Phe Gln Thr His Asp Arg<br>     210                 215               220 | 672 |
| ctg tgc ttt gtg atg gag tat gcc aac ggg ggt gag ctg ttc ttc cac<br>Leu Cys Phe Val Met Glu Tyr Ala Asn Gly Gly Glu Leu Phe Phe His<br>225               230                 235             240 | 720 |
| ctg tcc cgg gag cgt gtc ttc aca gag gag cgg gcc cgg ttt tat ggt<br>Leu Ser Arg Glu Arg Val Phe Thr Glu Glu Arg Ala Arg Phe Tyr Gly<br>             245               250              255 | 768 |
| gca gag att gtc tcg gct ctt gag tac ttg cac tcg cgg gac gtg gta<br>Ala Glu Ile Val Ser Ala Leu Glu Tyr Leu His Ser Arg Asp Val Val<br>             260               265              270 | 816 |
| tac cgc gac atc aag ctg gaa aac ctc atg ctg gac aaa gat ggc cac<br>Tyr Arg Asp Ile Lys Leu Glu Asn Leu Met Leu Asp Lys Asp Gly His<br>        275                 280              285 | 864 |
| atc aag atc act gac ttt ggc ctc tgc aaa gag ggc atc agt gac ggg<br>Ile Lys Ile Thr Asp Phe Gly Leu Cys Lys Glu Gly Ile Ser Asp Gly<br>     290                 295               300 | 912 |
| gcc acc atg aaa acc ttc tgt ggg acc ccg gag tac ctg gcg cct gag<br>Ala Thr Met Lys Thr Phe Cys Gly Thr Pro Glu Tyr Leu Ala Pro Glu<br>305               310                 315             320 | 960 |
| gtg ctg gag gac aat gac tat ggc cgg gcc gtg gac tgg tgg ggg ctg<br>Val Leu Glu Asp Asn Asp Tyr Gly Arg Ala Val Asp Trp Trp Gly Leu<br>             325               330              335 | 1008 |
| ggt gtg gtc atg tac gag atg atg tgc ggc cgc ctg ccc ttc tac aac<br>Gly Val Val Met Tyr Glu Met Met Cys Gly Arg Leu Pro Phe Tyr Asn<br>        340                 345              350 | 1056 |
| cag gac cac gag cgc ctc ttc gag ctc atc ctc atg gaa gag atc cgc<br>Gln Asp His Glu Arg Leu Phe Glu Leu Ile Leu Met Glu Glu Ile Arg<br>     355                 360               365 | 1104 |
| ttc ccg cgc acg ctc agc ccc gag gcc aag tcc ctg ctt gct ggg ctg<br>Phe Pro Arg Thr Leu Ser Pro Glu Ala Lys Ser Leu Leu Ala Gly Leu<br>        370                 375              380 | 1152 |
| ctt aag aag gac ccc aag cag agg ctt ggt ggg ggg ccc agc gat gcc<br>Leu Lys Lys Asp Pro Lys Gln Arg Leu Gly Gly Gly Pro Ser Asp Ala<br>385               390                 395             400 | 1200 |
| aag gag gtc atg gag cac agg ttc ttc ctc agc atc aac tgg cag gac<br>Lys Glu Val Met Glu His Arg Phe Phe Leu Ser Ile Asn Trp Gln Asp<br>          405               410              415 | 1248 |
| gtg gtc cag aag aag ctc ctg cca ccc ttc aaa cct cag gtc acg tcc<br>Val Val Gln Lys Lys Leu Leu Pro Pro Phe Lys Pro Gln Val Thr Ser<br>             420               425              430 | 1296 |
| gag gtc gac aca agg tac ttc gat gat gaa ttt acc gcc cag tcc atc<br>Glu Val Asp Thr Arg Tyr Phe Asp Asp Glu Phe Thr Ala Gln Ser Ile<br>        435                 440              445 | 1344 |
| aca atc aca ccc cct gac cgc tat gac agc ctg ggc tta ctg gag ctg<br>Thr Ile Thr Pro Pro Asp Arg Tyr Asp Ser Leu Gly Leu Leu Glu Leu<br>     450                 455              460 | 1392 |
| gac cag cgg acc cac ttc ccc cag ttc tcc tac tcg gcc agc atc cgc<br>Asp Gln Arg Thr His Phe Pro Gln Phe Ser Tyr Ser Ala Ser Ile Arg | 1440 |

```
                465                 470                 475                 480
gag tga                                                                                    1446
Glu <210> SEQ ID NO 12
<211> LENGTH: 481
<212> TYPE: PRT
<213> ORGANISM: Homo sapiens

<400> SEQUENCE: 12

Met Asn Glu Val Ser Val Ile Lys Glu Gly Trp Leu His Lys Arg Gly
1               5                   10                  15

Glu Tyr Ile Lys Thr Trp Arg Pro Arg Tyr Phe Leu Leu Lys Ser Asp
            20                  25                  30

Gly Ser Phe Ile Gly Tyr Lys Glu Arg Pro Glu Ala Pro Asp Gln Thr
        35                  40                  45

Leu Pro Pro Leu Asn Asn Phe Ser Val Ala Glu Cys Gln Leu Met Lys
    50                  55                  60

Thr Glu Arg Pro Arg Pro Asn Thr Phe Val Ile Arg Cys Leu Gln Trp
65                  70                  75                  80

Thr Thr Val Ile Glu Arg Thr Phe His Val Asp Ser Pro Asp Glu Arg
                85                  90                  95

Glu Glu Trp Met Arg Ala Ile Gln Met Val Ala Asn Ser Leu Lys Gln
            100                 105                 110

Arg Ala Pro Gly Glu Asp Pro Met Asp Tyr Lys Cys Gly Ser Pro Ser
        115                 120                 125

Asp Ser Ser Thr Thr Glu Glu Met Glu Val Ala Val Ser Lys Ala Arg
    130                 135                 140

Ala Lys Val Thr Met Asn Asp Phe Asp Tyr Leu Lys Leu Leu Gly Lys
145                 150                 155                 160

Gly Thr Phe Gly Lys Val Ile Leu Val Arg Glu Lys Ala Thr Gly Arg
                165                 170                 175

Tyr Tyr Ala Met Lys Ile Leu Arg Lys Glu Val Ile Ile Ala Lys Asp
            180                 185                 190

Glu Val Ala His Thr Val Thr Glu Ser Arg Val Leu Gln Asn Thr Arg
        195                 200                 205

His Pro Phe Leu Thr Ala Leu Lys Tyr Ala Phe Gln Thr His Asp Arg
    210                 215                 220

Leu Cys Phe Val Met Glu Tyr Ala Asn Gly Gly Glu Leu Phe Phe His
225                 230                 235                 240

Leu Ser Arg Glu Arg Val Phe Thr Glu Glu Arg Ala Arg Phe Tyr Gly
                245                 250                 255

Ala Glu Ile Val Ser Ala Leu Glu Tyr Leu His Ser Arg Asp Val Val
            260                 265                 270

Tyr Arg Asp Ile Lys Leu Glu Asn Leu Met Leu Asp Lys Asp Gly His
        275                 280                 285

Ile Lys Ile Thr Asp Phe Gly Leu Cys Lys Glu Gly Ile Ser Asp Gly
    290                 295                 300

Ala Thr Met Lys Thr Phe Cys Gly Thr Pro Glu Tyr Leu Ala Pro Glu
305                 310                 315                 320

Val Leu Glu Asp Asn Asp Tyr Gly Arg Ala Val Asp Trp Trp Gly Leu
                325                 330                 335

Gly Val Val Met Tyr Glu Met Met Cys Gly Arg Leu Pro Phe Tyr Asn
            340                 345                 350
```

Gln Asp His Glu Arg Leu Phe Glu Leu Ile Leu Met Glu Glu Ile Arg
        355                 360                 365

Phe Pro Arg Thr Leu Ser Pro Glu Ala Lys Ser Leu Leu Ala Gly Leu
    370                 375                 380

Leu Lys Lys Asp Pro Lys Gln Arg Leu Gly Gly Pro Ser Asp Ala
385                 390                 395                 400

Lys Glu Val Met Glu His Arg Phe Phe Leu Ser Ile Asn Trp Gln Asp
                405                 410                 415

Val Val Gln Lys Lys Leu Leu Pro Phe Lys Pro Gln Val Thr Ser
            420                 425                 430

Glu Val Asp Thr Arg Tyr Phe Asp Asp Glu Phe Thr Ala Gln Ser Ile
            435                 440                 445

Thr Ile Thr Pro Pro Asp Arg Tyr Asp Ser Leu Gly Leu Leu Glu Leu
        450                 455                 460

Asp Gln Arg Thr His Phe Pro Gln Phe Ser Tyr Ser Ala Ser Ile Arg
465                 470                 475                 480

Glu

<210> SEQ ID NO 13
<211> LENGTH: 1440
<212> TYPE: DNA
<213> ORGANISM: Artificial Sequence
<220> FEATURE:
<223> OTHER INFORMATION: synthetic construct

<400> SEQUENCE: 13
atgagcgacg tgaccattgt gaaggaaggc tgggtgcaga agcggggaga gtacatcaag     60
aactggaggc ctcggtactt tctgcttaag accgatggct cctttatcgg ttacaaggaa    120
aagccgcagg acgtggacct tccgtaccct ctgaacaact tctccgtggc aaagtgtcag    180
cttatgaaaa ccgaacgccc caagccgaac acgtttatca ttcgatgcct gcagtggacc    240
accgtgattg aacggacctt ccatgtggat accccagagg agagaagaa gtggacagaa    300 gccatccagg cagtggctga tcggctgcag agacaggaag aggaacggat gaactgctca    360
cccacttcac aaatcgacaa tatcggagag gaggagatgg acgccagcac cacccaccac    420
aagagaaaga ccatgaacga cttcgactac ctgaagctcc tgggcaaagg gaccttcgga    480
aaggtcatcc tggtccggga aaaggcctcc ggaaagtact acgccatgaa gatcctgaag    540
aaggaggtca tcattgccaa ggacgaagtg gcccacactc tgactgagtc cagggtcctc    600
aagaacactc ggcaccccct cctcacctcg ctgaagtaca gcttccaaac caaggataga    660
ctgtgcttcg tgatggaata cgtcaacgga ggggagctgt tcttccacct ttcccgcgaa    720
cgggtgttct cagaagatcg cacccggttc tacggtgccg agattgtttc gcgttggac    780 tacctccact cgggaaagat cgtgtaccgg gacctgaagc tggaaaacct catgctcgac    840
aaggatggcc acatcaagat caccgacttc ggcctgtgca aggaagggat cactgacgcg    900
gcaactatga aaaccttctg tggcaccccct gaatacctcg cgccggaagt gctggaggat    960
aacgactatg acgcgctgtg ggattggtgg ggcctgggag tcgtgatgta cgagatgatg   1020
tgcggacgct tgcccttcta caaccaggac cacgagaagc tgttcgaatt gatcctgatg   1080
gaggatatca agttcccgcg cactctgtcg tccgacgcta aaagcctgct gagcggactg   1140
ctgatcaagg accctaacaa gcgcctcgga ggtggtcctg acgatgccaa ggagattatg   1200
cggcactcct tcttctcggg cgtgaattgg caggatgtgt acgacaagaa gctcgtgccg   1260
ccattcaagc cccaagtcac ttccgaaacg gacactcggt acttcgacga ggagttcacc   1320

```
gcccaaaacca tcactattac cccccccgag aaatacgacg aggatgggat ggactgcatg   1380
gacaacgaac gccggccaca ttttccgcaa ttctcctatt ctgcctccgg aagggagtga   1440
```

<210> SEQ ID NO 14
<211> LENGTH: 23
<212> TYPE: DNA
<213> ORGANISM: Artificial Sequence
<220> FEATURE:
<223> OTHER INFORMATION: primer sequence

<400> SEQUENCE: 14

```
cacgtgggga aatcctcatt gac                                              23
```

<210> SEQ ID NO 15
<211> LENGTH: 15
<212> TYPE: DNA
<213> ORGANISM: Artificial Sequence
<220> FEATURE:
<223> OTHER INFORMATION: primer sequence

<400> SEQUENCE: 15

```
ccggtagccc aggat                                                       15
```

<210> SEQ ID NO 16
<211> LENGTH: 19
<212> TYPE: DNA
<213> ORGANISM: Artificial Sequence
<220> FEATURE:
<223> OTHER INFORMATION: primer sequence

<400> SEQUENCE: 16

```
ccactcctcc acctttgac                                                   19
```

<210> SEQ ID NO 17
<211> LENGTH: 18
<212> TYPE: DNA
<213> ORGANISM: Artificial Sequence
<220> FEATURE:
<223> OTHER INFORMATION: primer sequence

<400> SEQUENCE: 17

```
accctgttgc tgtagcca                                                    18
```

<210> SEQ ID NO 18
<211> LENGTH: 22
<212> TYPE: DNA
<213> ORGANISM: Artificial Sequence
<220> FEATURE:
<223> OTHER INFORMATION: primer sequence

<400> SEQUENCE: 18

```
actcctacga tccaaccata ga                                               22
```

<210> SEQ ID NO 19
<211> LENGTH: 25
<212> TYPE: DNA
<213> ORGANISM: Artificial Sequence
<220> FEATURE:
<223> OTHER INFORMATION: primer sequence

<400> SEQUENCE: 19

```
tggagtatgt ctgaggaaag ataga                                            25
```

<210> SEQ ID NO 20

```
<211> LENGTH: 21
<212> TYPE: DNA
<213> ORGANISM: Artificial Sequence
<220> FEATURE:
<223> OTHER INFORMATION: primer sequence

<400> SEQUENCE: 20
aggatggtat ggactgcatg g                                       21

<210> SEQ ID NO 21
<211> LENGTH: 22
<212> TYPE: DNA
<213> ORGANISM: Artificial Sequence
<220> FEATURE:
<223> OTHER INFORMATION: primer sequence

<400> SEQUENCE: 21
gtccacttgc agagtaggaa aa                                      22
```